United States Patent [19]
Kikuchi et al.

[11] Patent Number: 6,005,612
[45] Date of Patent: Dec. 21, 1999

[54] VIDEO CAMERA WITH HIGH SPEED MODE

[75] Inventors: Kenichi Kikuchi, Daito; Akio Kobayashi, Hirakata; Akira Toba, Osaka, all of Japan

[73] Assignee: Sanyo Electric Co., Ltd., Japan

[21] Appl. No.: 08/748,858

[22] Filed: Nov. 14, 1996

[30] Foreign Application Priority Data

Nov. 17, 1995 [JP] Japan ..................................... 7-300225
Nov. 17, 1995 [JP] Japan ..................................... 7-300226

[51] Int. Cl.⁶ .......................... H04N 5/228; H04N 5/262; H04N 5/238; G03B 13/00
[52] U.S. Cl. .......................... 348/222; 348/240; 348/354; 348/364
[58] Field of Search ..................................... 348/234, 222, 348/294, 302, 311, 312, 345, 362, 349, 333, 334, 346, 347, 350, 351, 353, 354, 355, 356, 240, 364

[56] References Cited

U.S. PATENT DOCUMENTS

| | | | |
|---|---|---|---|
| 4,910,599 | 3/1990 | Hashimoto | 348/240 |
| 5,345,264 | 9/1994 | Murata et al. | 348/354 |
| 5,361,095 | 11/1994 | Toshinobu et al. | 348/354 |
| 5,541,655 | 7/1996 | Kaneda | 348/350 |
| 5,548,330 | 8/1996 | Hidea et al. | 348/234 |
| 5,654,752 | 8/1997 | Yamazaki | 348/222 |
| 5,729,284 | 3/1998 | Ishii et al. | 348/364 |
| 5,734,424 | 3/1998 | Sasaki | 348/222 |

FOREIGN PATENT DOCUMENTS 63-250287 10/1988 Japan .
7-212657 8/1995 Japan .

*Primary Examiner*—Wendy Garber
*Assistant Examiner*—Luong Nguyen
*Attorney, Agent, or Firm*—Michaelson & Wallace; Peter L. Michaelson

[57] ABSTRACT

A video camera includes a CCD imager, and an image corresponding to a camera signal outputted from all of charge areas of the CCD imager is outputted on a monitor in a normal mode. In a quadruplication mode, four (4) images corresponding to camera signals repeatedly outputted from one of quarter areas of the charge area are outputted on the monitor. A high-frequency luminance component value generation circuit generates a high-frequency luminance component value on the basis of a luminance signal to be outputted at a center of the monitor in the normal mode, and a high-frequency luminance component value on the basis of a luminance signal to be outputted at a center of one of quarter areas of the monitor in the quadruplication mode. A microcomputer controls a focus motor on the basis of the high-frequency luminance component values obtained in such manners so as to adjust a focus.

15 Claims, 44 Drawing Sheets

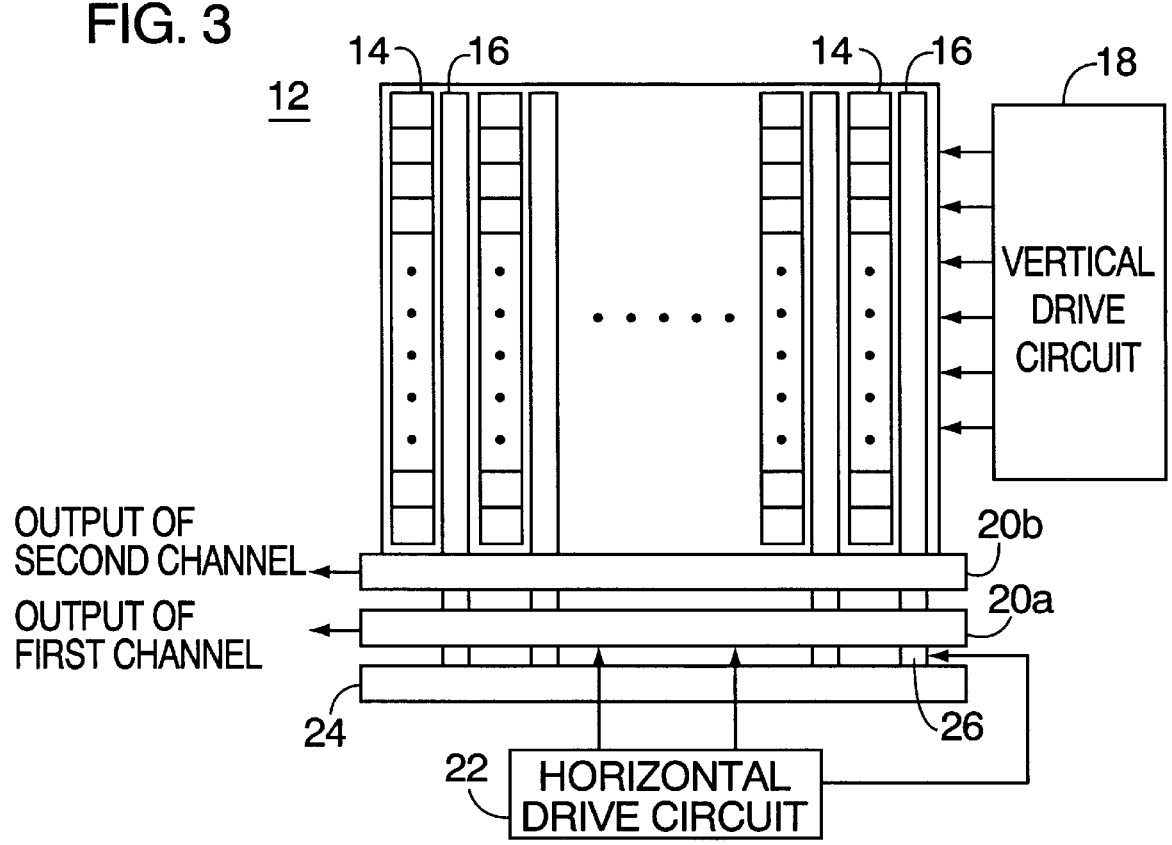

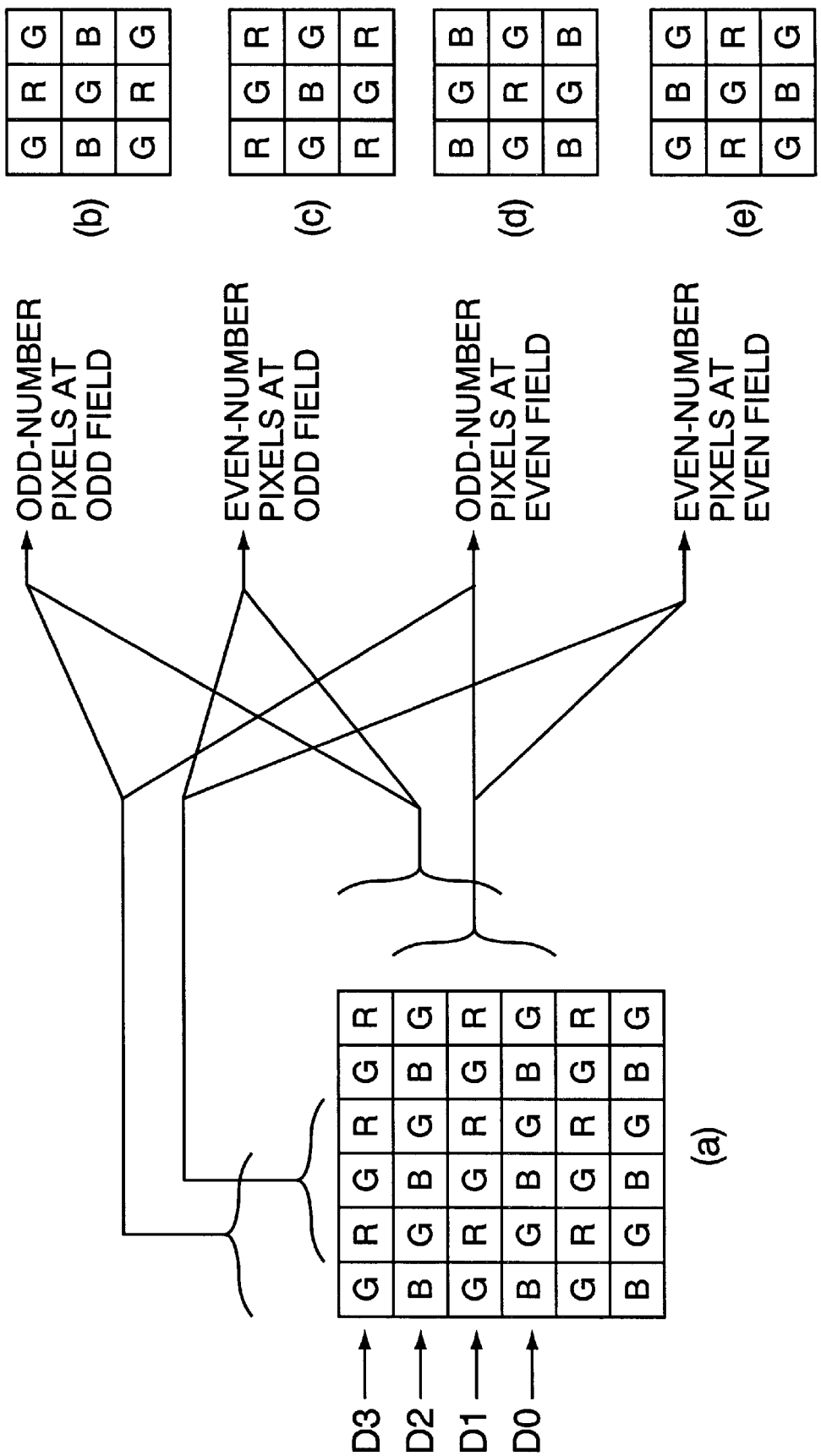

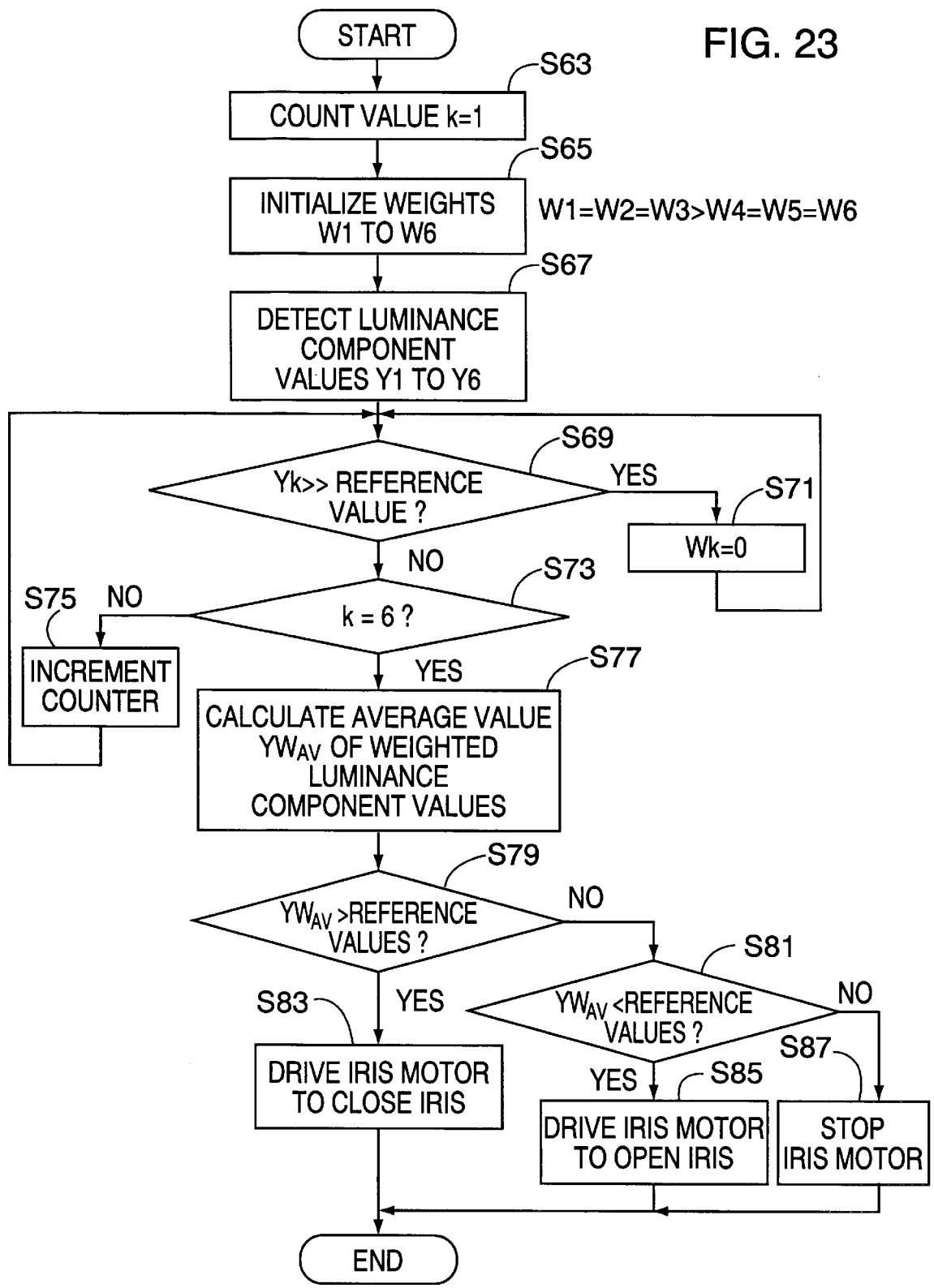

55

55

VIDEO CAMERA WITH HIGH SPEED MODE

BACKGROUND OF THE INVENTION

1. Field of the Invention

The present invention relates to a video camera. More specifically, the present invention is applied to a video camera having a normal mode in which an image is displayed on a monitor by processing a camera signal outputted from all charge areas of a CCD imager, and a high-speed mode (a) quadruplication mode, for example in which suceeding four (4) images are displayed on the monitor by processing camera signals repeatedly outputted from one of quarter areas of the charge area, and in which picture quality associated elements such as a focus, an iris and a white balance are adjusted.

2. Description of the Prior Art

Examples of a video camera having the quadruplication mode are described in Japanese Patent Application Laying-open No. 63-250287 [H04N5/225, H04N5/30, H04N5/335, H04N3/00] laid-open on Oct. 18, 1988, Japanese Patent Application Laying-open No. 7-212657 [H04N5/335, H01L27/12] laid-open on Aug. 11, 1996, and a U.S. patent application Ser. No. 08/188,543 [H04N5/335, H01L27/12] filed on Jan. 28, 1994.

On the other hand, in a video camera, in automatically controlling a focus, for example, an integration value of a high-frequency luminance signal included in a video signal to be outputted on a focus area formed at a center of a monitor is calculated, and a focus lens is moved to a position at which the integration value becomes maximum.

In the above described prior art, since the focus area is always formed at the center of the monitor, it was impossible to suitably control the focus in the quadruplication mode. More specifically, in the normal mode, the focus area FA is formed at the center of the monitor as shown in FIG. 51A, and the focus is controlled on the basis of the video signal including a main object M, and therefore, it is possible to bring the main object M in focus; however; in the quadruplication mode, the focus area FA is formed at a position deviating from the main object M as shown in FIG. 51B, and therefore, it is impossible to bring the main object M in focus. Such a problem also happened in controlling the iris or the white balance.

SUMMARY OF THE INVENTION

Therefore, a principal object of the present invention is to provide a video camera capable of suitably adjusting a picture quality associated element always.

According to the present invention, a video camera comprises: signal processing means for generating a video signal by processing a camera signal from an imager; mode switching means for selectively switching a first mode and a second mode; first generating means for generating a first predetermined component value of a first video signal based on the camera signal from a first area of the imager at a time that the first mode is selected by the mode switching means; second generating means for generating a second predetermined component value of a second video signal based on the camera signal from a second area of the imager at a time that the second mode is selected by the mode switching means; and adjusting means for adjusting a picture quality associated value on the basis of one of the first predetermined component value and the second predetermined component value.

According to the present invention, in the first mode, the first predetermined component value of the first video signal based on the camera signal from the first area of the imager is generated by the first generating means, and the adjusting means adjusts the picture quality associated element on the basis of the first predetermined component value. In contrast, in the second mode, the second predetermined component value of the second video signal based on the camera signal from the second area of the imager is generated by the second generating means, and the adjusting means adjust the picture quality associated element on the basis of the second predetermined component value.

In an aspect of the present invention, the first generating means determines, for example, whether or not the video signal is the first video signal to be outputted at a first monitor area of the monitor correlating to the first area, and generates the first predetermined component value on the basis of the determined first video signal.

In one embodiment of the present invention, the first generating means compares first area data of the first monitor area stored in a first memory and an output position of the video signal on the monitor detected by first position detecting means, and generates the first predetermined component value at a time that the output position and the first area data are consistent with each other. In addition, in the first mode, an image corresponding to a camera signal from a whole area of the imager is displayed on the monitor, and a single first monitor area corresponding to the first area is formed on the monitor.

In another aspect of the present invention, the second generating means determines whether or not the video signal is the second video signal to be outputted at a second monitor area of the monitor correlating to the second area, and generates the second predetermined component value on the basis of the determined second video signal.

In another embodiment of the present invention, the second generating means compares second area data of the second monitor area stored in a second memory and the output position of the video signal on the monitor detected by second position detecting means, and generates the second predetermined component value at a time that the output position and the second area data are consistent with each other. In addition, in the second mode, a plurality of images corresponding to camera signals repeatedly outputted from a portion of the charge area including the charge area are displayed on the monitor, and a single of the second monitor area corresponding to the charge area is formed on the monitor.

According to the present invention, since the predetermined component value utilized for adjustment of the picture quality associated element is generated on the basis of the video signal from the monitor area corresponding to the normal mode or the quadruplication mode, it is possible to suitably adjust a picture quality always.

According to the present invention, a video camera comprises: signal processing means for generating a video signal by processing a camera signal from an imager; mode switching means for selectively switching a first mode and a second mode; generating means for generating a predetermined component value of the video signal based on the camera signal from a predetermined area of the imager; adjusting means for adjusting a picture quality associated element on the basis of the predetermined component value; and prohibiting means for prohibiting an operation of the adjusting means in a time that the second mode is selected by the mode switching means.

In the present invention, in the first mode, the predetermined component value of the video signal on the basis of the camera signal from the predetermined area of the imager is generated by the generating means, and the picture quality associated element is adjusted by the adjusting means on the basis of the predetermined component value. In contrast, in the second mode, the operation of the adjusting means is prohibited by the prohibiting means. Accordingly, if the second mode is selected succeeding to the first mode, a picture quality is adjusted on the basis of the picture quality associated element adjusted in the first mode.

According to the present invention, in a case where the second mode is selected succeeding to the first mode, since the picture quality is adjusted according to the picture quality associated element adjusted in the first mode, it is possible to make a constitution of circuits simple.

According to the present invention, a video camera comprises: output control means for outputting a camera signal of a predetermined area of an imager and sweeping-out the camera signal of an area excluding the predetermined charge area; generating means for generating a video signal including a plurality of video components corresponding to an output camera signal by processing the output camera signal; and zooming means for zooming the plurality of video components.

In the present invention, only the camera signal of the predetermined area of the imager is outputted, and camera signal of the area excluding the predetermined area is swept-out. The generating means generates the video signal including the plurality of video components corresponding to the output camera signal from the imager by processing the output camera signal. Then, the plurality of video components included in the video signal are zoomed by the zooming means.

According to the present invention, since the plurality of video components included in the video signal are zoomed, it is possible to eliminate an optical black area formed in the monitor by sweeping-out the camera signal of the charge area excluding the predetermined charge area.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing an arrangement of a mosaic type color filter utilized for FIG. 1 embodiment;

FIG. 3 is an illustrative view showing a imager of FIG. 1 embodiment;

FIG. 11 is an illustrative view showing an operation of FIG. 10 embodiment;

FIG. 23 is a flowchart showing a portion of an operation of the microcomputer;

DETAILED DESCRIPTION OF THE PREFERRED EMBODIMENTS

Figure 1:
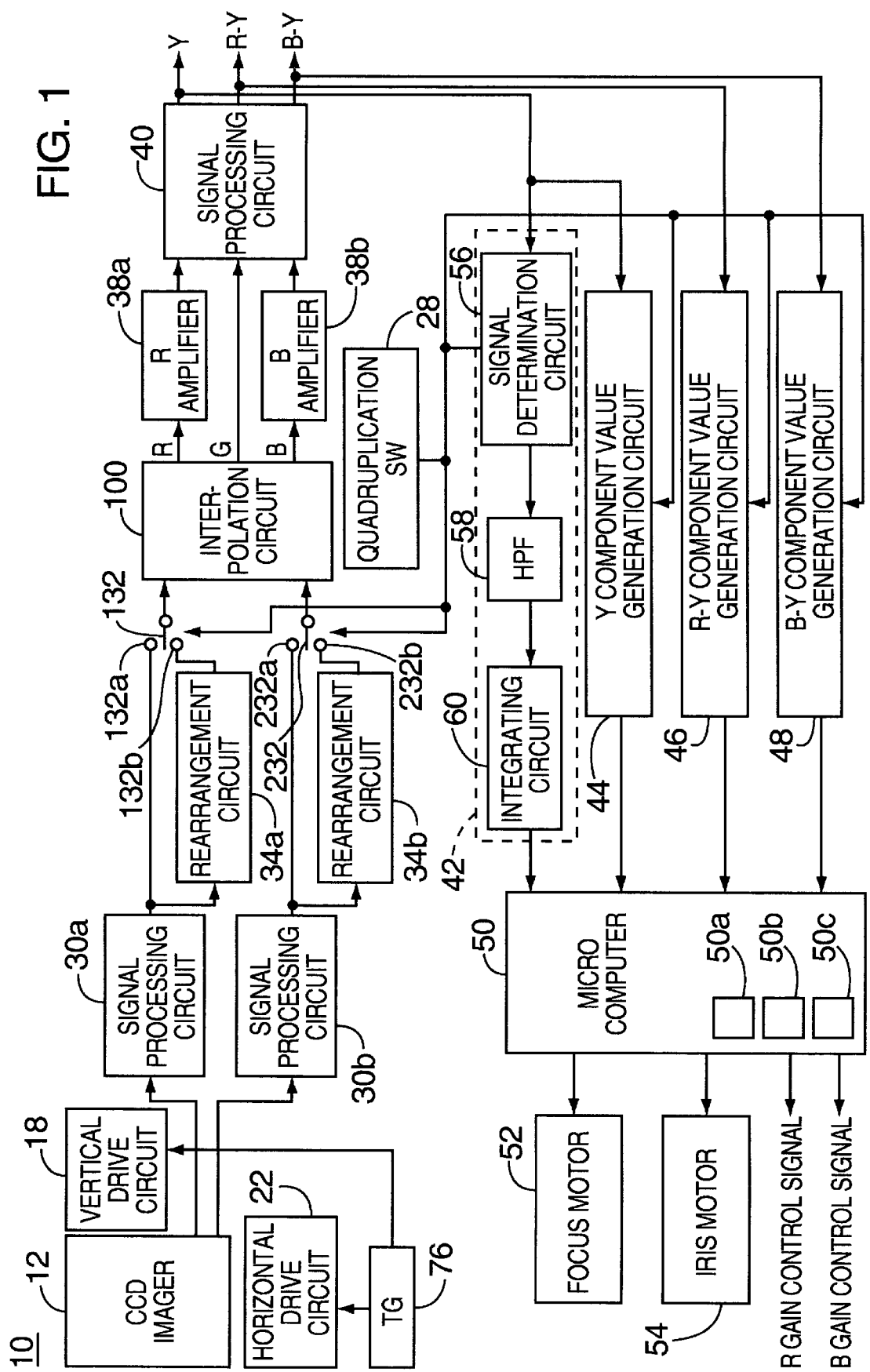
FIG. 1 is a block diagram showing an embodiment according to the present invention.

A digital video camera 10 of this embodiment shown in FIG. 1 includes a CCD imager 12. The CCD imager 12 as shown in FIG. 3, includes a plurality of photo-diodes 14 for photo-electric conversion, a plurality of vertical transfer CCDs 16, and horizontal transfer CCDs 20a and 20b. Each of the vertical transfer CCDs 16 is driven by a vertical drive circuit 18, and each of the horizontal transfer CCDs 20a and 20b is driven by a horizontal drive circuit 22. A drain 24 is provided in parallel to the horizontal transfer CCDs 20a and 20b. The drain 24 is utilized for sweeping-out unnecessary charges in a quadruplication mode. That is, the unnecessary charges applied from the vertical transfer CCDs 16 through sweeping-out control gates 26 are swept-out from the drain 24.

The CCD imager 12 is provided with a mosaic type color filter with primary colors as shown in FIG. 2, and a signal having 480 lines being the same as a vertical pixel number is outputted from the horizontal transfer CCDs 20a and 20b. That is, in order to increase resolution, the CCD imager 12 has dual channel structure in which all pixel data are outputted at every one field without mixing charges of pixels adjacent in a vertical direction.

Figure 4:
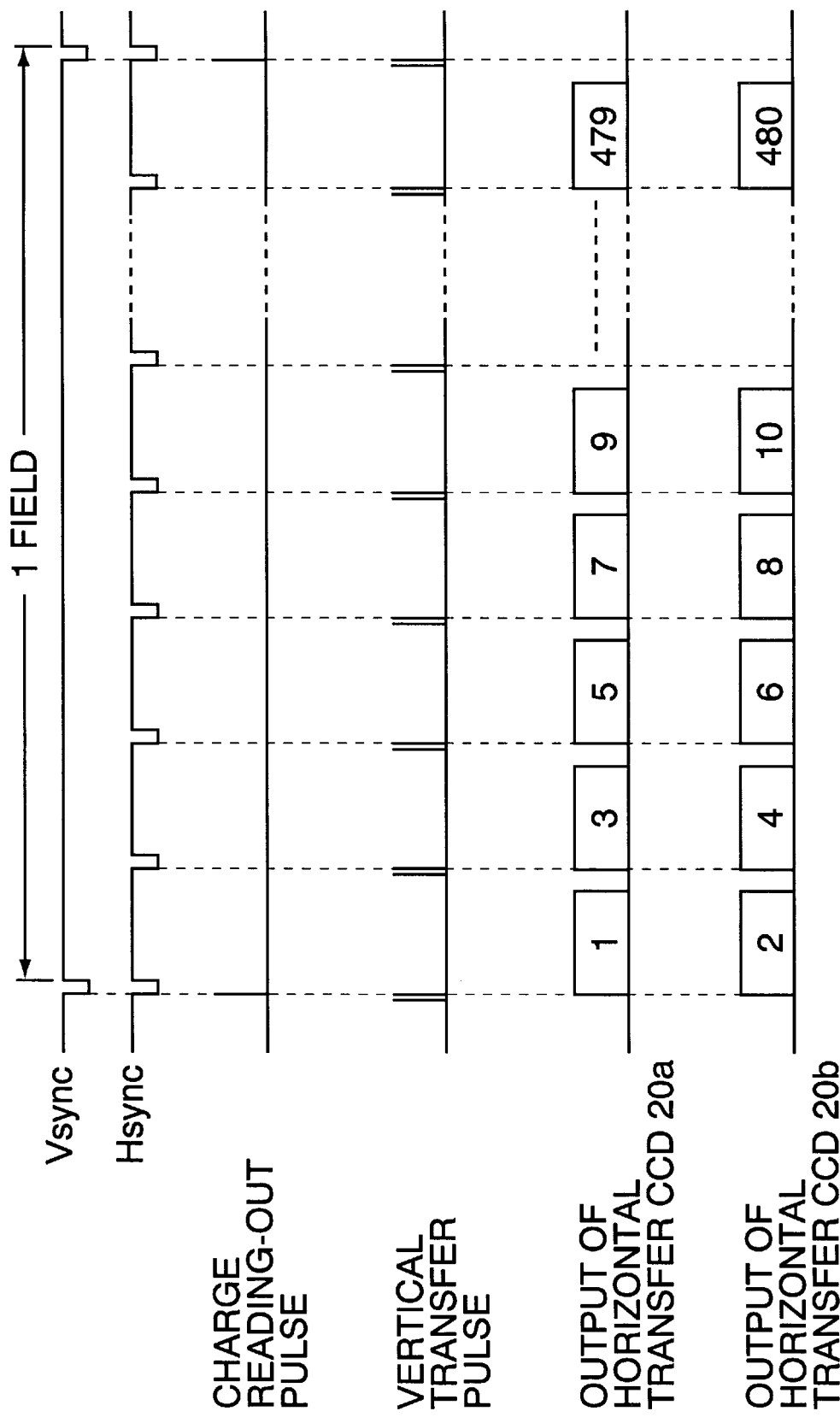
FIG. 4 is a timing chart showing an operation of FIG. 3 embodiment in a normal mode (a first mode)
Figure 13A:
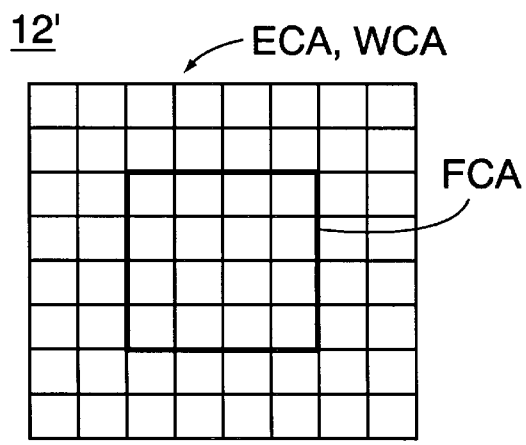
FIG. 13A is an illustrative view showing charge areas for focusing control, iris control and white balance control formed in a charge area of the CCD imager in the normal mode.

In a normal mode as a first mode, the CCD imager 12 is operated in accordance with a field storage mode as shown in FIG. 4. More specifically, charges stored in the photo-diodes 14 are read-out to the vertical transfer CCDs 16 at every one field. Thereafter, a vertical transfer pulse having two succeeding rising edges at one (1) line is supplied to the vertical transfer CCDs 16, and the charges of two (2) lines are simultaneously transferred to the horizontal transfer CCDs 20a and 20b at every one line, respectively. Each of the horizontal transfer CCDs 20a and 20b outputs the charges of one line for one line period in response to a horizontal transfer clock. More specifically, the charges of odd lines such as 1, 3, 5, . . . are outputted from the horizontal transfer CCD 20a as outputs of a first channel, and the charges of even lines such as 2, 4, 6, . . . are outputted from the horizontal transfer CCD 20d as outputs of a second channel. Therefore, all the charges included in all of a charge area 12' shown in FIG. 13A are outputted from the CCD imager 12.

Figure 5:
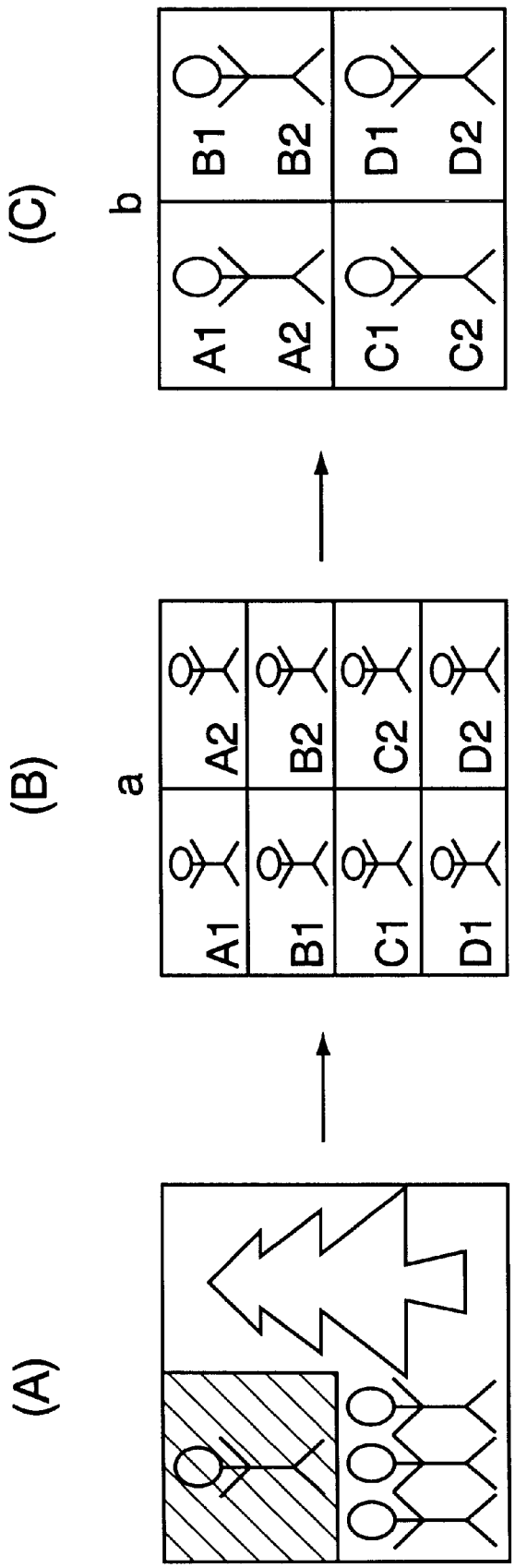
FIG. 5 is an illustrative view showing constitution of images in a quadruplication mode (a second mode)

In contrast, in a case where a quadruplication mode, i.e. a second mode is selected by a quadruplication switch 28 as mode switching means shown in FIG. 1, the charges of an upper-left quarter area of the charge area 12' indicated by diagonal lines in image (A) of FIG. 5 are taken-out and utilized.

Figure 6:
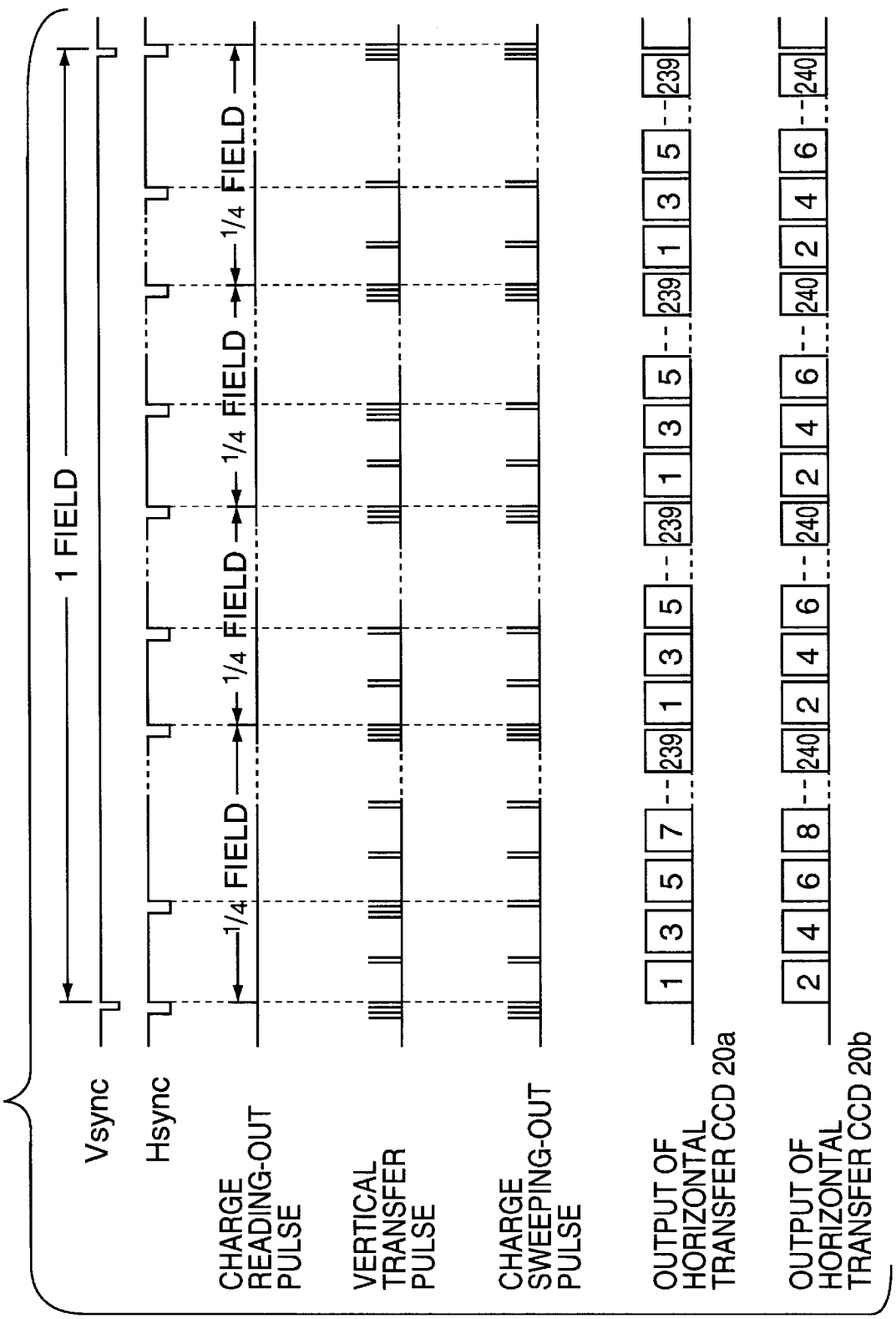
FIG. 6 is a timing chart showing another operation of FIG. 3 embodiment in the quadruplication mode.

In describing the quadruplication mode in detail, a charge reading pulse is supplied to the vertical transfer CCDs 16 at every quarter field as shown in FIG. 6. Furthermore, each of the vertical transfer CCDs 16 is driven by a vertical transfer pulse which has two succeeding rising edges at a half line and is generated 240 times during a sweeping-out period at every quarter field. Accordingly, the charges equal to two lines are transferred to the horizontal transfer CCDs 20a and 20b at every half line. That is, since each of the horizontal transfer CCDs 20a and 20b is driven by a horizontal transfer clock which is the same as the horizontal transfer clock used in the normal mode, the charges of a succeeding line are started to be transferred from the vertical transfer CCDs 16 at a timing that the horizontal transfer CCDs 20a and 20b have finished transferring the first half charges and the second half charges are still remaining.

On the other hand, a sweeping-out pulse is provided at that timing, and the sweeping control gate 26 is opened by the sweeping-out pulse. Accordingly, the second half charges are swept-out from the drain 24 through the sweeping control gate 26. That is, in the quadruplication mode, only the first half charges of each line are outputted from the horizontal transfer CCDs 20a and 20b, and the second half charges of each line are swept-out from the drain 24. More specifically, the first half charges of the odd lines from "1" to "239" are outputted from the horizontal transfer CCD 20a, and the first half charges of the even lines from "2" to "240" are outputted from the horizontal transfer CCD 20b.

Accordingly, the charges corresponding to images shown in a left side of image (B) of FIG. 5 are outputted from the horizontal transfer CCD 20a, the charges corresponding to images shown in a right side of image (B) of FIG. 5 are outputted from the horizontal transfer CCD 20b, and four (4) images as shown in image (C) of FIG. 5 are generated on the basis of such charges.

Thus, the CCD imager 12 is operated in the normal mode when the quadruplication switch 28 is turned-off, and is operated in the quadruplication mode when the quadruplication switch 28 is turned-on. In both cases, the charges, i.e. a camera signal outputted from the CCD imager 12 is applied to signal processing circuits 30a and 30b according to its channel and is subjected to processings such as automatic gain control, analog clamping, A/D conversion, digital clamping and etc. Therefore, a color camera signal is outputted from each of the signal processing circuits 30a and 30b.

The color camera signal from the signal processing circuit 30a is applied to a contact point 132a of a switch 132 as it is, and applied to a contact point 132b of the switch 132 through a rearrangement circuit 34a. The color camera signal from the signal processing circuit 30b is applied to a contact point 232a of a switch 232 as it is, and applied to a contact point 232b of the switch 232 through a rearrangement circuit 34b. The switches 132 and 232 are interlocked with the quadruplication switch 28. That is, the switches 132 and 232 are connected to the contact points 132a and 232a, respectively, when the quadruplication switch 28 is turned-off, and the switches 132 and 232 are connected to the contact points 132b and 232b, respectively, when the quadruplication switch 28 is turned-on. Accordingly, the color camera signals from the signal processing circuits 30a and 30b are outputted from the switches 132 and 232 when the quadruplication switch 28 is turned-off, and the color camera signals from the rearrangement circuits 34a and 34b are outputted from the switches 132 and 232 when the quadruplication switch 28 is turned-on.

Figure 7:
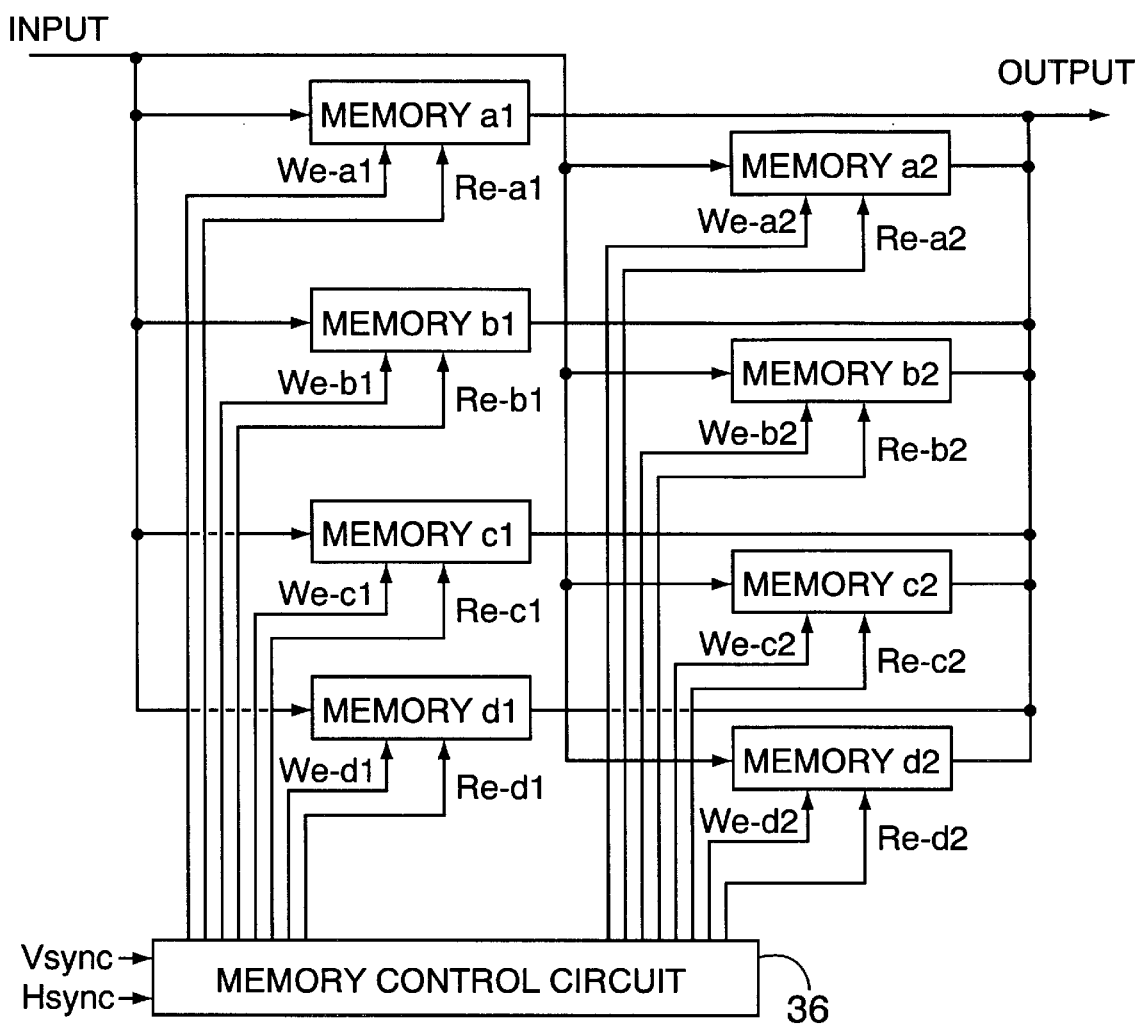
FIG. 7 is a block diagram showing a rearrangement circuit of FIG. 1 embodiment.
Figure 8:
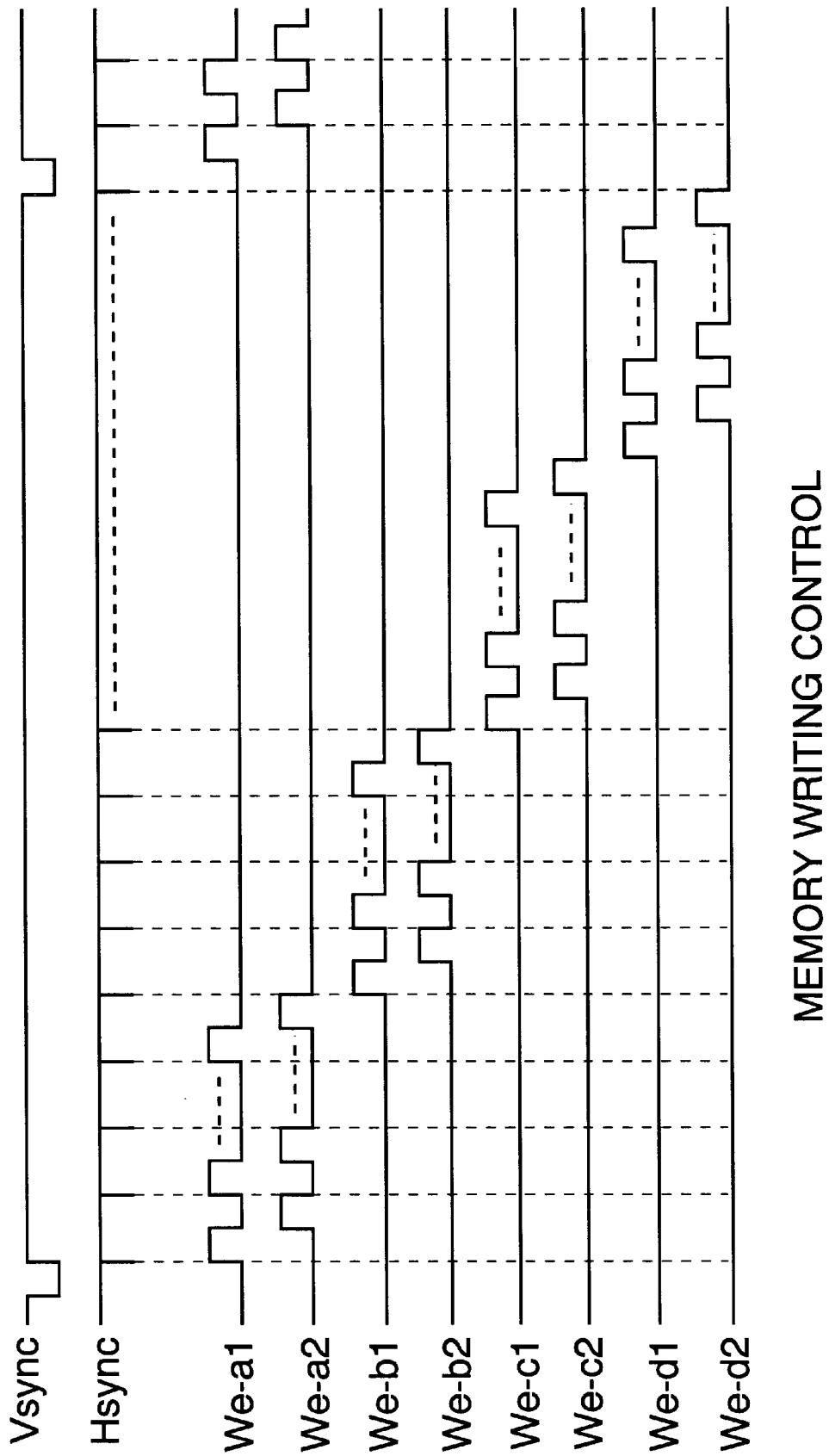
FIG. 8 is a timing chart showing a writing operation to memories in FIG. 7 embodiment.

The rearrangement circuit 34a includes eight (8) memories a1, a2, b1, b2, c1, c2, d1 and d2, and a memory control circuit 36 as shown in FIG. 7. Each of the memories a1, a2, b1, b2, c1, c2, d1 and d2 has a memory capacity equal to one-eighth the charge area 12', and stores a color camera signal corresponding to each of eight areas A1, A2, B1, B2, C1, C2, D1 and D2 shown in image (C) of FIG. 5. More specifically, the color camera signals corresponding to the areas A1 and A2 are alternately written into the memories a1 and a2 at every half line in a first quarter field in response to write enable signals We-a1 and We-a2. The color camera signals corresponding to the areas B1 and B2 are alternately written into the memories b1 and b2 at every half line in the second quarter field in response to write enable signals We-b1 and We-b2. The color camera signals corresponding to the areas C1, C2, D1 and D2 are succeedingly written into the memories c1, c2, d1 and d2 in response to write enable signals We-c1, We-c2, We-d1 and We-d2 in the same manner.

Figure 9:
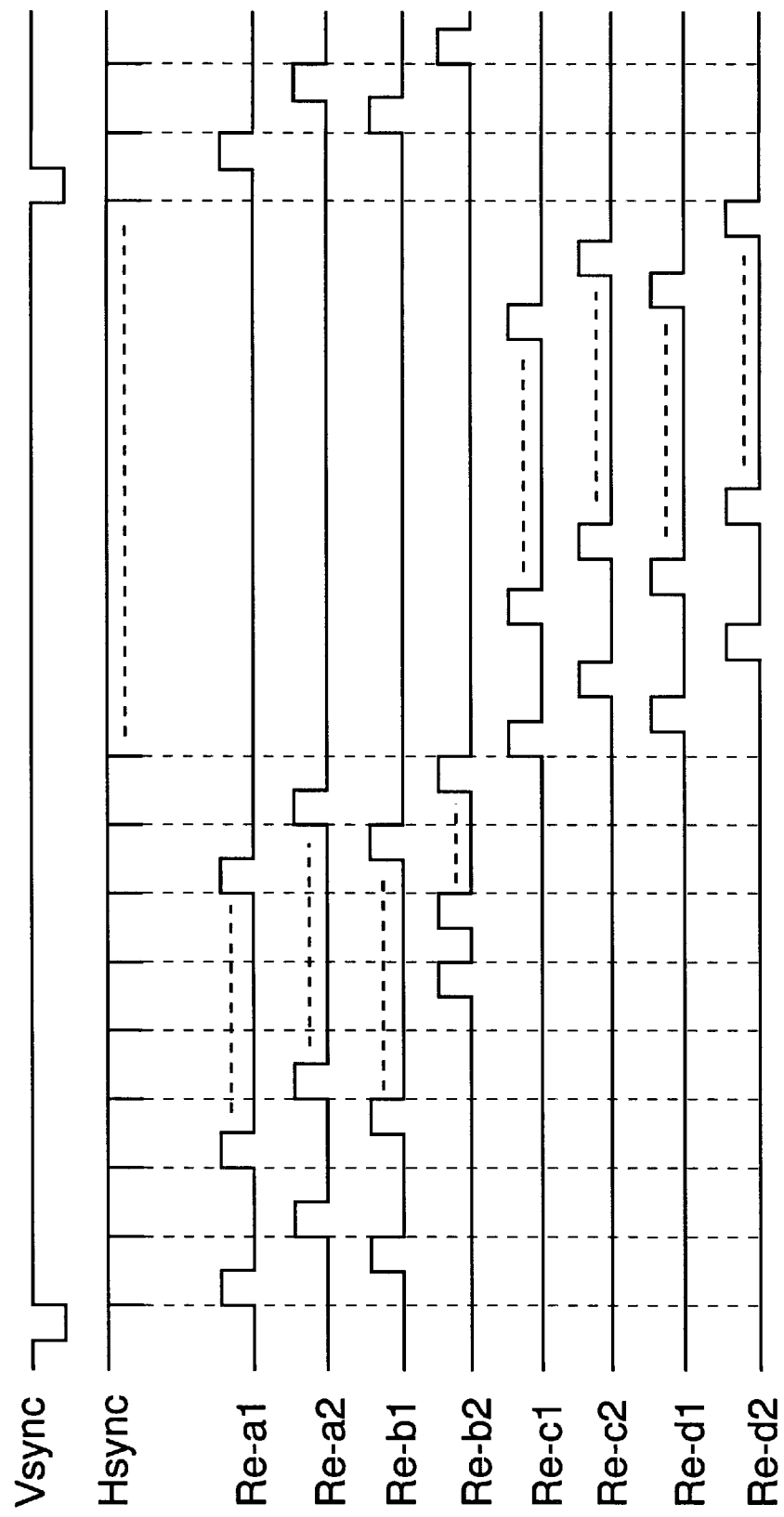
FIG. 9 is a timing chart showing a reading operation from the memories in FIG. 7 embodiment.

Then, read enable signals Re-a1, Re-a2, Re-b1 and Re-b2 are repeatedly applied to the memories a1, b1, a2 and b2 in this order at the first half field as shown in FIG. 9. Therefore, the color camera signals are read-out from the memories a1, b1, a2 and b2. Read enable signals Re-c1, Re-c2, Re-d1 and Re-d2 are repeatedly applied to the memories c1, d1, c2 and d2 in this order in the second half field, and therefore, the color camera signals are read-out from the memories c1, d1, c2 and d2. In addition, since the rearrangement circuit 34b is similar to the rearrangement circuit 34a, a duplicate description is omitted. Thus, the color camera signals corresponding to the images shown in FIG. 5(C) are outputted from the rearrangement circuits 34a and 34b.

Figure 10:
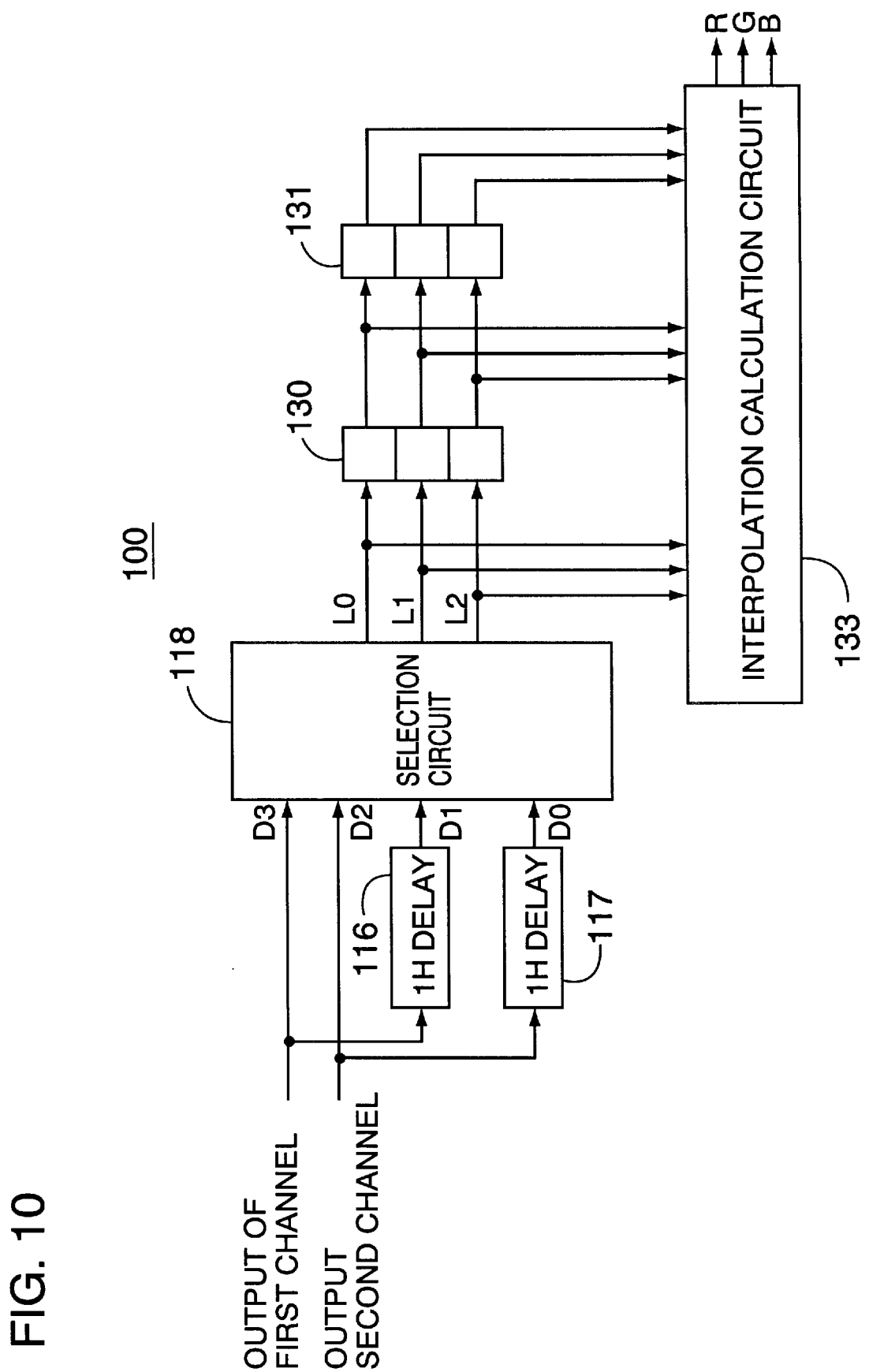
FIG. 10 is a block diagram showing an interpolation circuit of FIG. 1 embodiment.

The color camera signals outputted from the switches 132 and 232 are inputted to an interpolation circuit 100. The interpolation circuit 100 is constituted as shown in FIG. 10. More specifically, the output of the first channel inputted through the switch 132 is directly applied to a selection circuit 118 as a digital signal D3, and to the selection circuit 118 as a digital signal D1 via a 1H delay 116. The output of the second channel inputted through the switch 232 is directly supplied to the selection circuit 118 as a digital signal D2, and to the selection circuit 118 via a 1H delay 117 as a digital signal D0. The 1H delays 116 and 117 are memories capable of storing the outputs of the first channel and the second channel for a 1H (one line) period, and the outputs of the first channel and the second channel which are delayed for the 1H period can be obtained through the 1H delays 116 and 117. In addition, writing operations of the 1H delays 116 and 117 and reading operations of the 1H delays 116 and 117 are executed in synchronization with operations of the horizontal transfer CCD 20a and 20b.

The selection circuit 118 selects some digital signals equal to three lines out of the digital signals D0 to D3 of adjacent four (4) lines in accordance with whether the current field is an odd field or an even field. The digital signals D1 to D3 are outputted as outputs L0 to L2 at the odd field, and the digital signals D0 to D2 are outputted therefrom as outputs L0 to L2 at the even field.

The outputs L0 to L2 of the selection circuit 118 are directly inputted to an interpolation calculation circuit 133 and a delay 130, and an output of the delay 130 is inputted to a delay 131. Each of the delays 130 and 131 has a delay period equal to one pixel, and outputs of the delays 130 and 131 are inputted to the interpolation calculation circuit 133. Accordingly, successive three pixels in each of the adjacent three lines, that is, signals equal to nine pixels in total are simultaneously inputted to the interpolation calculation circuit 133.

Since filter elements each of which has a primary color are arranged in a mosaic fashion to form the mosaic type color filter shown in FIG. 2, only one color signal out of an R signal, a G signal and a B signal is obtained from each pixel, and therefore, each of remaining color signals of each pixel is obtained by performing interpolation calculation with using around pixels by the interpolation calculation circuit 133. A relationship between an arrangement of the pixels on the mosaic type color filter and selected pixels is shown in FIG. 11. As described above, the digital signal D1 to D3 are selected at the odd field, and therefore, a pixel pattern of the odd number pixels is shown in pattern (b) in FIG. 11, and a pixel pattern of even number pixels is shown in pattern (c) in FIG. 11. In contrast, since the digital signals D0 to D2 are selected at the even field, a pixel pattern of odd number pixels is shown in pattern (d) in FIG. 11, and a pixel pattern of the even number pixel is shown in pattern (e) in FIG. 11. In addition, pattern (a) in FIG. 11 shows a portion of the arrangement of the pixels on the mosaic type color filter.

As understood from FIG. 10, if it is determined whether the current field is the odd field or the even field and the current pixel is an odd number pixel or an even number pixel, any one of the pixel patterns shown in patterns (b) through (e) in FIG. 11 is determined. Since the G signal is obtained from a center pixel in a case of FIG. 11(b), for example, the G signal is outputted from the center pixel as it is. Since two R signals are obtained from two pixels at the top and the bottom of a middle vertical line, an average of the two R signals is outputted as the R signal of the center pixel. Since two B signals are obtained from two pixels of the left side and the right side of a middle horizontal line, an average of the two B signals is outputted as the B signal of the center pixel. Furthermore, in a case of pattern (c), in FIG. 11 each of the R signal and the G signal of the center pixel is obtained by averaging the same signals of four pixels adjacent to the center pixel.

Thus, by interpolating lacking two color signals of a pixel to be processed on the basis of the same color signals of around pixels, the R signal, the G signal and the B signal of each pixel can be obtained. Though the G signal is directly applied to a signal processing circuit 40, each of the R signal and the B signal is applied to the signal processing circuit 40 through each of an R amplifier 38*a* in which a gain is controlled by an R gain control signal and a B amplifier 38*b* in which a gain is controlled by a B gain control signal. The gain of the R signal and the gain of the B signal are controlled in such manners, whereby a white balance is suitably adjusted. A luminance signal Y and color-difference signals R-Y and B-Y (an R-Y signal and a B-Y signal) are generated by the signal processing circuit 40 on the basis of the R signal, the G signal and the B signal, whereby an image or images according to such the signals can be displayed on image 55 on a monitor (not shown). In addition, the monitor is not a view finder but a display unit of a television receiver, for example.

The luminance signal Y is applied to a high-frequency luminance component value generation circuit 42 and a luminance component value generation circuit 44, and the R-Y signal is applied to an R-Y component value generation circuit 46, and the B-Y signal is applied to a B-Y component value generation circuit 48. In addition, each of the high-frequency luminance component value generation circuit 42, the luminance component value generation circuit 44, the R-Y component value generation circuit 46 and the B-Y component value generation circuit 48 operates as first generating means or second generating means.

Figure 12A:
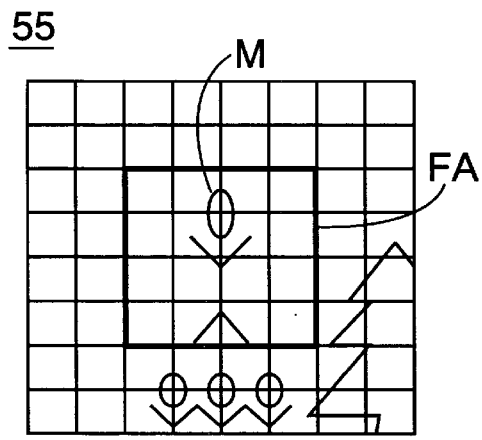
FIG. 12A is an illustrative view showing an image displayed on a monitor in the normal mode.
Figure 12B:
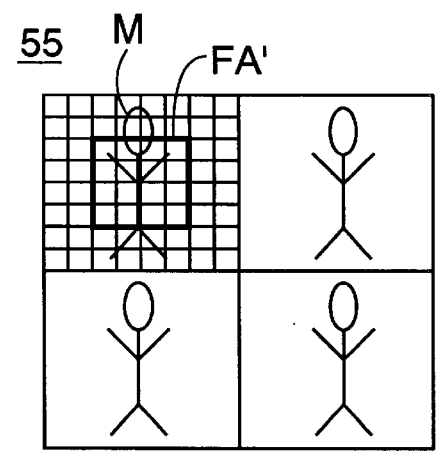
FIG. 12B is an illustrative view showing images displayed on the monitor in the quadruplication mode.

In the high-frequency luminance component value generation circuit 42, a signal determination circuit 56, as first determination means or second determination means determines whether or not the inputted luminance signal is a luminance signal to be outputted from a focus area FA or FA' formed on the monitor 55 as shown in FIG. 12A or 12B. Furthermore, an integrating circuit 60 integrates a high-frequency component of the luminance signal obtained by passing through a high-pass filter 58. Accordingly, the high-pass filter 58 and the integrating circuit 60 operate as first predetermined component value generating means or second predetermined component value generating means. An integration value obtained by the integrating circuit 60 is a high-frequency luminance component value, i.e. a first predetermined component value or a second predetermined component value, and a microcomputer 50 as adjusting means controls a focus motor 52 on the basis of the high-frequency luminance component value. Therefore, a focus which is one of image quality associated elements can be adjusted.

Figure 20A:
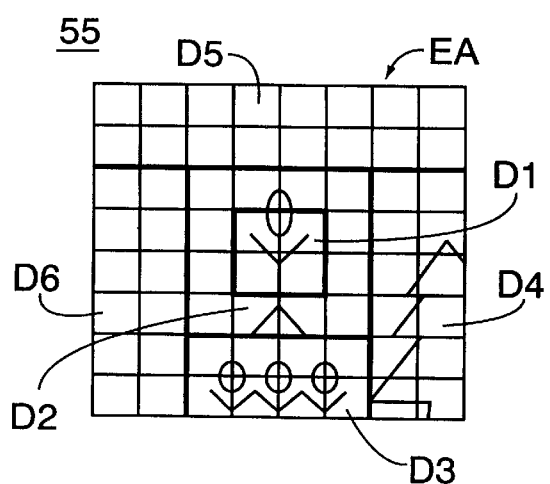
FIG. 20A is an illustrative view showing an image displayed on the monitor in the normal mode.
Figure 20B:
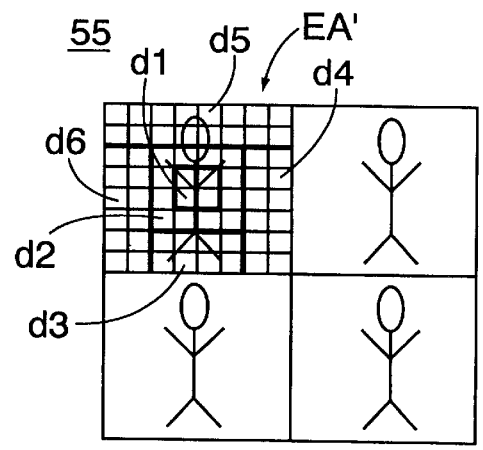
FIG. 20B is an illustrative view showing images displayed on the monitor in the quadruplication mode.

The luminance component value generation circuit 44 integrates, for each division area, luminance signals to be outputted from division areas D1 to D6 constituting an iris area EA and formed on the monitor 55 as shown in FIG. 20A or division areas d1 to d6 constituting an iris area EA' and formed on the image 55 as shown in FIG. 20B, and each of integration values is regarded as a luminance component value, i.e. the first predetermined component value or the second predetermined component value. The microcomputer 50 controls an iris motor 54 on the basis of the luminance component value obtained in such a manner. That is, the microcomputer 50 as adjusting means adjusts an iris included in the image quality associated elements.

Figure 24A:
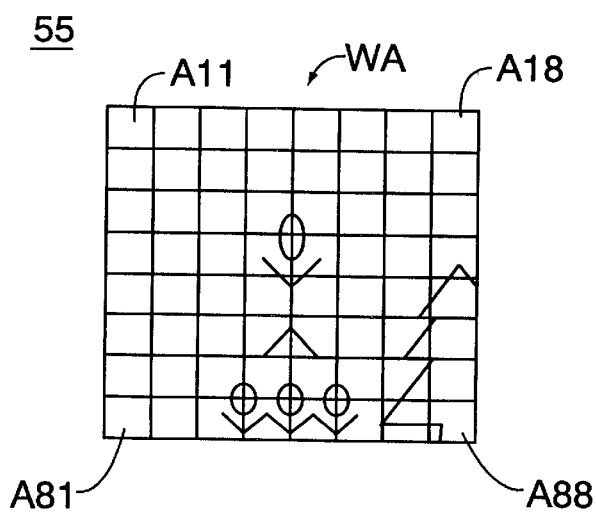
FIG. 24A is an illustrative view showing an image displayed on the monitor in the normal mode.
Figure 24B:
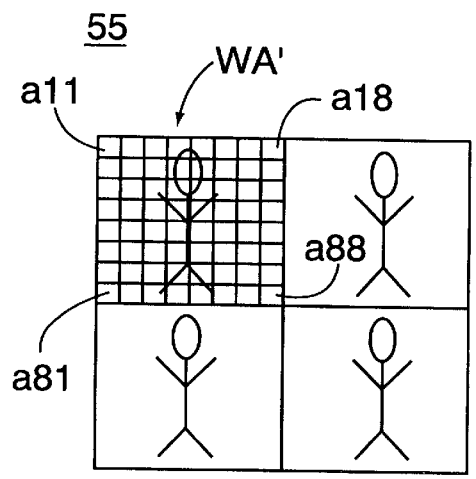
FIG. 24B is an illustrative view showing images displayed on the monitor in the quadruplication mode.

The R-Y component value generation circuit 46 integrates, for each of division area, R-Y signals to be outputted from division areas A11 to A88 constituting an white balance area WA and formed in the image 55 as shown in FIG. 24A or division areas a11 to a88 constituting an white balance area WA' and formed in the image 55 as shown in FIG. 24B, and each of integration values is regarded as an R-Y component value, i.e. the first predetermined component value or the second predetermined component value. The B-Y component value generation circuit 48 also integrates B-Y signals to be outputted from the division areas A11 to A88 or the division areas a11 to a88 in the same manner as the R-Y component value generation circuit 46, and each of integration values is regarded as a B-Y component value, i.e. the first predetermined component value or the second predetermined component value. The microcomputer 50 as adjusting means generates the R gain control signal and the B gain control signal on the basis of the R-Y component values and the B-Y component values, respectively so as to control each of the gains of the R amplifier 38*a* and the B amplifier 38*b*. Therefore, a white balance which is one of the image quality associated elements can be adjusted.

Figure 14:
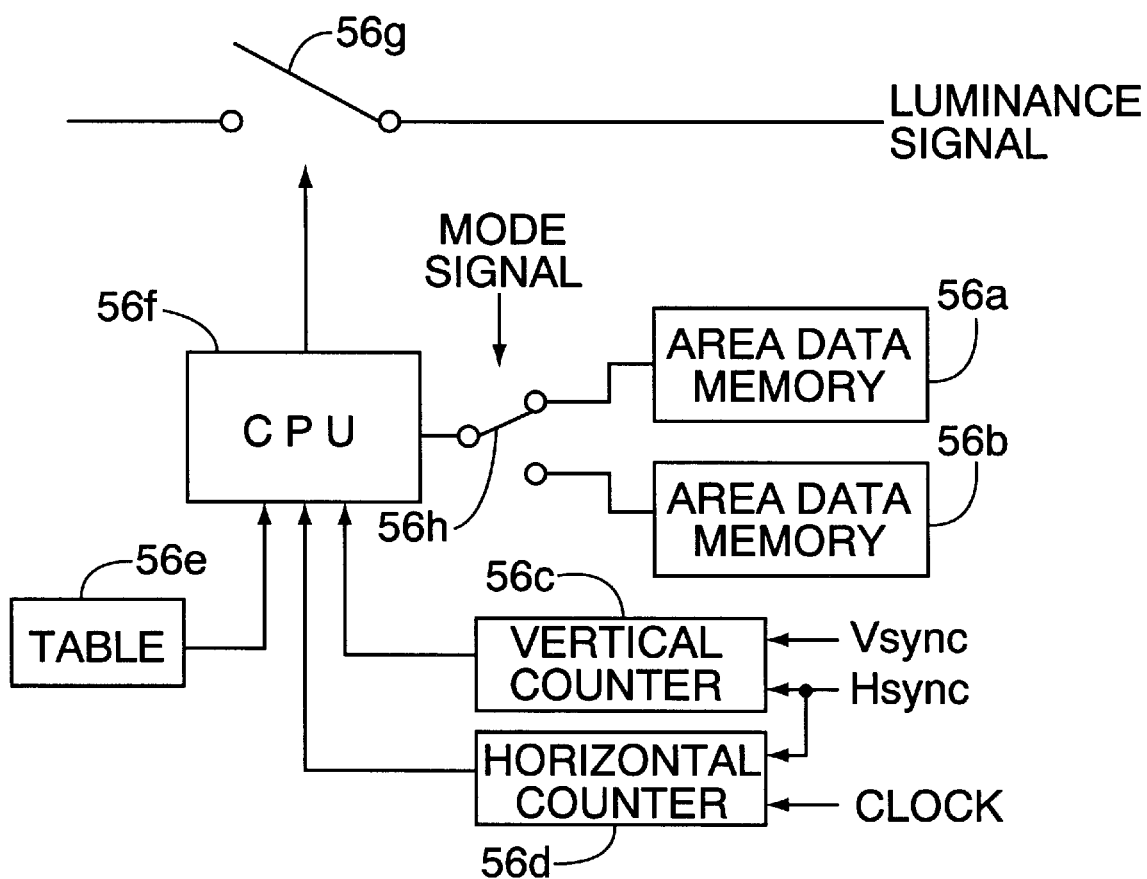
FIG. 14 is a block diagram showing a signal detection circuit of FIG. 1 embodiment.

The signal determination circuit 56, included in the high-frequency luminance component value generation circuit 42 is constituted as shown in FIG. 14. More specifically, a vertical counter 56*c*, a horizontal counter 56*d* and a table 56*e* are directly connected to a CPU 56*f*, and area data memories 56*a* and 56*b* are connected to the CPU 56*f* through a switch 56*h*. Area data of the focus area FA shown in FIG. 12A is stored in the area data memory 56*a*, and area data of the focus area FA' shown in FIG. 12B is stored in the area data memory 56*b*. The focus area FA is constituted by sixteen (16) small areas located at a center of the image 55 out of sixty-four (64) small areas formed by dividing the image 55 into eight (8) in a vertical direction and a horizontal direction, and the focus area FA is a first monitor area. Furthermore, the focus area FA' is constituted by sixteen (16) small areas located at a center of an upper left quarter area of the image 55 out of sixty-four (64) small areas formed by dividing the upper left quarter area into eight (8) in the vertical direction and the horizontal direction, and the focus area FA' is a second monitor area.

Figure 13B:
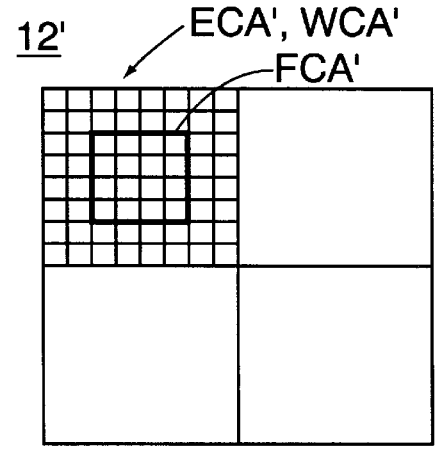
FIG. 13B is an illustrative view showing charge areas for focusing control, iris control and white balance control formed in the charge area of the CCD imager in the quadruplication mode.

The focus area FA corresponds to a charge area FCA for focusing control and formed at a center of the charge area 12' as shown in FIG. 13A, and the focus area FA' corresponds to a charge area FCA' for focusing control and formed at a center of an upper left quarter area of the charge area 12' as shown in FIG. 13B.

Then, the charge area FCA is a charge area, and the charge area FCA' is a second charge area.

In addition, as understood from FIG. 3, since the horizontal transfer CCDs 20*a* and 20*b* are provided at lower side of the CCD imager 12, an optical image upside down is irradiated onto the charge area 12'. Accordingly, the charge area FCA' and a charge area ECA' for iris control and a charge area WCA' for white balance control as described below are actually formed on a lower left quarter area of the charge area 12' ; however, this embodiment is, for convenience, described as the charge areas FCA', ECA' and WCA' are formed on the upper left quarter area for convenience.

The vertical counter 56*c* is incremented by a horizontal synchronization signal and reset by a vertical synchronization signal, and the horizontal counter 56*d* is incremented by a clock which has a rising edge for each pixel and reset by the horizontal synchronization signal. Furthermore, data of pixel positions on the monitor 55 corresponding to count values of the vertical counter 56*c* and the horizontal counter 56*d* is stored in the table 56*e*. That is, since there is an error between the respective count values of the vertical counter 56*c* and the horizontal counter 56*d* and the respective area data stored in the area data memories 56*a* and 56*b*, the table 56*e* is used for canceling such the error. In addition, the switch 56*h* is controlled by a mode signal from the quadruplication switch 28, such that the switch 56*h* is connected to the area data memory 56a in the normal mode, and to the area data memory 56b in the quadruplication mode.

Figure 15:
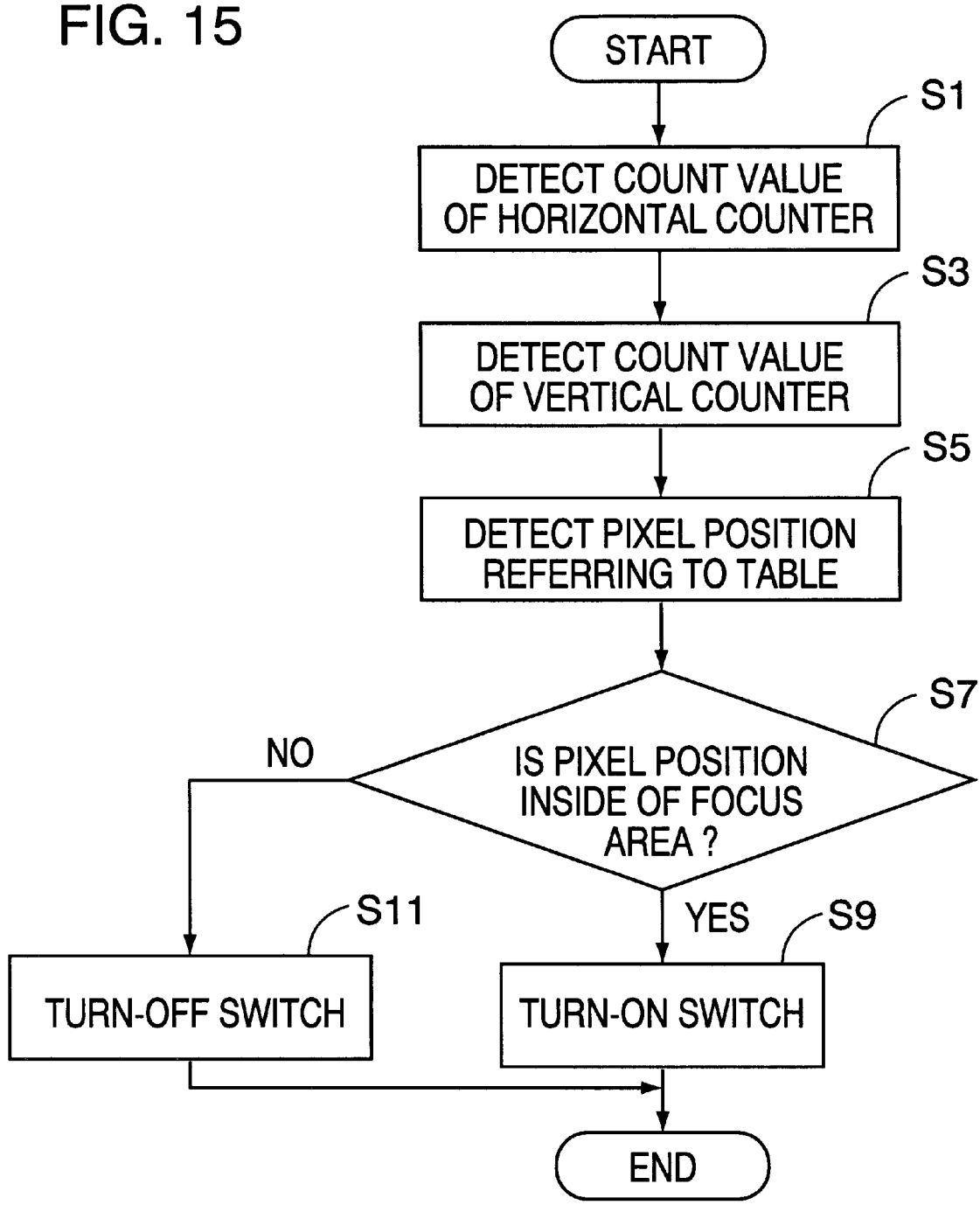
FIG. 15 is a flowchart showing a portion of an operation of FIG. 13 embodiment.

The CPU 56f turns-on/off a switch 56g by executing a program of a flowchart shown in FIG. 15. According to the flowchart, each of the count values of the horizontal counter 56d and the vertical counter 56c is detected in each of steps S1 and S3, and the count values are converted into data of the pixel position from which a luminance signal which is currently being inputted is to be outputted with referring to the table 56e in a step S5. Succeedingly, it is determined whether or not the pixel position is inside of the focus area FA or FA' by comparing the area data stored in the area data memory 56a or 56b of the pixel position in a step S7. Then, if "YES", the switch 56g is turned-on in a step S9, and if "NO", the switch 56g is turned-off in a step S11.

Thus, the luminance signal outputted from the focus area FA is determined as a first video signal in the normal mode, and the luminance signal outputted from the focus area FA' is determined as a second video signal in the quadruplication mode. In addition, the area data memory 56a operates as a first memory, and the area data memory 56b operates as a second memory. Furthermore, each of the vertical counter 56c, the horizontal counter 56d, the table 56e and the CPU 56f operates as first position detecting means or second position detecting means, and the CPU 56f operates as first comparison means or second comparison means and first control means or second control means.

Figure 16:
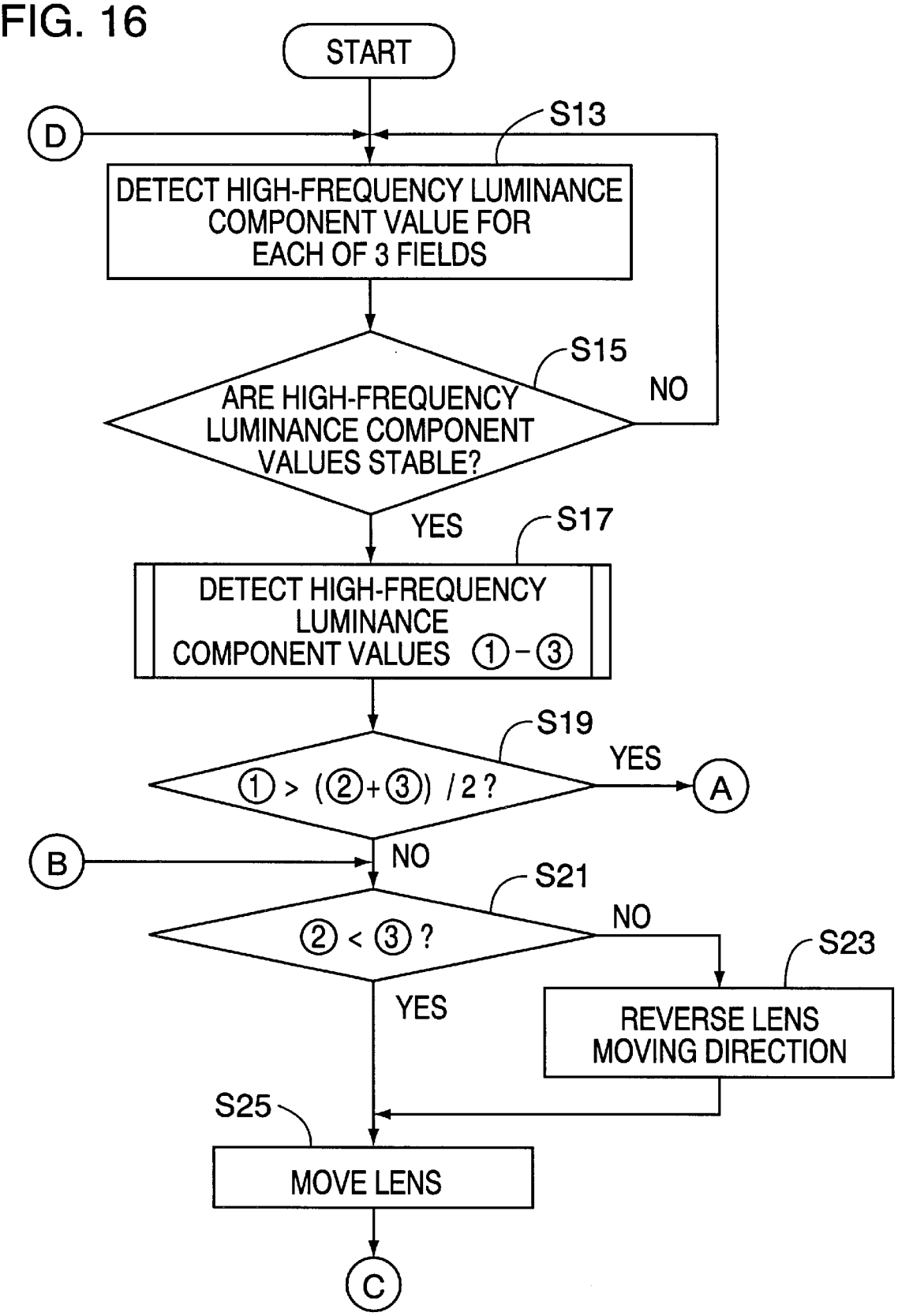
FIG. 16 is a flowchart showing a portion of an operation of a microcomputer of FIG. 1 embodiment.
Figure 17:
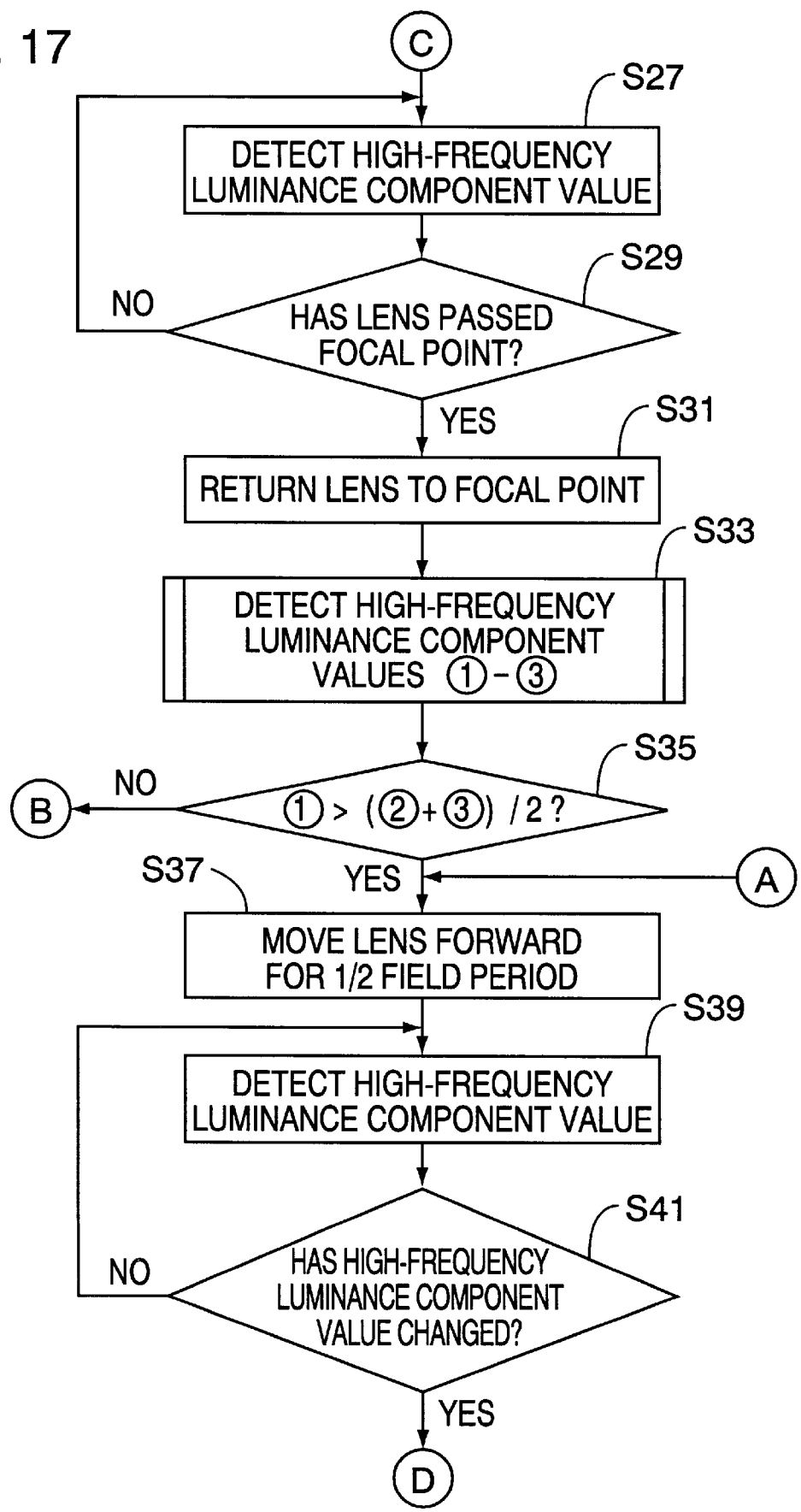
FIG. 17 is a flowchart showing another portion of the operation of the microcomputer.
Figure 18:
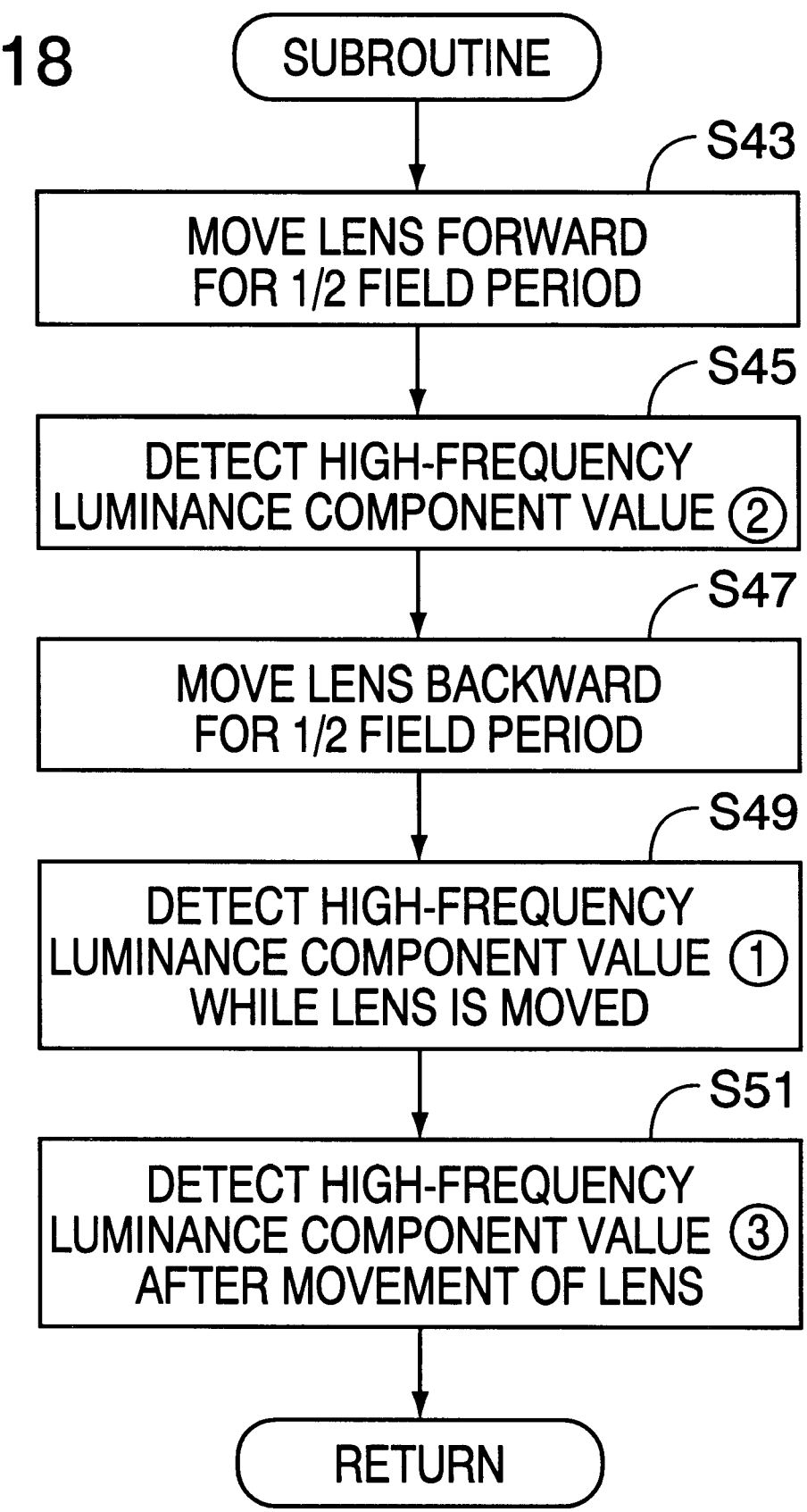
FIG. 18 is a flowchart showing the other portion of the operation of the microcomputer.

The microcomputer 50 controls the focus motor 52 by executing a program indicated by flowcharts shown in FIG. 16 to FIG. 18. According to the flowcharts, the high-frequency luminance component values equal to three (3) fields are detected in a step S13, and it is determined whether or not the high-frequency luminance component values are stable in a step S15. If "NO" in the step S15, an attitude of the video camera 10 is regarded as unstable, and a processing operation returns back to the step S13; however, if "YES", the attitude of the video camera 10 is regarded as stable, a subroutine shown in FIG. 18 is processed in a step S17.

More specifically, a focus lens (not shown) is moved forward for a half field period by the focus motor 52 in a step S43, and a high-frequency luminance component value ② is detected at the lens position in a step S45. Succeedingly, the focus lens is moved backward for a half field period in a step S47, and a high-frequency luminance component value ① is detected in a step S49 while the focus lens is moved. Thereafter, a high-frequency luminance component value ③ is detected in a step S51 after movement of the focus lens. By moving the focus lens in such a manner, the high-frequency luminance component values ① to ③ as shown in FIG. 19A are obtained, for example.

Figure 19A:
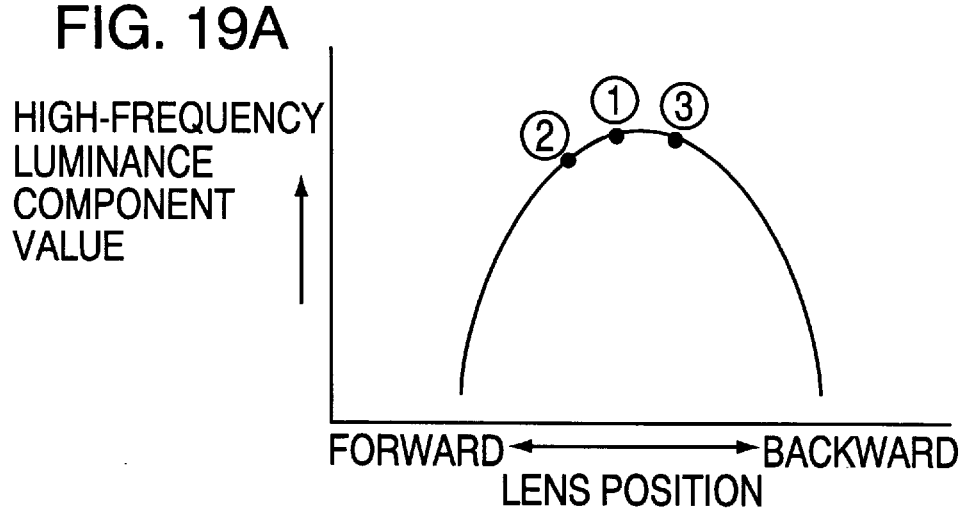
FIGS. 19A, 19B, and 19C are graphs each showing a high-frequency luminance component value in relation to a lens position.

Returning back to FIG. 16, it is determined whether or not the high-frequency luminance component value ① is larger than an average value of the high-frequency luminance component values ② and ③ in a step S19, if "YES", it is regarded as that the high-frequency luminance component values ① to ③ have a relationship shown in FIG. 19A, and the focus lens is moved forward for half field period in a step S37. Then, a high-frequency luminance component value is detected in a step S39, and it is determined whether or not the high-frequency luminance component value is changed in comparison with that of a preceding time. Then, if "YES", the processing operation returns back to the step S13; however, if "NO", the processing operation returns back to the step S39. That is, if "YES" in the step S19, the focus lens is returned to a focal point, and an operation of the movement of the focused lens is stopped unless the high-frequency luminance component value changes.

Figure 19B:
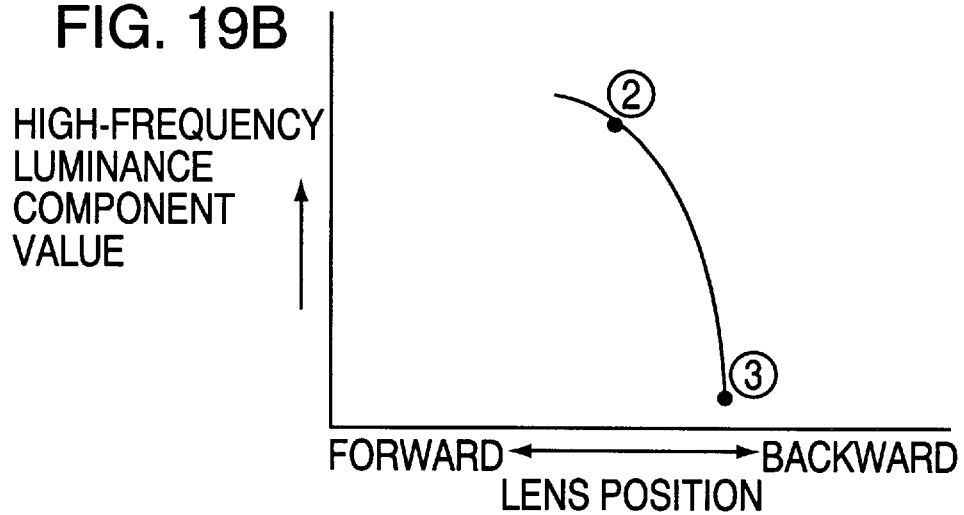
Figure 19C:
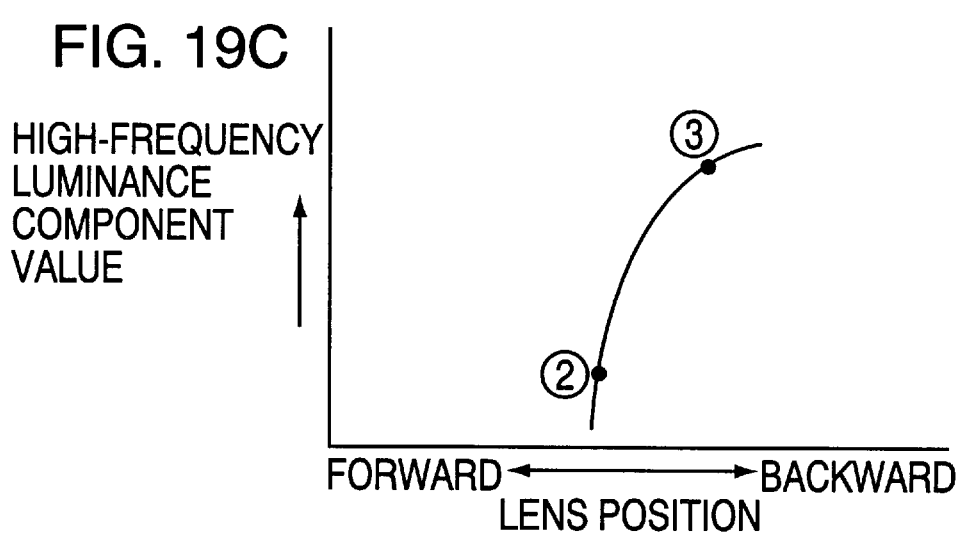

On the other hand, if "NO" in the step S19, it is regarded as that the high-frequency luminance component values ② and ③ have a relationship shown in FIG. 19B or FIG. 19C, and the high-frequency luminance component values ② and ③ are compared with each other in a step S21. Then, if the relationship shown in FIG. 19B, a moving direction of the focus lens is inverted in a step S23; however, if the relationship shown in FIG. 19C, the processing operation proceeds to a step S25 without inverting the moving direction of the focus lens. Accordingly, the focus lens is moved in a determined direction in the step S25, and thereafter, the high-frequency luminance component value is detected in a step S27. It is determined whether or not the focus lens passed the focal point in a step S29, and if "NO", the high-frequency luminance component value is succeedingly detected by returning back to the step S27, and if "YES", the focus lens is returned back to the focal point in a step S31, and the subroutine shown in FIG. 18 is once executed in a step S33.

Then, the same processing as that of the step S19 is executed in a step S35, and if "NO", the processing operation returns back to the step S21; however, if "YES", the processing operation proceeds to the step S37.

Thus, since the high-frequency luminance component value is generated from the focus area FA or FA' in accordance with the normal mode or the quadruplication mode, the microcomputer 50 suitably focuses the focus lens on the main object M shown in FIGS. 12A and B without executing difference processing for each mode.

Figure 21:
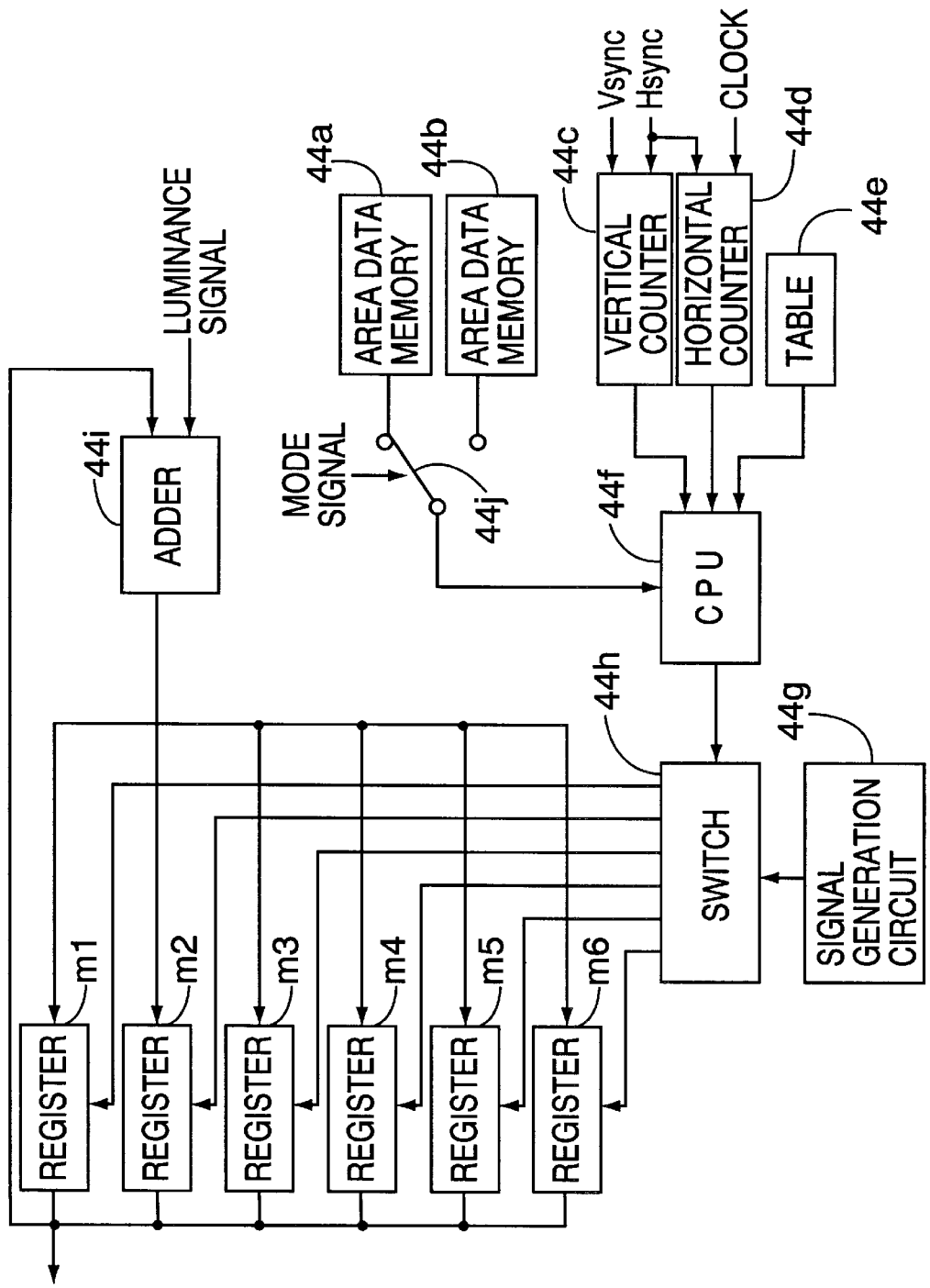
FIG. 21 is a block diagram showing a luminance component value generation circuit (a Y component value generation circuit) of FIG. 1 embodiment.

The luminance component value generation circuit 44 is constituted as shown in FIG. 21. More specifically, area data memories 44a and 44b are connected to a CPU 44f via a switch 44j controlled by the mode signal from the quadruplication switch 28, and a vertical counter 44c, a horizontal counter 44d and a table 44e are directly connected to the CPU 44f. Area data of the respective division areas D1 to D6 formed on the monitor 55 as shown in FIG. 20A are stored in the area data memory 44a, and area data of the respective division areas d1 to d6 formed on the upper left quarter area of the monitor 55 as shown in FIG. 20B are stored in the area data memory 44b. In addition, the iris area EA constituted by the division areas D1 to D6 is the first monitor area, and the iris area EA' constituted by the division areas d1 to d6 is the second monitor area.

In addition, the iris area EA corresponds to the charge area ECA having the same scale as the charge area 12' shown in FIG. 13A, and the iris area EA' corresponds to the charge area ECA' formed on the upper left quarter area of the charge area 12' as shown in FIG. 13B. Then, the charge area ECA is the first charge area, and the charge area ECA' is the charge area.

The vertical counter 44c and the horizontal counter 44d are operated in the same manner as the vertical counter 56c and the horizontal counter 56d of the signal determination circuit 56, and the table 44e has the same data as that of the table 56e. Accordingly, by converting the count values into data stored in the table 44e, it is possible to correct an error between the count values of the vertical counter 56c and the horizontal counter 56d and the pixel position from which a luminance signal is to be outputted.

The switch 44h is controlled by the CPU 44f, whereby a reading signal and a writing signal outputted from a signal generation circuit 44g are applied to any of registers m1 to m6. Accordingly, data read-out from any of the registers m1 to m6 is added to the luminance signal by an adder 44i, and added data is written into the same register. Since the registers m1 to m6 are initialized by the vertical synchronization signal, integration values of luminance signals outputted from the division areas D1 to D6 or the division areas d1 to d6 are obtained by the registers m1 to m6, respectively.

Figure 22:
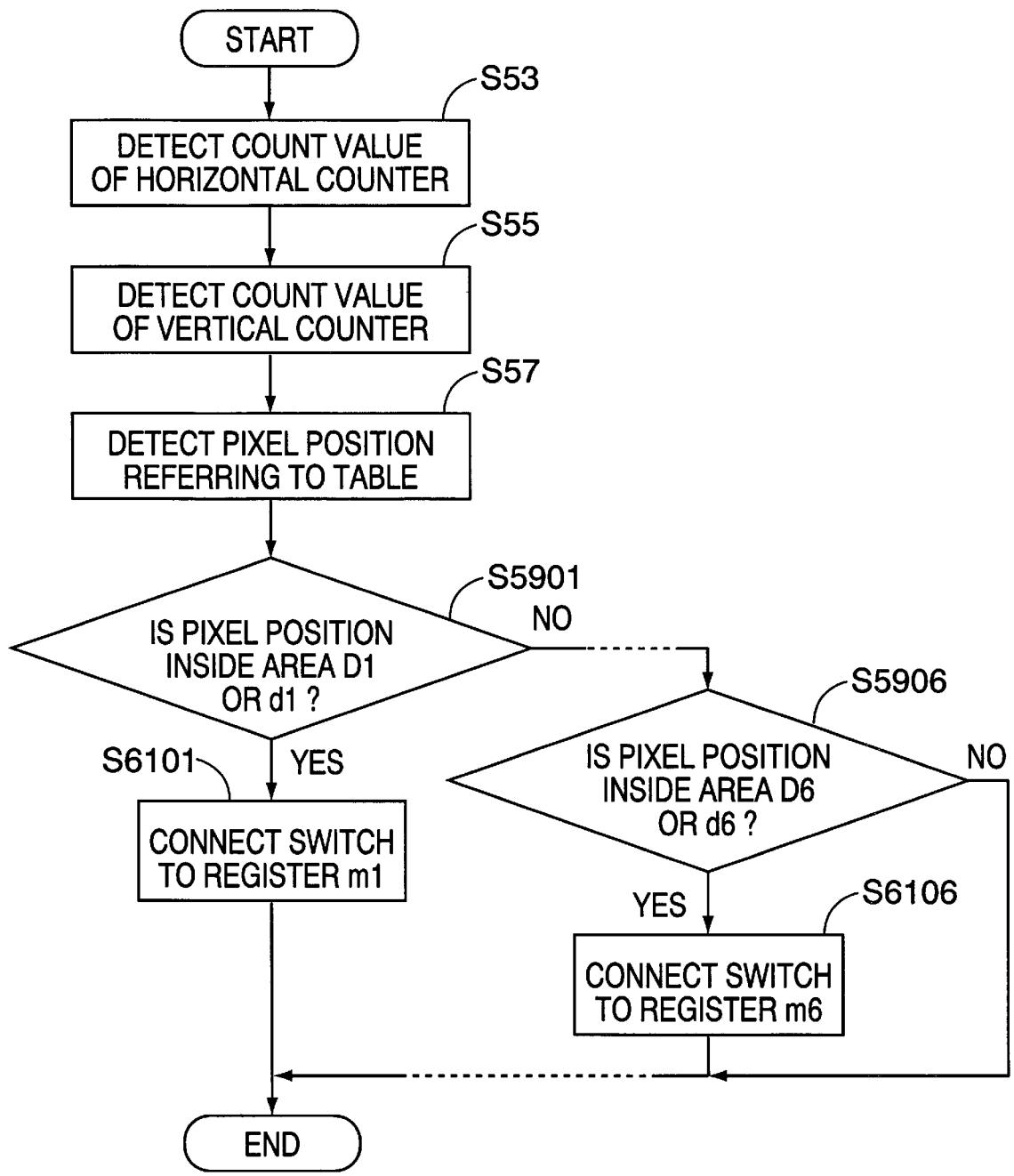
FIG. 22 is a flowchart showing a portion of an operation of FIG. 21 embodiment.

The CPU 44f controls the switch 44h by executing a program of a flowchart shown in FIG. 22. According to the flowchart, each of the count values of the horizontal counter 44d and the vertical counter 44c is detected in each of steps S53 and S55, and the count values are converted into the pixel position with using the table 44e in a step S57. Thereafter, one of the division areas D1 to D6 in which the pixel position exists is determined in steps S5901 to S5906 in the normal mode, and one of the division areas d1 to d6 in which the pixel position exists is determined in the steps S5901 to S5906 in the quadruplication mode. Then, the switch 44h is connected to any of the registers m1 to m6 in accordance with a determination result at steps S6101 to S6106. Therefore, a plurality of luminance component values corresponding to the division areas D1 to D6 are obtained as a plurality of the first predetermined component values in the normal mode, and a plurality of luminance component values corresponding to the division areas d1 to d6 are obtained as a plurality of the second predetermined component values in the quadruplication mode.

In addition, the area data memories 44a and 44b, the vertical counter 44c, the horizontal counter 44d, the table 44e and the CPU 44f are operated as the first determination means or the second determination means. Furthermore, the vertical counter 44c, the horizontal counter 44d, the table 44e and the CPU 44f is operated as the first position detecting means or the second position detecting means, and the CPU 44f is operated as the first comparison means or the second comparison means, and the first control means or the second control means. Moreover, the adder 44i, the switch 44h, the signal generation circuit 44g and the registers m1 to m6 are operated as the first predetermined component value generating means or the second predetermined component value generating means.

The microcomputer 50 receives the luminance component values and executes a flowchart shown in FIG. 23. According to the flowchart, a count value k of a counter 50a is set into "1" in a step S63, and each of weights W1 to W6 is set into an initial value in a step S65. In addition, the weights W1 to W3 have the same value, and the weights W4 to W6 also have the same value, and the weights W1 to W3 are larger than the weights W4 to W6. Succeedingly, luminance component values Y1 to Y6 corresponding to the division areas D1 to D6 or d1 to d6 are detected in a step S67, and it is determined whether or not the luminance component value Yk (k is the count value) is much larger than a reference value in a step S69. Then, if "YES", the weight Wk is set into "0" in a step S71, and a processing operation returns back to the step S69; however, if "NO", it is determined whether or not the count value k is equal to "6" in a step S73. Then, if "NO", the counter 50a is incremented in a step S75, and the processing operation returns back to the step S69.

In contrast, if the count value k is equal to "6" in the step S73, an average value $YW_{AV}$ of weighted luminance component values is calculated in a step S77, and a relationship between the average value $YW_{AV}$ and the reference value is determined in steps S79 and S81. If the average value $YW_{AV}$ is larger than the reference value, the iris motor 54 is driven such that the iris is closed in a step S83. If the average value $YW_{AV}$ is smaller than the reference value, the iris motor 54 is driven such that the iris is opened in a step S85. If the average value $YW_{AV}$ is equal to the reference value, the iris motor 54 is stopped in a step S87.

Thus, since the luminance component value generation circuit 44 generates the luminance component values of the division areas D1 to D6 or the division areas d1 to d6 in accordance with the normal mode or the quadruplication mode, the microcomputer 50 suitably controls the iris without changing the processing operation in accordance with the mode.

Figure 25:
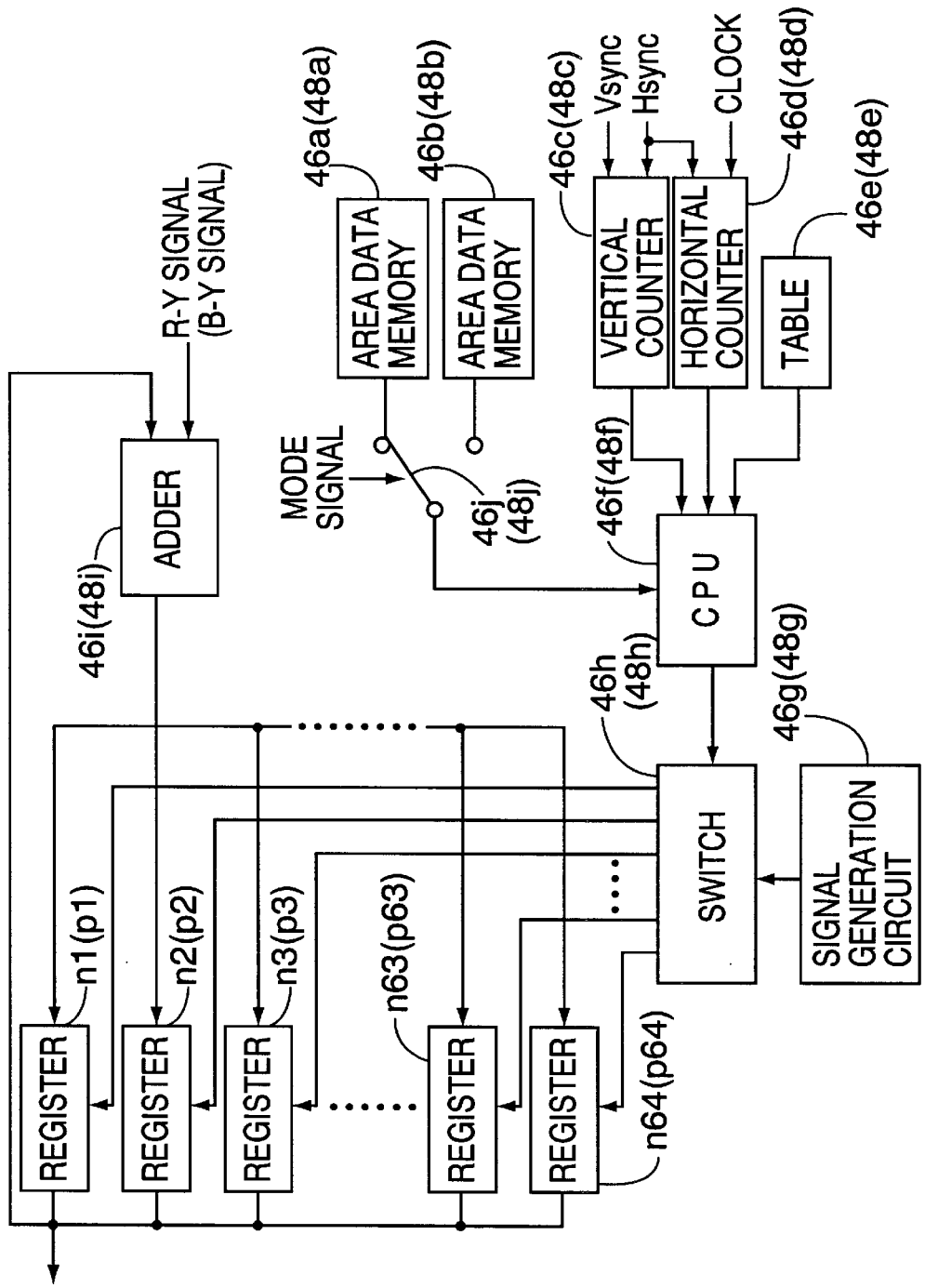
FIG. 25 is a block diagram showing an R-Y component value generation circuit and a B-Y component value generation circuit of FIG. 1 embodiment.

The R-Y component value generation circuit 46 is constituted as shown in FIG. 25; however, since the R-Y component value generation circuit 46 is the same or similar to the luminance component value generation circuit 44 unless sixty-four (64) registers n1 to n64 are provided instead of the registers m1 to m8, a duplicate description will be omitted.

Area data of small areas obtained by dividing the image 55 into eight (8) in the vertical direction and the horizontal direction as shown in FIG. 24A is stored in the area data memory 46a, and area data of small areas obtained by dividing the upper left quarter area of the monitor 55 into eight (8) in the vertical direction and the horizontal direction as shown in FIG. 24B is stored in the area data memory 46b. In addition, the small areas shown in FIG. 24A are the division areas A11 to A88, respectively, and the small areas shown in FIG. 24B are the division areas a11 to a88, respectively. Then, the white balance area WA is constituted by the division areas A11 to A88, and the white balance area WA' is constituted by the division areas a11 to a88. Furthermore, the white balance area WA is the first monitor area, and the white balance area WA' is the second monitor area. Two-digit numbers attached to "A" and "a" show positions of the small areas. That is, upper digit numbers show positions in the vertical direction, and lower digit numbers show positions in the horizontal direction.

In addition, the white balance area WA corresponds to the charge area WCA having the same scale as the charge area 12' shown in FIG. 13A, and the white balance area WA' corresponds to the charge area WCA' formed on the upper left quarter area of the charge area 12' as shown in FIG. 13B. Then, the charge area WCA is the charge area, and the charge area WCA' is the charge area.

Figure 26:
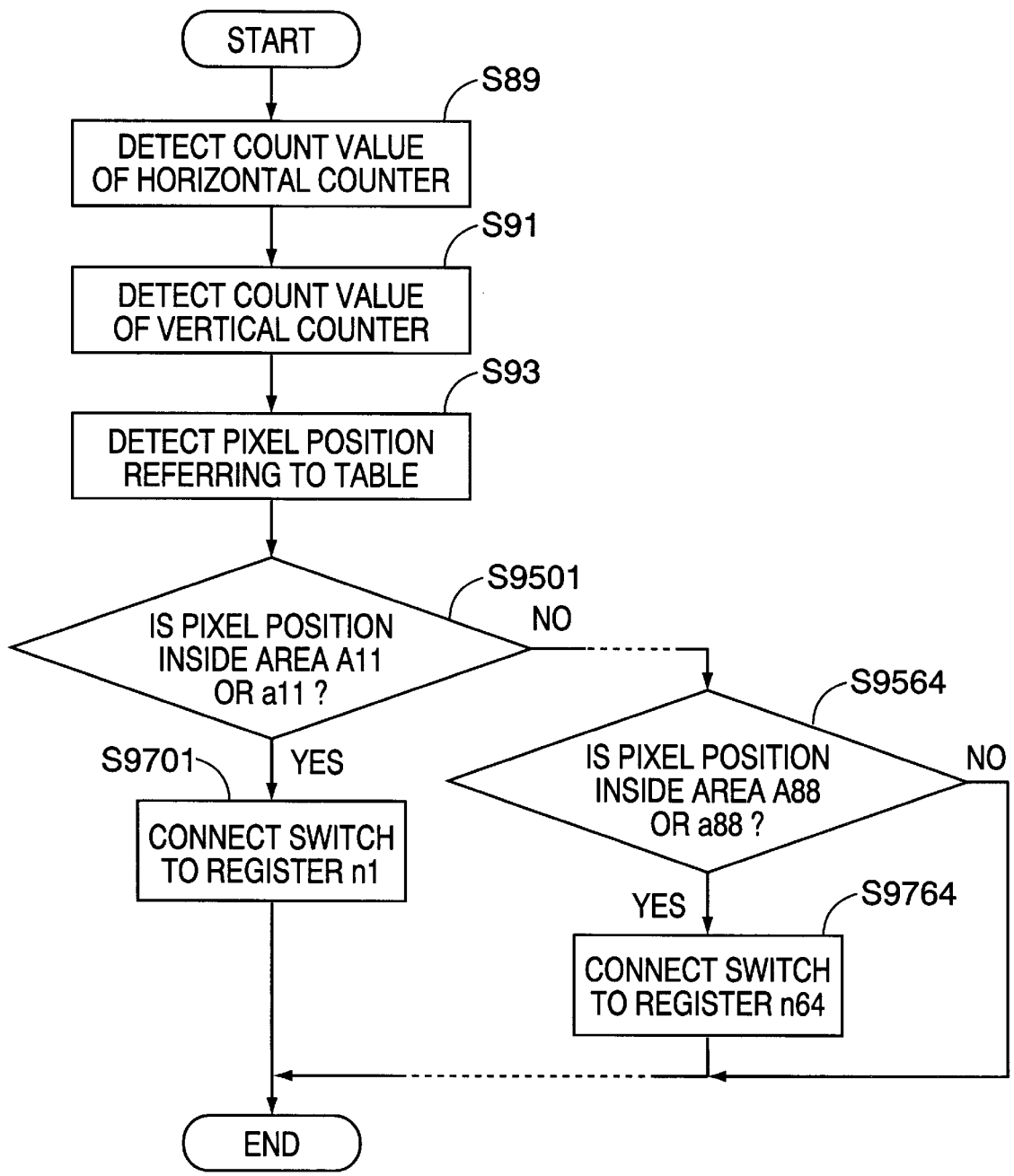
FIG. 26 is a flowchart showing a portion of an operation of FIG. 25 embodiment.

A switch 46j is connected to an area data memory 46a in the normal mode, and connected to an area data memory 46b in the quadruplication mode. A CPU 46f controls a switch 46h by processing a flowchart shown in FIG. 26. According to the flowchart, each of count values of a horizontal counter 46d and a vertical counter 46c is detected in each of steps S89 and S91, and the count values are converted into a pixel position from which an R-Y signal is to be outputted with using a table 46e. Succeedingly, one of the division areas A11 to A88 in which the pixel position exists is determined in steps S9501 to S9564 in the normal mode, and one of the division areas a11 to a88 in which the pixel position exists is determined in the steps S9501 to S9564 in the quadruplication mode. Then, the switch 46h is connected to any of the registers n1 to n64 in any of steps S9701 to S9764.

Accordingly, a reading signal and a writing signal from the signal generation circuit 46g are applied to a desired register, and integration values of the division areas A11 to A88, i.e. the R-Y component values are obtained by the registers n1 to n64, respectively, in the normal mode, and integration values of the division areas a11 to a88, that is, the R-Y component values are obtained by the registers n1 to n64, respectively, in the quadruplication mode. Each of the R-Y component values is the first predetermined component value or the second predetermined component value. Accordingly, an adder 46i, the switch 46h, the signal generation circuit 46g and the registers n1 to n64 are operated as the first predetermined component value generating means or the second predetermined component value generating means.

In addition, since the B-Y component value generation circuit 48 has the same structure as that of the R-Y component value generation circuit 46, a duplicate description is omitted here by adding reference numerals in parentheses in FIG. 25.

Figure 27:
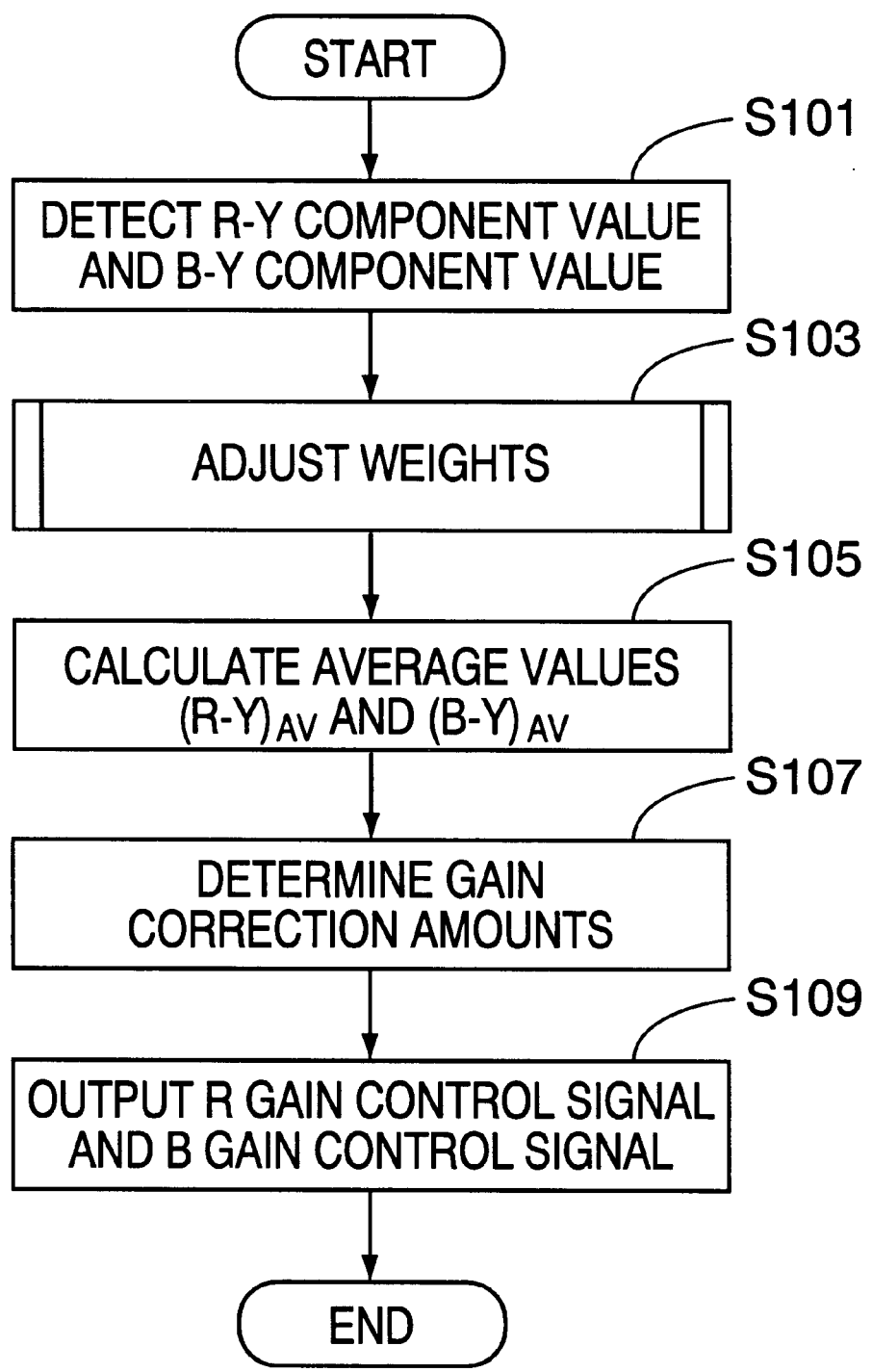
FIG. 27 showing a flowchart showing a portion of an operation of the microcomputer.
Figure 28:
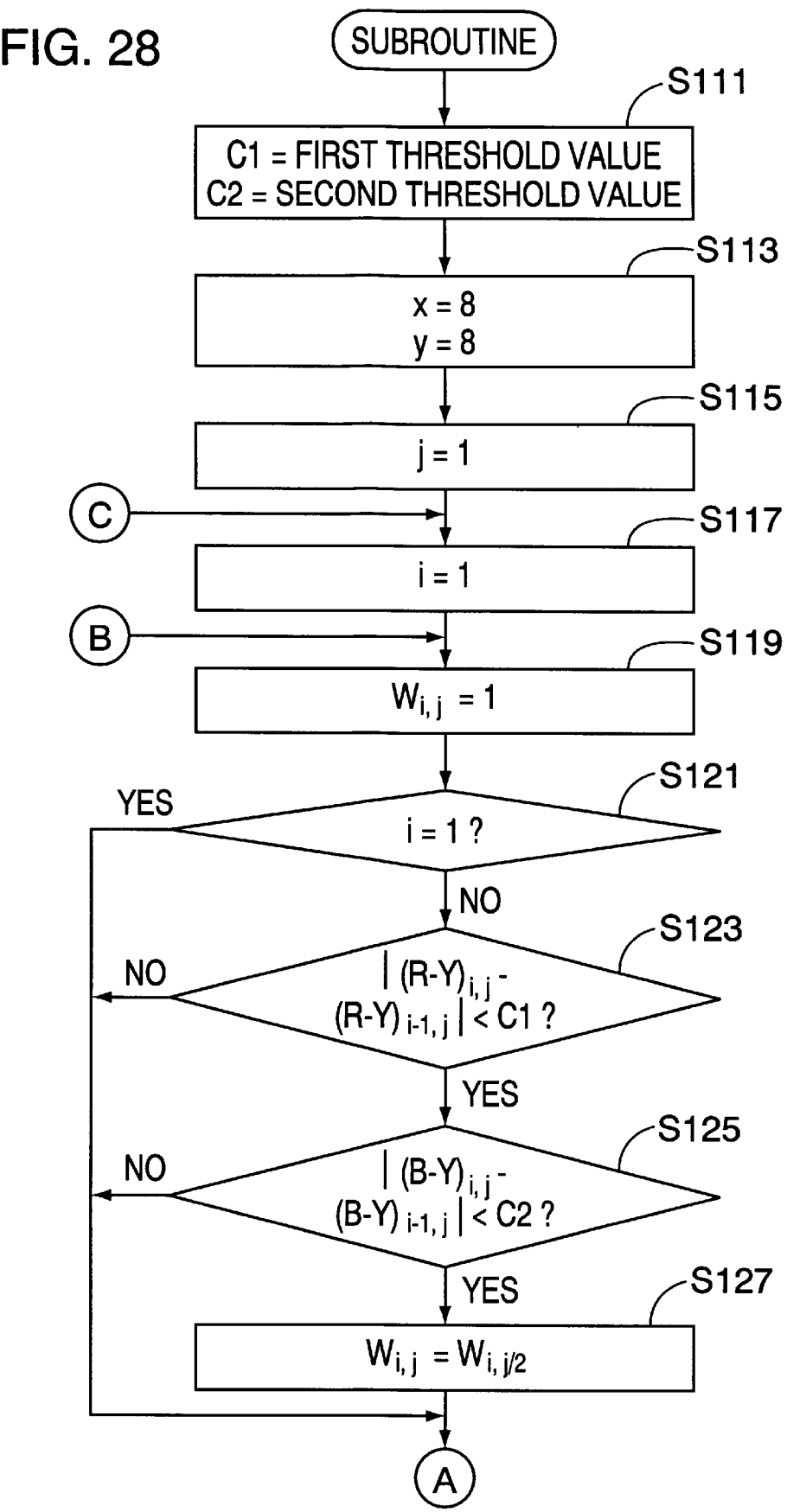
FIG. 28 is a flowchart showing another portion of an operation of the microcomputer.
Figure 29:
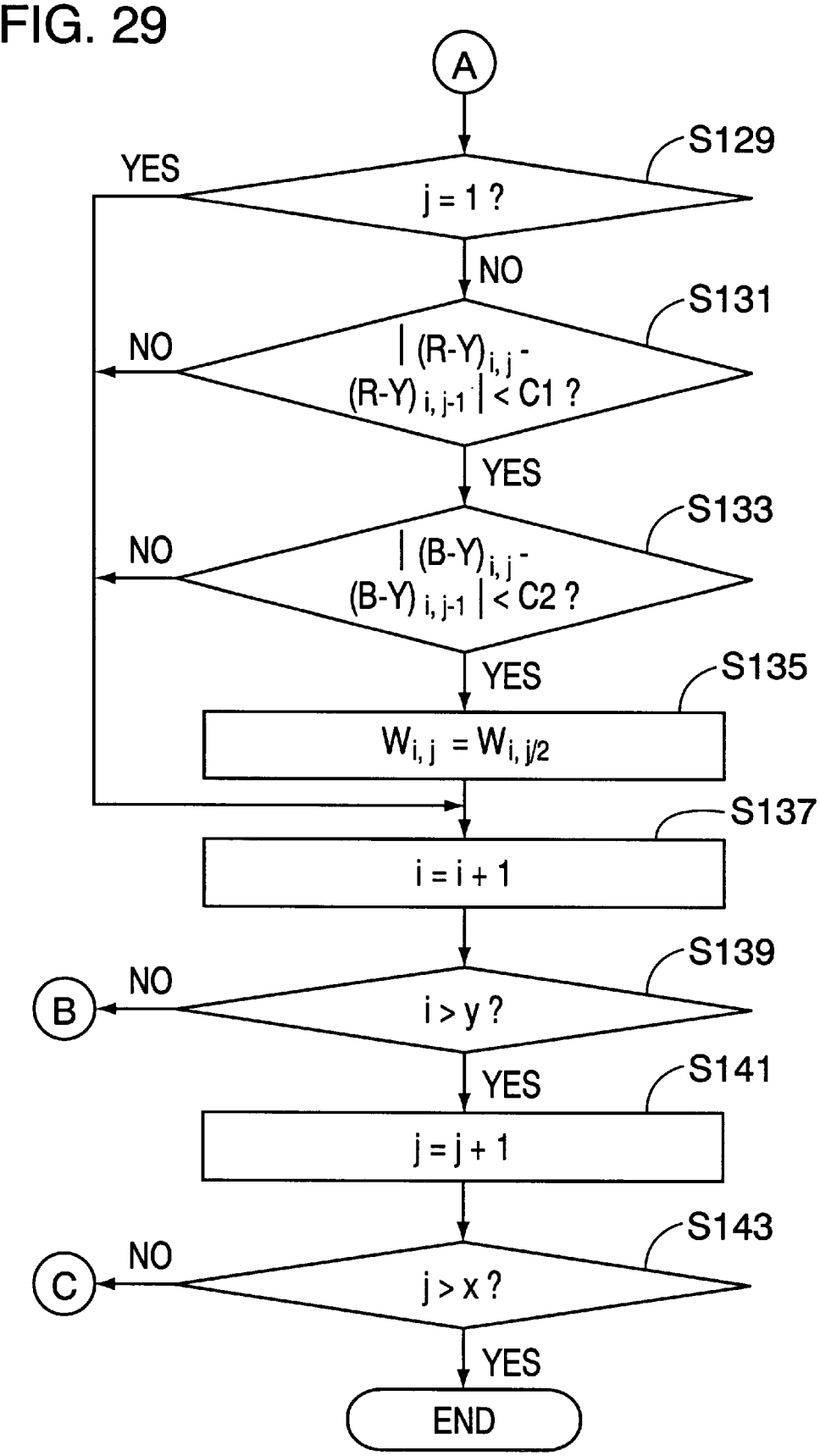
FIG. 29 is a flowchart showing a further portion of an operation of the microcomputer.

The microcomputer 50 receives the R-Y component values and the B-Y component values generated by the R-Y component value generation circuit 46 and the B-Y component value generation circuit 48, respectively, and generates the R gain control signal and the B gain control signal by processing flowcharts shown in FIG. 27 to FIG. 29.

With referring to FIG. 27, the R-Y component values and the B-Y component values are detected in a step S101, and weights $W_{1,1}$ to $W_{8,8}$ are adjusted by processing a subroutine shown in FIG. 28 and FIG. 29. Thereafter, average values $(R-Y)_{AV}$ and $(B-Y)_{AV}$ are calculated with using the weights $W_{1,1}$ to $W_{8,8}$ in a step S105, and gain correction amounts of the R amplifier 38a and the B amplifier 38b are determined in a step S107. Then, the R gain control signal according to one of the gain correction amounts and the B gain control signal according to other one of the gain correction amounts are outputted in a step S109.

According to the subroutine shown in FIG. 28 and FIG. 29, variables C1 and C2 are set into a first threshold value and a second threshold value, respectively, in a step S111, and each of variables x and y is set into "8" in a step S113. In addition, the variables x and y show numbers of the division areas A11 to A88 or a11 to a88 in the vertical direction and the horizontal direction, respectively. Thereafter, each of a count value j of a counter 50b and a count value i of a counter 50c is set into "1" in each of steps S115 and S117, and the weight $W_{ij}$ is set into "1" in a step S119.

Succeedingly, it is determined whether or not the count value i is equal to "1" in a step S121. If "YES", since a noted or target division area is a top, and it is impossible to compare with an upper division area of the noted division area, a processing operation directly proceeds to a step S129. However, if "NO" in the step S121, it is determined whether or not formulas (1) and (2) are satisfied in steps S123 and S125, respectively. If even one of the formulas (1) and (2) is not satisfied, the processing operation directly proceeds to the step S129; however, if both of the formulas (1) and (2) are satisfied, the weight $W_{i,j}$ is halved in a step S127, and the processing operation proceeds to the S129. By executing such the processing operation, if errors between the respective R-Y component value and B-Y component value of the noted or target division area and the respective R-Y component value and B-Y component value of the upper division area are small, the weight of the noted division area is halved.

$$|(R-Y)_{i,j}-(R-Y)_{i-1,j}|<C1 \quad (1)$$

$$|(B-Y)_{i,j}-(B-Y)_{i-1,j}|<C2 \quad (2)$$

It is determined whether or not the count value j is equal to "1" in the step S129. If "YES", since the noted or target division area exists at a left end, and it is impossible to compare with a left-adjacent division area to the noted division area, the processing operation directly proceeds to a step S137. However, if the count value j is not equal to "1", it is determined whether or not each of formulas (3) and (4) is satisfied in each of steps S131 and S133. If even one of the formulas (3) and (4) is not satisfied, the processing operation proceeds to the step S137; however, if both of the formulas (3) and (4) are satisfied, the weight $W_{i,j}$ is halved in a step S135. That is, if errors between the respective R-Y component value and B-Y component value of the noted or target division area and the respective R-Y component value and B-Y component value of the left-adjacent division area are small, the weight $W_{i,j}$ is halved. Accordingly, if all of the formulas (1) to (4) are satisfied, the weight $W_{i,j}$ is quartered.

$$|(R-Y)_{i,j}-(R-Y)_{i,j-1}|<C1 \quad (3)$$

$$|(B-Y)_{i,j}-(B-Y)_{i,j-1}|<C2 \quad (4)$$

The count value i is incremented in the step S137, and it is determined whether or not the count value i is larger than the variable y in a step S139. Then, if "NO", processes of the step S119 and afterward are repeated; however, if "YES", the count value j is incremented in a step S141, and the processing operation proceeds to a step S143. It is determined whether or not the count value j is larger than the variable x in the step S143, and if "NO", processes of the step S117 and afterward are repeatedly executed, and if "YES", the processing operation is finished.

Thus, the weight $w_{i,j}$ is adjusted for each division area, and the average values $(R-Y)_{AV}$ and $(B-Y)_{AV}$ are calculated in the step S105.

Furthermore, since the R-Y component value generation circuit 46 and the B-Y component value generation circuit 48 generate the R-Y component value and the B-Y component value in accordance with the normal mode or quadruplication mode, the microcomputer 50 suitably generates the R gain control signal and the B gain control signal by processing the same program, and therefore, it is possible to suitably adjust the white balance irrespective of the mode.

Figure 30C:
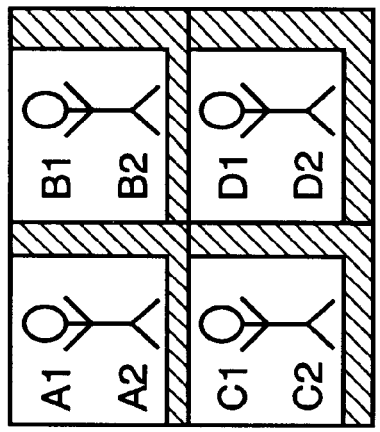
FIGS. 30A, 30B, and 30C are illustrative views showing an operation of FIG. 1 embodiment in the quadruplication mode.
Figure 30B:
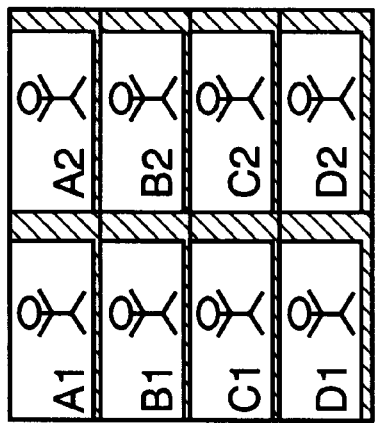
Figure 30A:
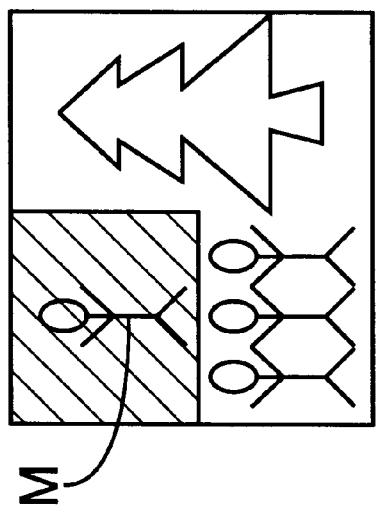
Figure 31:
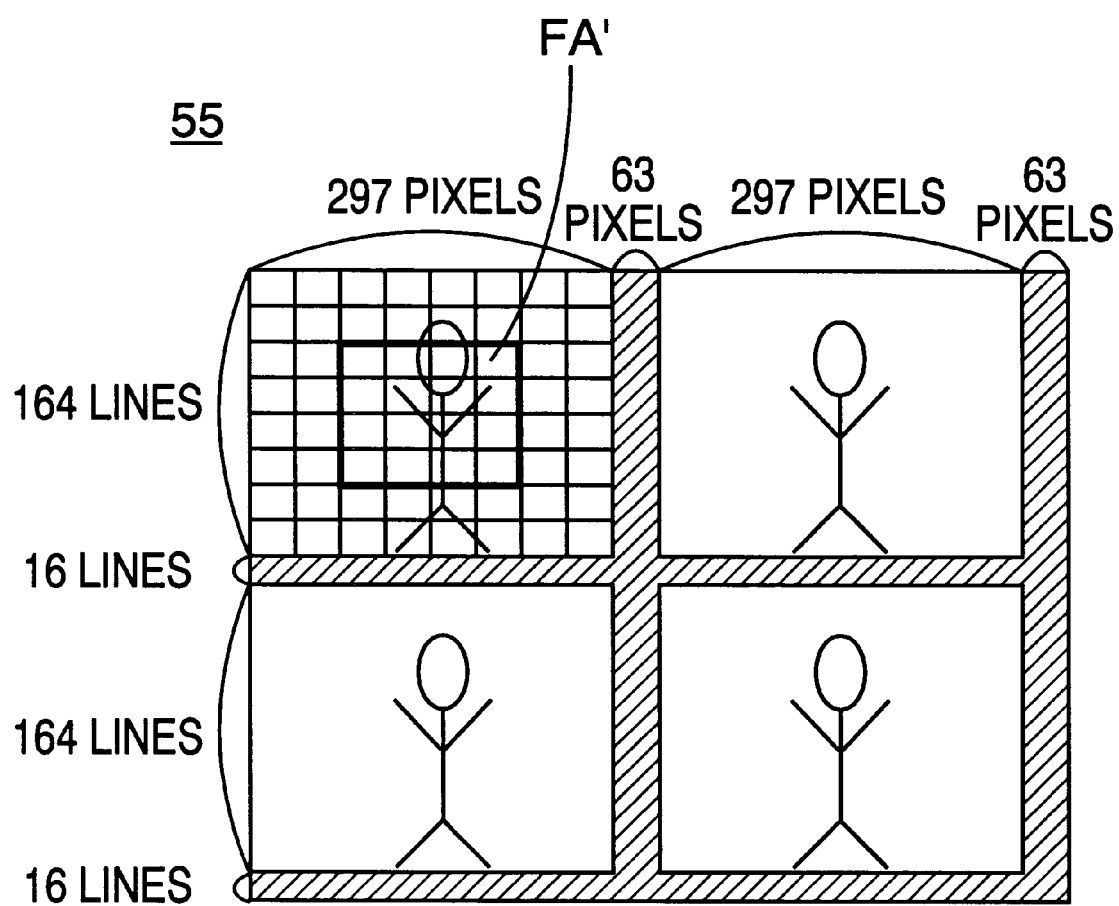
FIG. 31 is an illustrative view showing images displayed on the monitor in the quadruplication mode.
Figure 32:
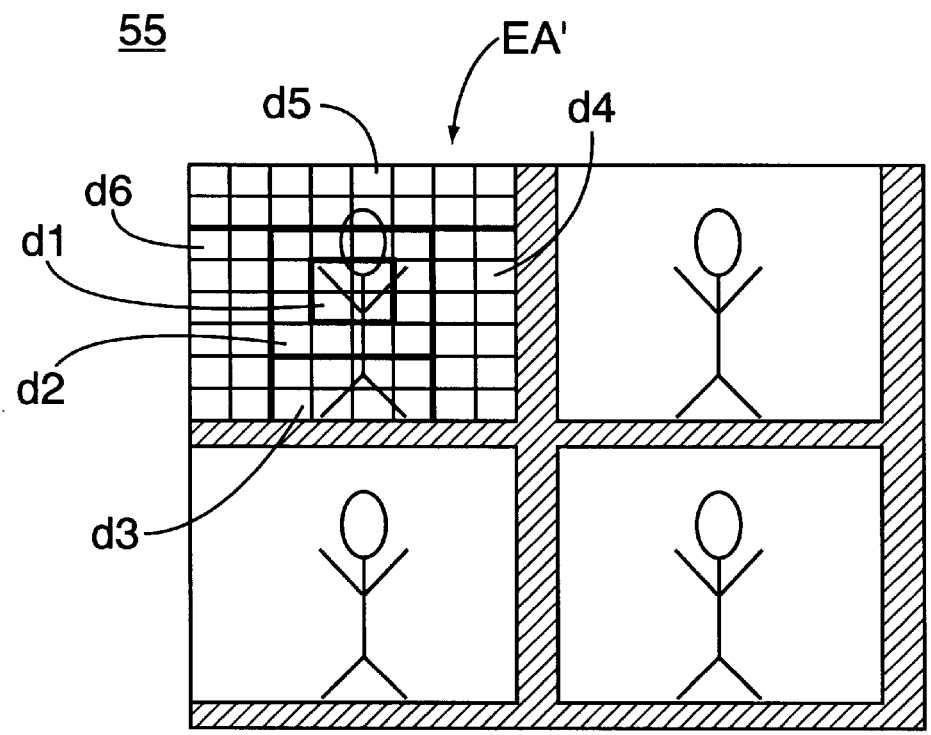
FIG. 32 is an illustrative view showing images displayed on the monitor in the quadruplication mode.
Figure 33:
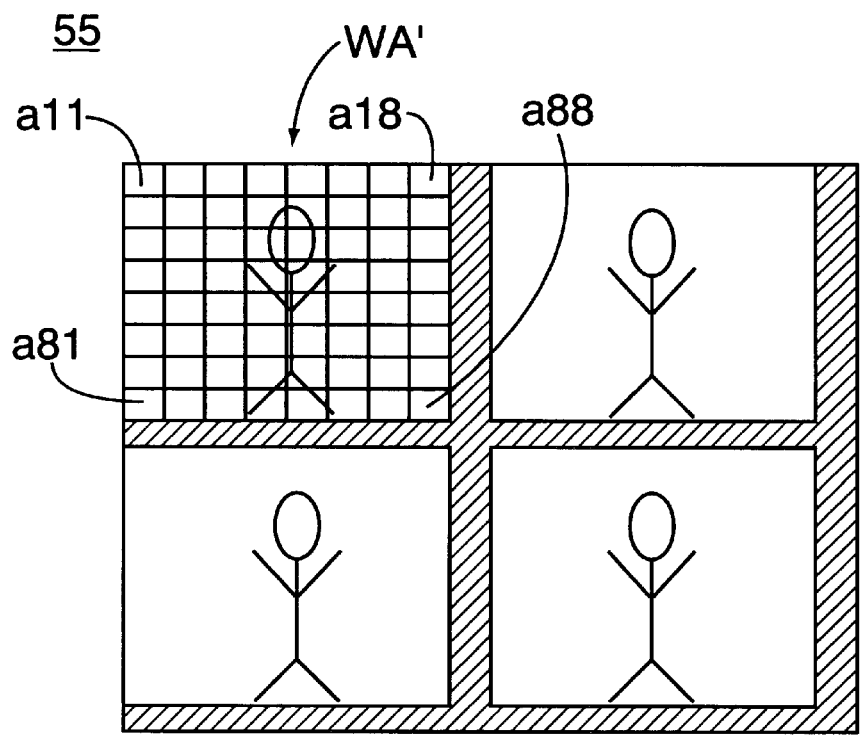
FIG. 33 is an illustrative view showing images displayed on the monitor in the quadruplication mode.

However, the camera signal is actually processed as shown in FIG. 30A to FIG. 30C in the quadruplication mode. More specifically, though image (C) of FIG. 5 is drawn such as the four (4) images to be displayed are touched with each other, it is necessary to secure a period for sweeping-out the charges of the second half of each line in the horizontal direction and the charges of the second half of each quarter field in the vertical direction. In such the period, since the horizontal transfer CCDs 20a and 20b operates to output the charges even though input gates of the horizontal transfer CCDs 20a and 20b are closed, an output-indefinite area in which an output becomes indefinite or uncertain is actually formed at a diagonal line area shown in FIG. 30C. That is, as shown in FIG. 31, each of the four (4) images displayed on the image 55 has 297 pixels and 164 lines, and the output-indefinite area has 63 pixels at its right side and 16 lines at its lower side. By taking such a point into consideration, in a video camera 10 of another embodiment, area data of a focus area FA' shown in FIG. 31 is written into the area data memory 56b included in the signal determination circuit 56. More specifically, sixteen (16) small areas at a center of an area having 297 pixels and 164 lines and formed on an upper left side of the monitor 55 out of sixty-four (64) small areas obtained by dividing the area into eight (8) in the horizontal direction and the vertical direction constitute the focus area FA', and the area data of the focus area FA' is written into the area data memory 56b. Furthermore, area data of the division areas d1 to d6 included in an iris area EA' shown in FIG. 32 is stored in the area data memory 44b of the luminance component value generation circuit 44. The division areas d1 to d6 are also constituted by the small areas described above with using FIG. 31. Moreover, area data of the division areas a11 to a88 included in a white balance area WA' shown in FIG. 33 is stored in the area data memory 46b of the R-Y component value generation circuit 46 and the area data memory 48b of the B-Y component value generation circuit 48. Then, each of the small areas described above with using the FIG. 31 is each of the division areas a11 to a88, and the respective area data are stored in the area data memory 46b and 48b.

By forming the focus area FA', the iris area EA' and the white balance area WA' in the above described manner, a high-frequency luminance component value, R-Y component values and B-Y component values generated are unaffected by the output-indefinite area, and therefore, it is possible to suitably control the focus, the iris and the white balance in the quadruplication mode.

Figure 34:
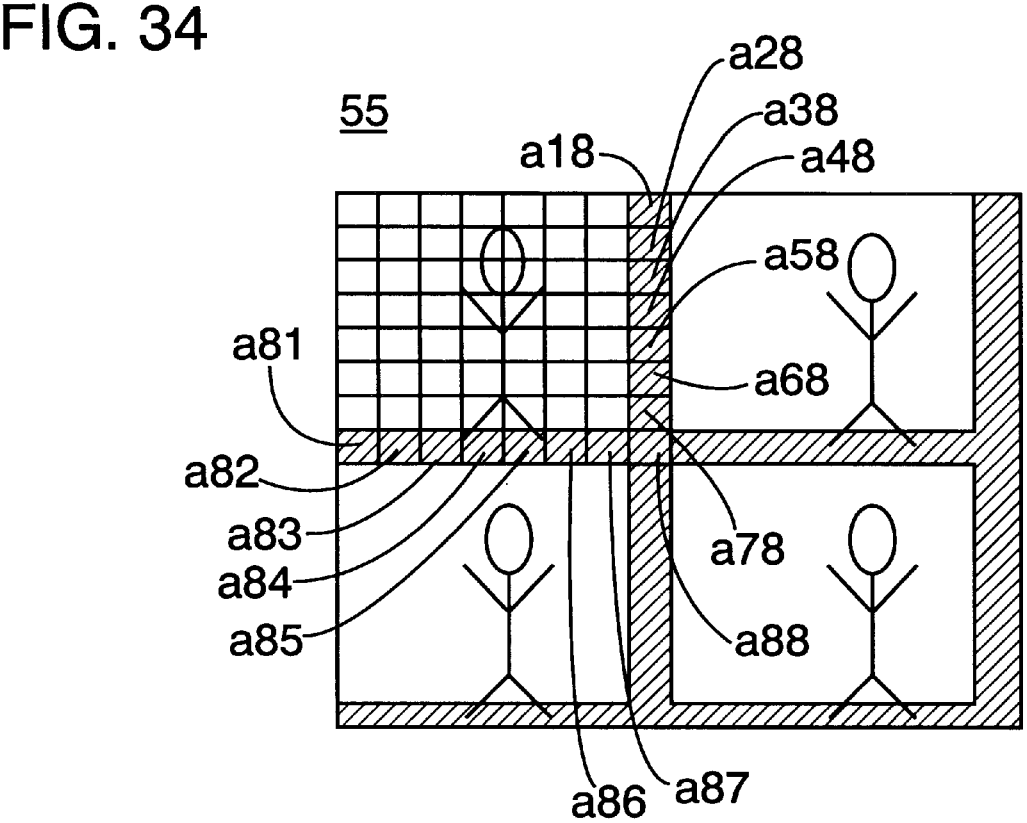
FIG. 34 is an illustrative view showing images displayed on the monitor in the quadruplication mode.

Furthermore, concerning with the white balance, even if the area data used in a FIG. 1 embodiment is stored in the area data memories 46b and 48b, when the microcomputer 50 executes a processing operation except the R-Y component values and the B-Y component values obtained from the division areas a18, a28, a38, a48, a58, a68, a78, a81 to a88 overlapping on the output-indefinite area as shown in FIG. 34, it is possible to suitably control the white balance in the quadruplication mode.

Figure 35:
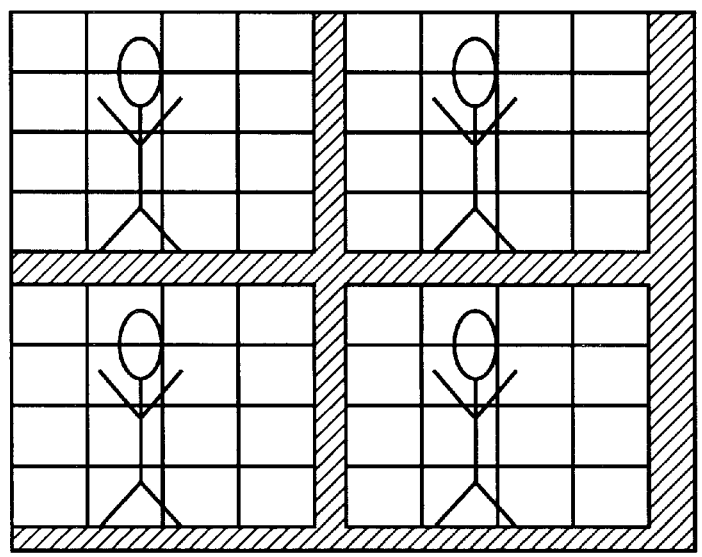
FIG. 35 is an illustrative view showing images displayed on the monitor in the quadruplication mode.

Furthermore, as shown in FIG. 35, even if the respective R-Y component values and B-Y component values are generated with using the respective area data memories 46a and 48a for the normal mode in the quadruplication mode, when the microcomputer 50 executes a processing operation except the R-Y component values and the B-Y component values of division areas overlapping on the output-indefinite area, the area data memories 46b and 48b for the quadruplication mode becomes unnecessary, and it is possible to make the structure simple.

Furthermore, according to the FIG. 1 embodiment, in controlling the focus, though the microcomputer 50 detects the high-frequency luminance component value ① while the focus lens is moved in the step S49 shown in FIG. 18, the focus area FA' is formed on the upper left quarter area of the image 55 as shown in FIG. 13B in the quadruplication mode. Accordingly, the high-frequency luminance component value ① is obtained at a position close to ② not a position of ① shown in FIG. 19A through 19C in the quadruplication mode, and therefore, there is a possibility that accuracy of the focusing control is decreased in comparison with the normal mode.

Figure 36:
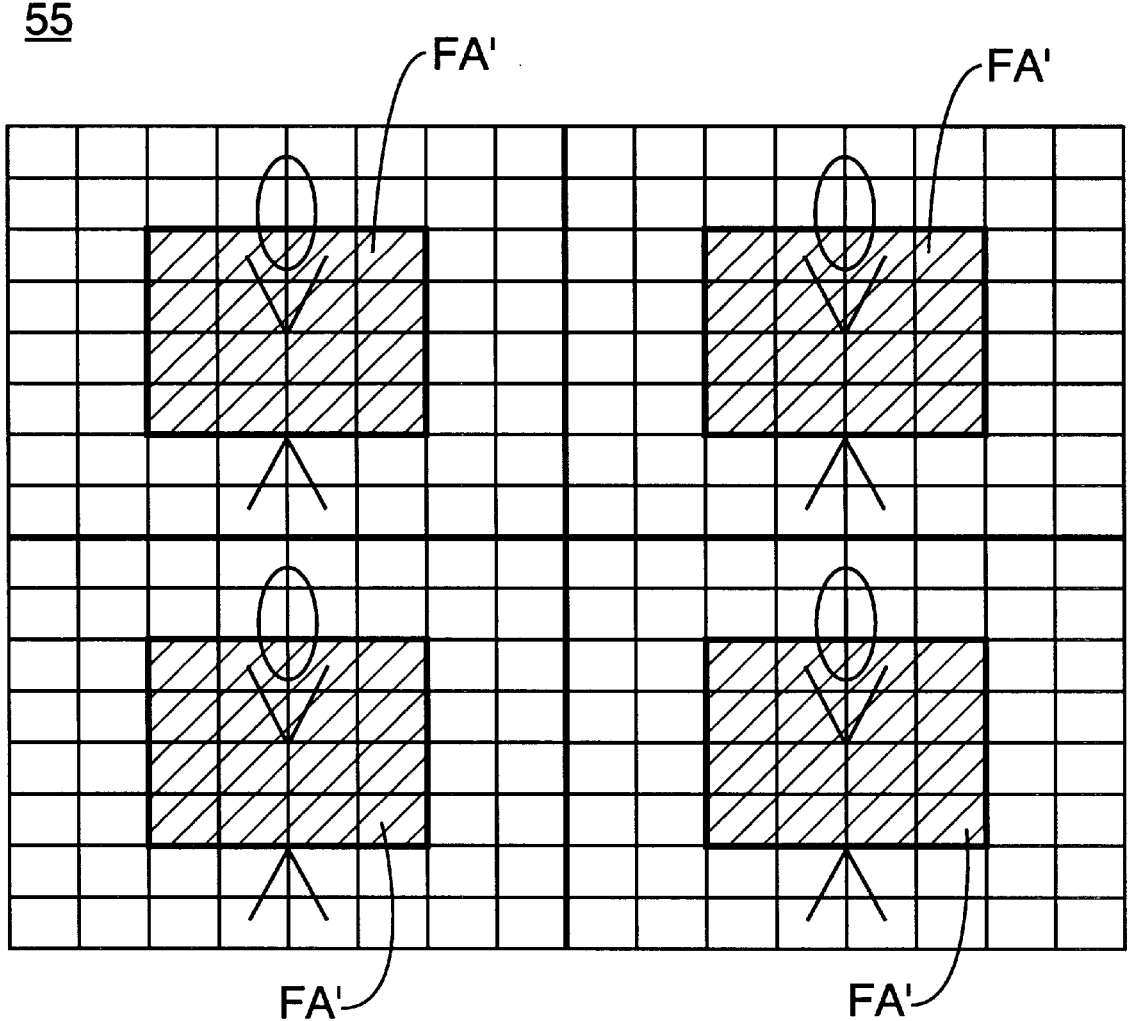
FIG. 36 is an illustrative view showing images displayed on the monitor in the quadruplication mode.

By taking such a point into consideration, in a video camera 10 of the other embodiment, focus areas FA' are formed for all of the four images displayed on the image 55 as shown in FIG. 36, and area data of the focus areas FA' are stored in the area data memory 56b. That is, the second monitor areas of the same number as that of the displayed images are formed on the monitor 55.

Moreover, according to the FIG. 1 embodiment, though the area data of the division areas A11 to A88 obtained by dividing the image 55 as shown in FIG. 24A is stored in the area data memories 46a and 48a shown in FIG. 25 in the normal mode, in taking the object at a wide-angle, for example, there is a possibility that the white balance can not be suitably controlled due to small number of division areas.

Figure 37:
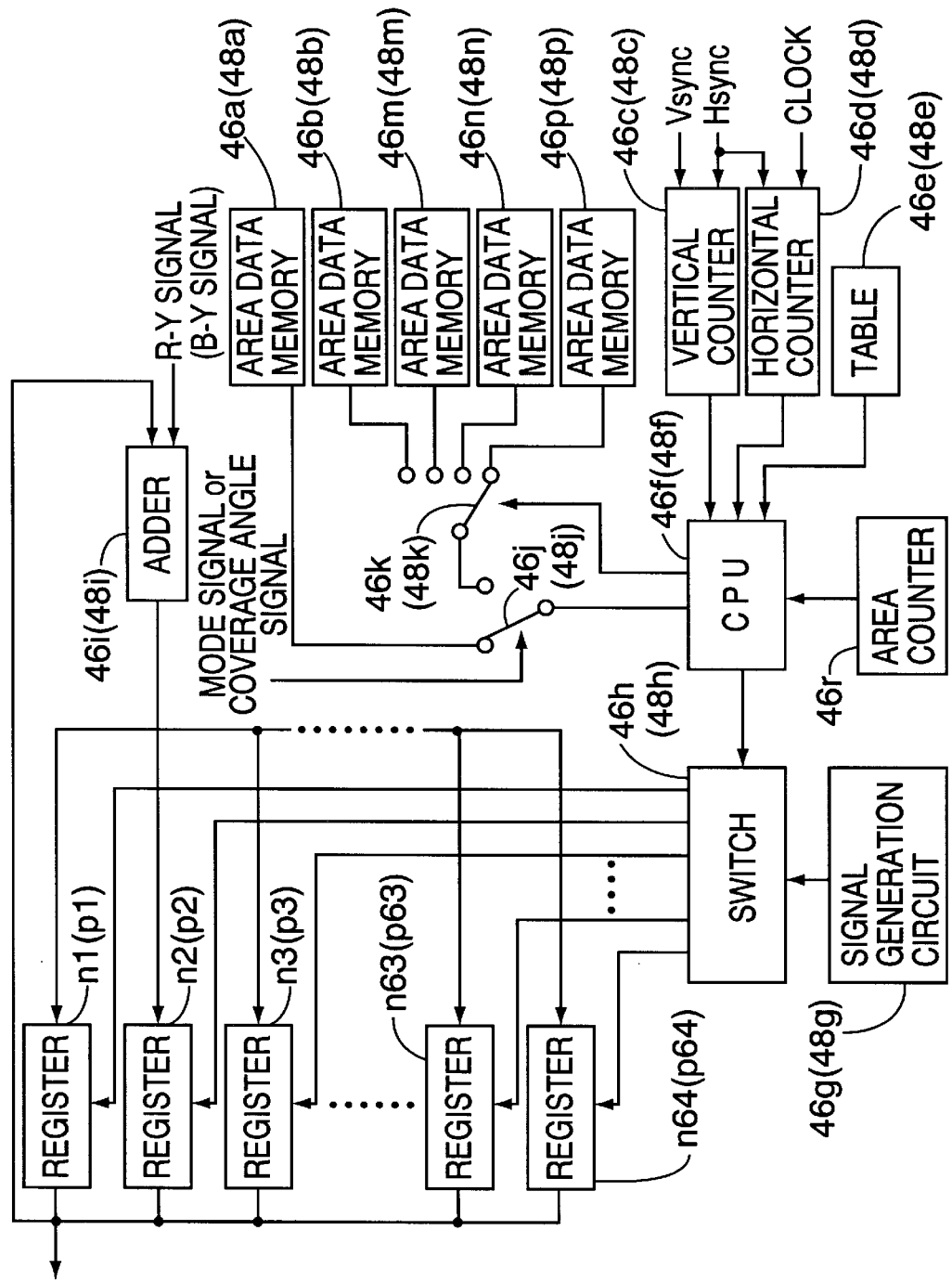
FIG. 37 is a block diagram showing an R-Y component value generation circuit and a B-Y component value generation circuit in another embodiment according to the present invention.
Figure 40B:
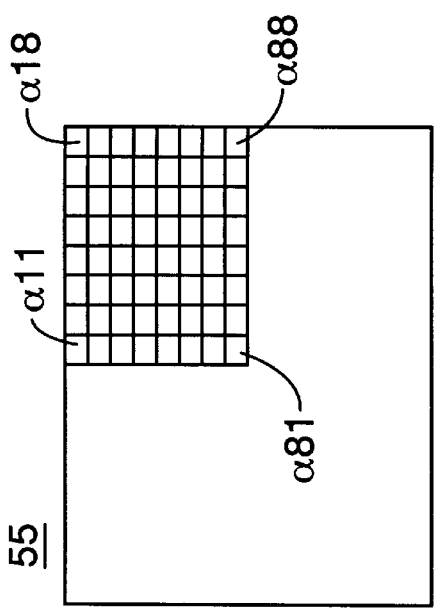
FIG. 40A –FIG. 40D are illustrative views showing division areas formed on the monitor in the wide angle mode.
Figure 40D:
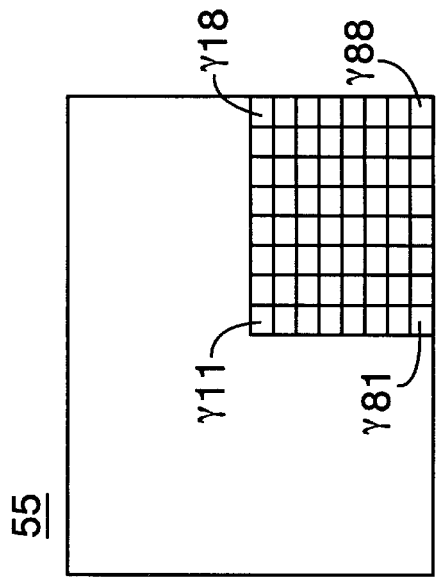
Figure 40A:
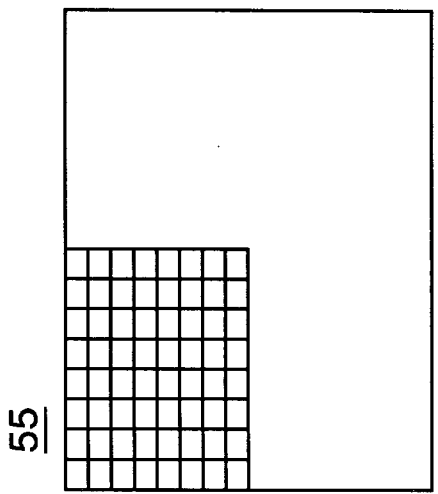
Figure 40C:
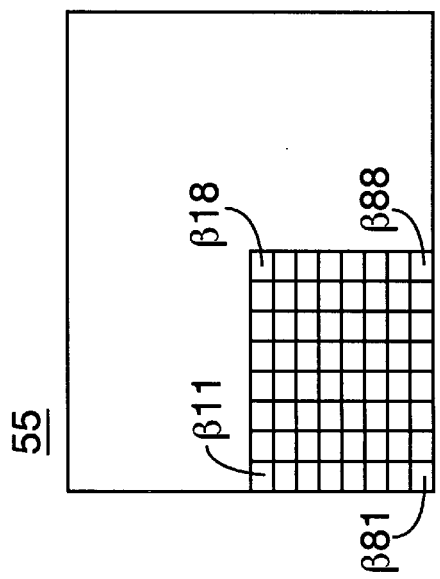

Accordingly, in a video camera 10 of a further embodiment, the R-Y component value generation circuit 46 is constituted as shown in FIG. 37. More specifically, area data memories 46b, 46m, 46n and 46p are further provided, and the area data memories 46m, 46n and 46p are connected to the CPU 46f through a switch 46k and the switch 46j. Furthermore, the switch 46j is connected to the switch 46k in the quadruplication mode and a wide-angle mode (both of them are the second mode), and the switch 46k is changed at every one field by the CPU 46f in such the modes. Furthermore, area data of division areas α11 to α88 formed at an upper right quarter area on the monitor 55 as shown in FIG. 40B is stored in the area data memory 46m, area data of division areas β11 to β88 formed at a lower left quarter area on the image 55 as shown in FIG. 40C is stored in the area data memory 46n, and area data of division areas γ11 to γ88 formed at a lower right quarter area on the image 55 as shown in FIG. 40D is stored in the area data memory 46p.

Figure 41:
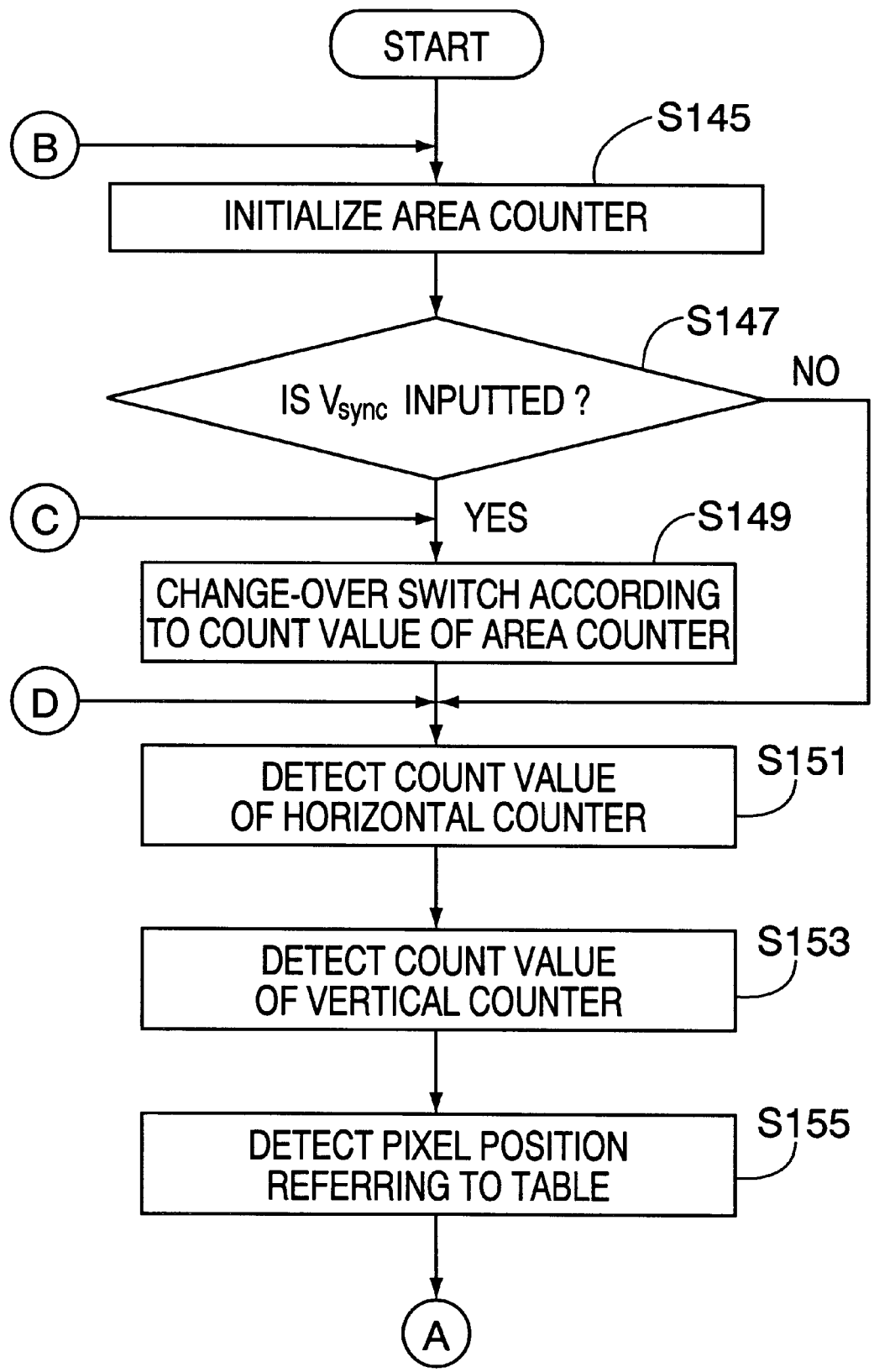
FIG. 41 is a flowchart showing a portion of an operation of FIG. 37 embodiment.
Figure 42:
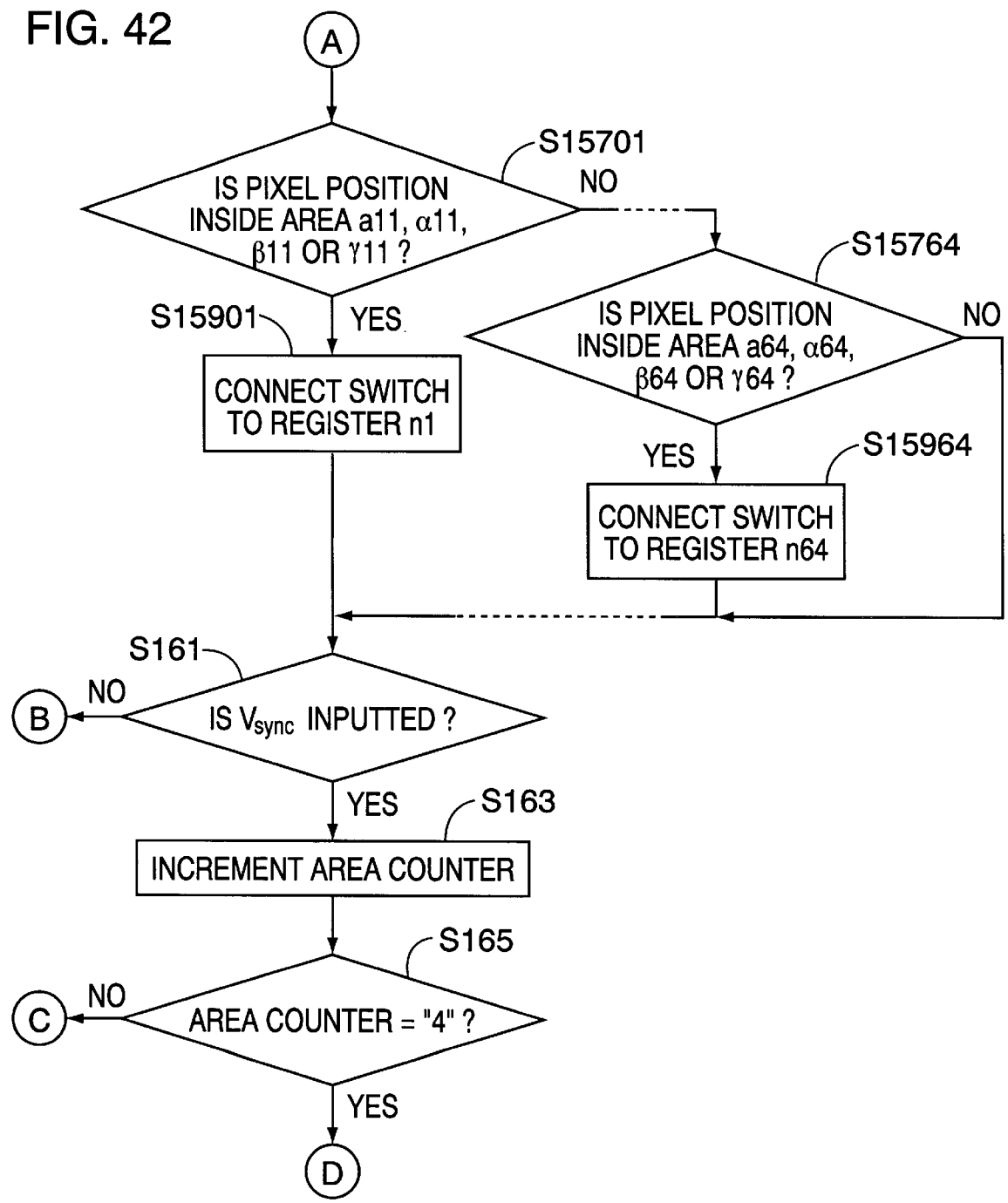
FIG. 42 is a flowchart showing another portion of an operation of FIG. 37 embodiment.

The CPU 46f processes flowcharts shown in FIG. 41 and FIG. 42 in the quadruplication mode and the wide-angle mode in order to generate the R-Y component value for each division area in a four (4) field period. According to the flowcharts, an area counter 46r is initialized in a step S145, and it is determined whether or not the vertical synchronization signal is inputted in a step S147. Then, if "NO", a processing operation directly proceeds to a step S151; however, if "YES", the switch 46k is changed in accordance with a count value of the area counter 46i in a step S149, and then, the processing operation proceeds to the step S151. A count value of the horizontal counter 46d is detected in the step S151, and a count value of the vertical counter 46c is detected in a step S153, and the count values of the horizontal counter 46d and the vertical counter 46c are converted into data of a pixel position from which an R-Y signal is to be outputted with using the table 46e in a step S155.

Succeedingly, one of the division areas in which the pixel position exists is determined in steps S15701 to S15764. More specifically, one of the division areas A11 to A88 in which the pixel position exists, one of the division areas α11 to α88 in which the pixel position exists, and one of the division areas β11 to β88 in which the pixel position exists, or one of the division areas γ11 to γ88 in which the pixel position exists is determined in the steps S15701 to S15764. Then, the switch 46h is connected to a desired register in accordance with a determination result in any one of steps S15901 to S15964. Succeedingly, it is determined whether or not the vertical synchronization signal is inputted in a step S161, and if "NO", the processing operation returns back to the step S145; however, if "YES", the area counter 46r is incremented in a step S163. Thereafter, it is determined whether or not the count value of the area counter 46r is "4" in a step S165, and if "NO", the processing operation returns back to the step S149; however, if "YES", the processing operation returns back to the step S151.

Figure 38:
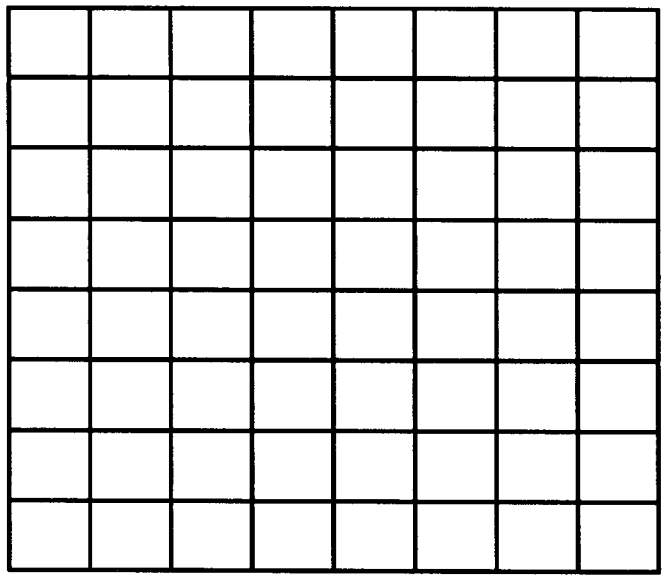
FIG. 38 is an illustrative view showing division areas formed on the monitor in the normal mode.
Figure 39:
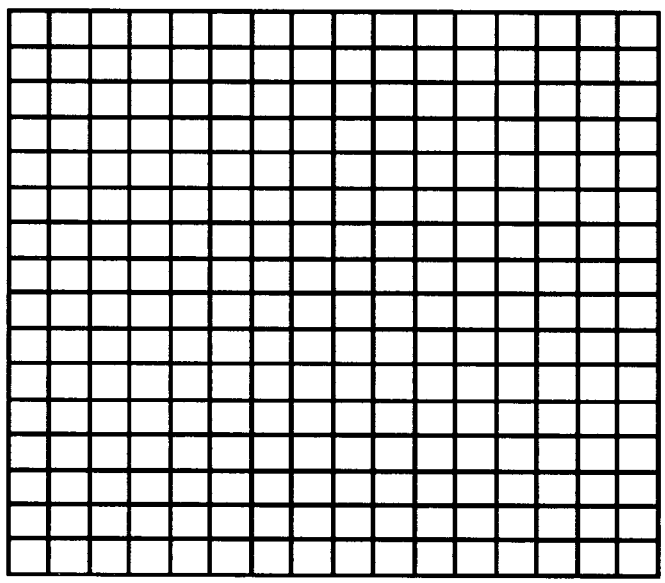
FIG. 39 is an illustrative view showing division areas formed on the monitor in a wide angle mode.

Since the CPU 46f executes the processing operation as described above, the division areas used for the processing operation are changed at every one field. Therefore, it is possible to form division areas of four-times the number of the division areas on the monitor 55 in the normal mode as shown in FIG. 38 and 39, and it is possible to generate four-times the number of R-Y component values. Accordingly, it is possible to perform the white balance control with high-accuracy and without increasing the number of the registers in the wide-angle mode.

In addition, since the B-Y component value generation circuit 48 of this embodiment is also constituted in the same manner as the R-Y component value generation circuit 46, a duplicate description is omitted by adding numeral numbers in parentheses in FIG. 37.

Furthermore, according to this embodiment, in order to generate R-Y component values and B-Y component values of four-times the number of the R-Y component values and the B-Y component values of the FIG. 1 embodiment for the four (4) field period, it is necessary for the microcomputer 50 to process the flowchart shown in FIG. 27 at every four fields, and it is necessary to set a quarter of the first threshold value and a quarter of the second threshold value as the variables C1 and C2 , respectively in the step S111 of the subroutine shown in FIG. 28, and it is necessary to set "16" as the variables x and y in the step S113 of the subroutine of FIG. 28.

Figure 43:
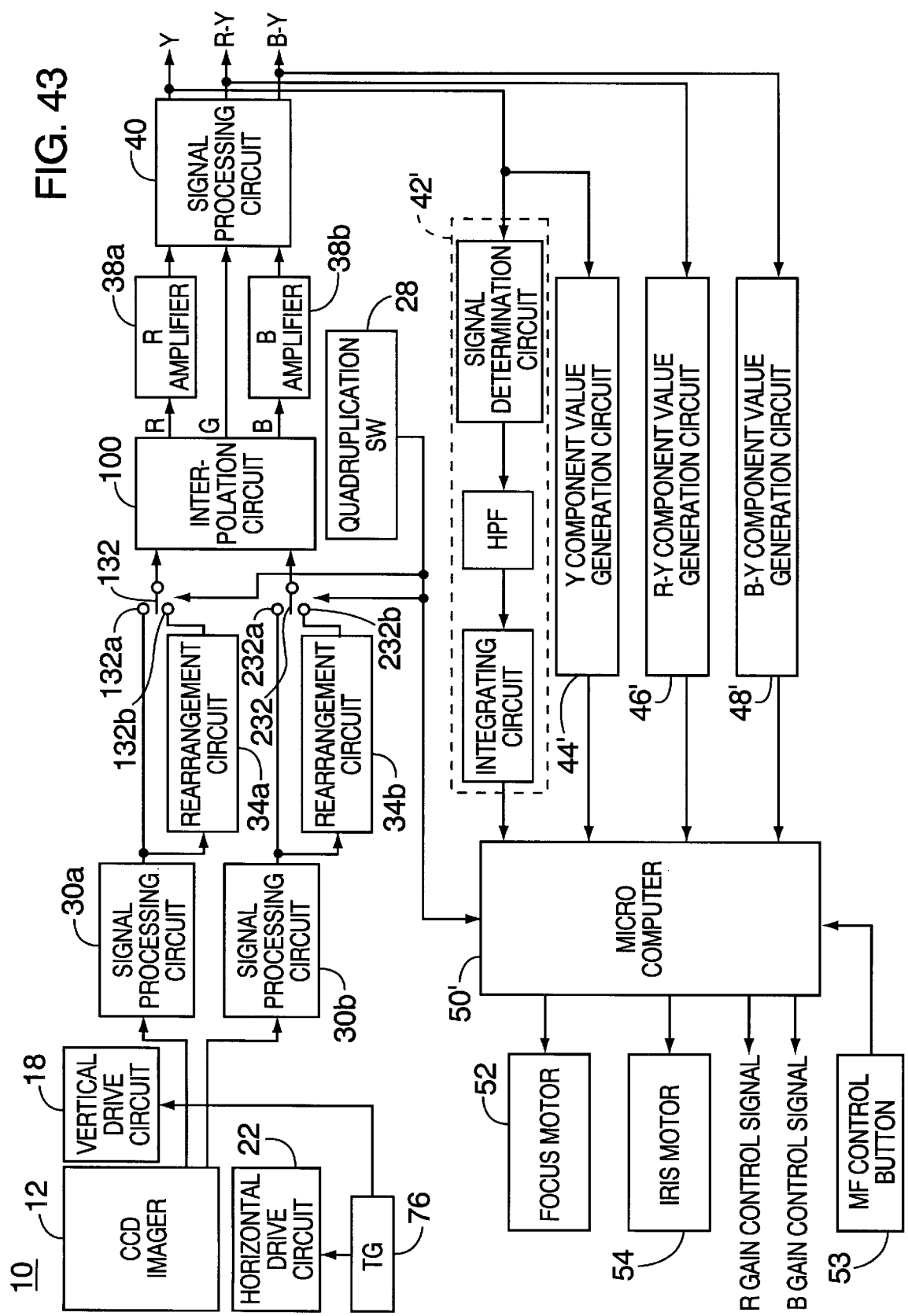
FIG. 43 is a block diagram showing the other embodiment according to the present invention.

Referring to FIG. 43, in a video camera 10 of the other embodiment, a high-frequency luminance component value generation circuit 42', a luminance component value generation circuit 44', and an R-Y component value generation circuit 46' and a B-Y component value generation circuit 48' perform the same operations irrespective of the normal mode or the quadruplication mode.

Figure 44:
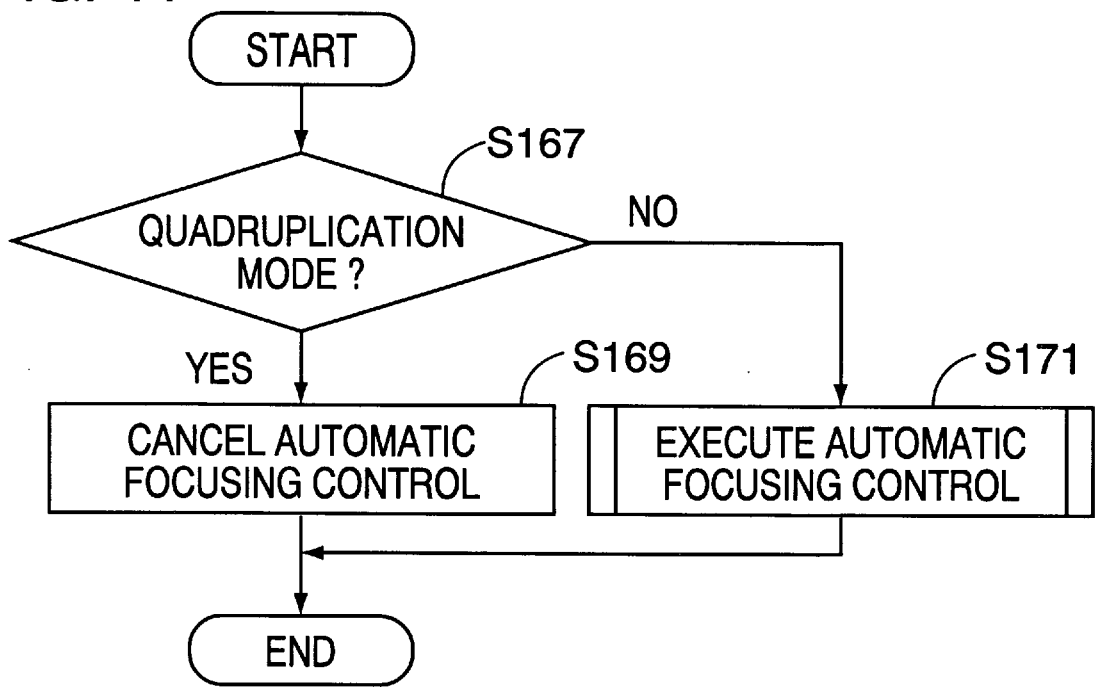
FIG. 44 is a flowchart showing a portion of an operation of a microcomputer of FIG. 43 embodiment.
Figure 45:
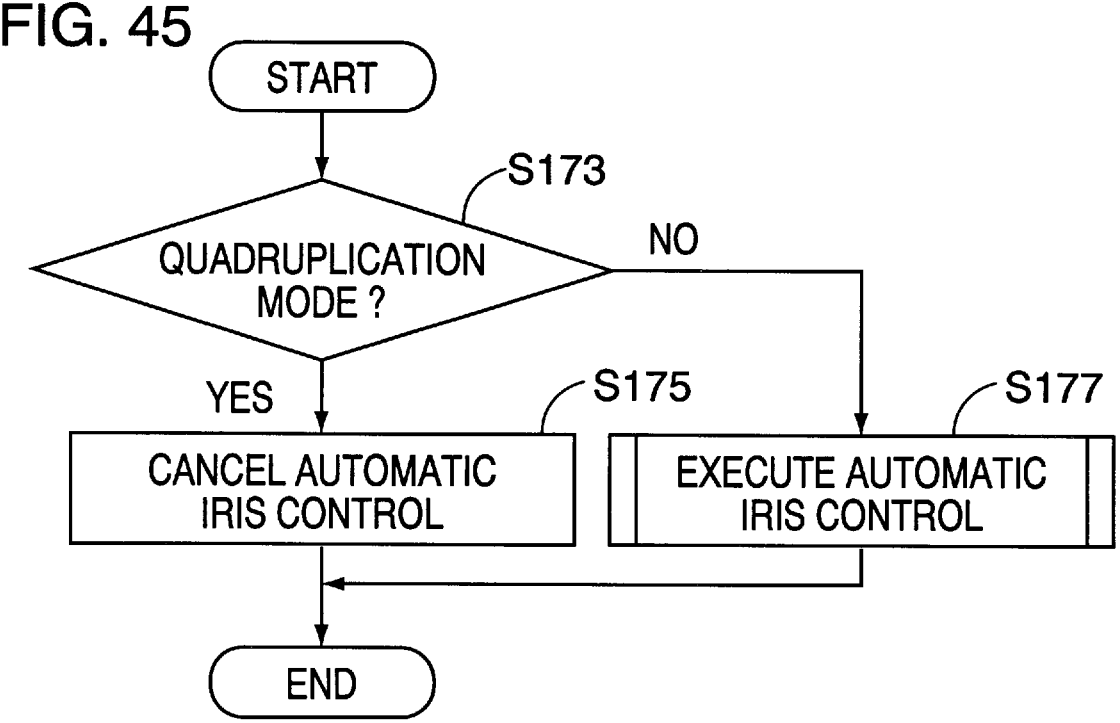
FIG. 45 is a flowchart showing another portion of an operation of the microcomputer.
Figure 46:
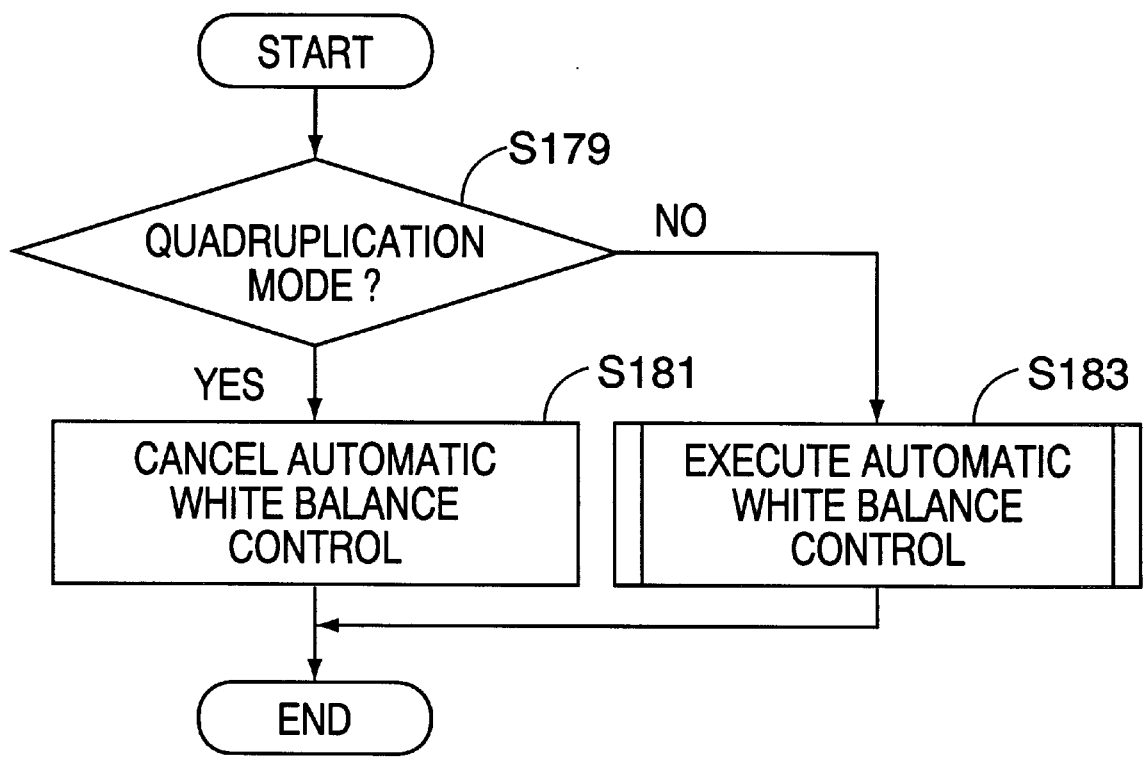
FIG. 46 is a flowchart showing a further portion of an operation of the microcomputer.

More specifically, the high-frequency luminance component value generation circuit 42' generates only the high-frequency luminance component value of the focus area FA shown in FIG. 12A, and the luminance component value generation circuit 44' generates only the luminance component values of the division areas D1 to D6 shown in FIG. 20A, and the R-Y component value generation circuit 46' and the B-Y component value generation circuit 48' generate only the R-Y component values and the R-Y component values of the division areas A11 to A88 shown in FIG. 24A. Then, the microcomputer 50' processes a flowchart shown in FIG. 44 in the focusing control, processes a flowchart shown in FIG. 45 in the iris control, and processes a flowchart shown in FIG. 46 in the white balance control.

In controlling the focus, it is determined whether or not a mode is the quadruplication mode in a step S167, and if "NO", an automatic focusing control is executed in a step S171; however, if "YES", the automatic focusing control is canceled. Furthermore, in the iris control, it is determined whether or not a mode is the quadruplication mode in a step S173, and if "NO", an automatic iris control is executed in a step S177; however, if "YES", the automatic iris control is canceled in a step S175. Moreover, in the white balance control, it is determined whether or not a mode is the quadruplication mode in a step S179, and if "NO", the automatic white balance control is executed in a step S183; however, if "YES", the automatic white balance control is canceled in a step S181.

In this embodiment, though no control is executed in the quadruplication mode, since a user normally selects the quadruplication mode after selecting the normal mode, the focus, the iris and the white balance have been already suitably adjusted at a time that the quadruplication mode is selected. Accordingly, no problems happen in particular unless a special operation is performed. However, if any of the focus, the iris and the white balance deviate by changing an object during the quadruplication mode, for example, a manual control button 53 may be operated by the user to adjust the focus, the iris and the white balance.

Figure 47:
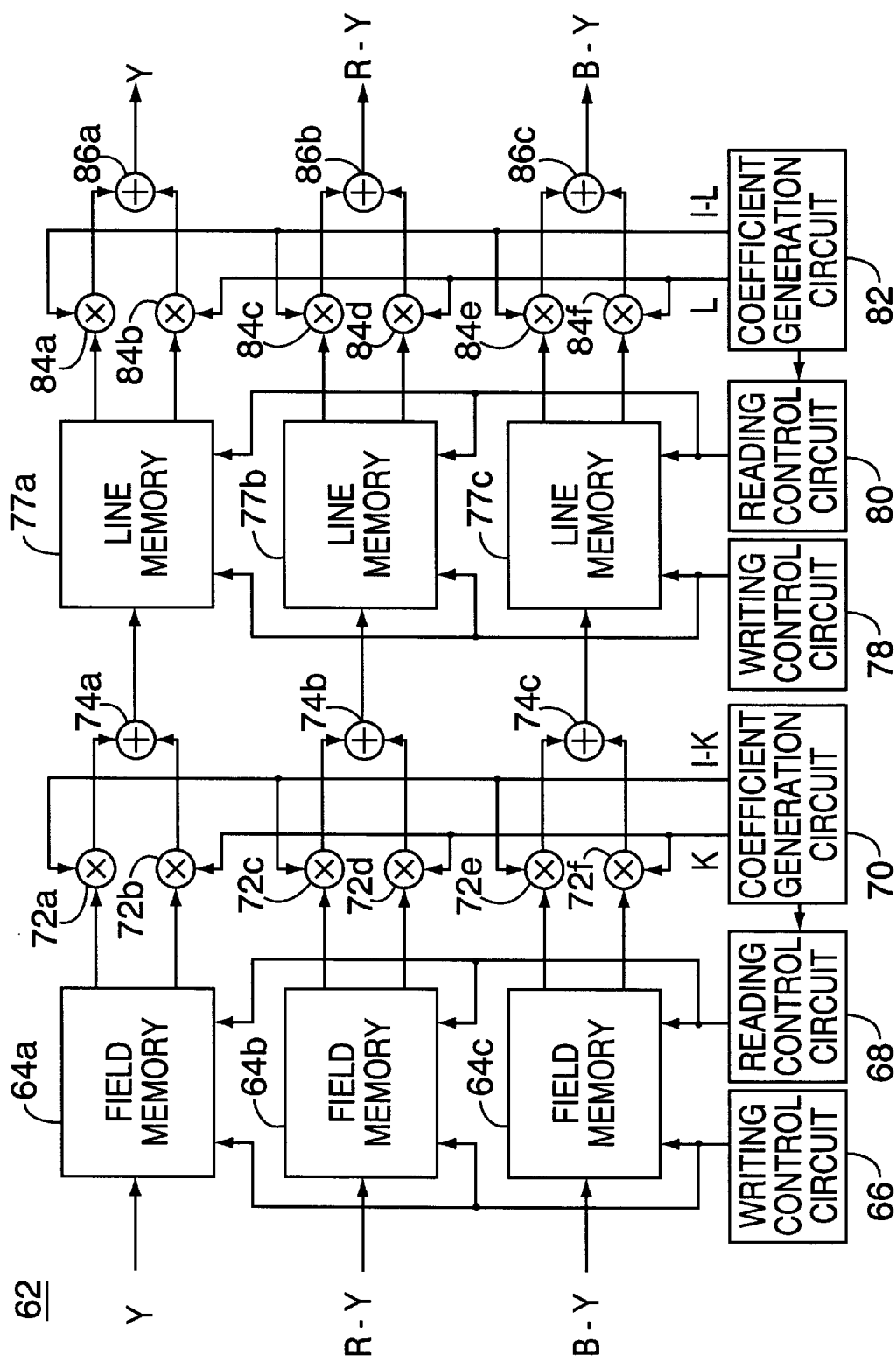
FIG. 47 is a block diagram showing a portion of a further embodiment of the present invention.

Furthermore, with considering that the output-indefinite area is formed as shown in FIG. 30C according to the FIG. 1 embodiment, in a video camera 10 of a further embodiment, a zooming-up circuit 62, as shown in FIG. 47, is connected to the signal processing circuit 40 through a switch (not shown) which is turned-on in the quadruplication mode. Accordingly, in the quadruplication mode, the video signals equal to one field, i.e. the luminance signal Y the R-Y signal and the B-Y signal equal to one field outputted from the signal processing circuit 40 are written into field memories 64a to 64c, respectively, in accordance with a writing control signal from a writing control circuit 66. Written video signals are read-out therefrom by a reading control signal from a reading control circuit 68. That is, the reading control circuit 68 receives a line designation signal from a coefficient generation circuit 70, and reads-out the video signals from a designated line and a succeeding line of the field memories 64a to 64c.

Accordingly, the luminance signal read-out from the designated line of the field memory 64a is applied to a multiplier 72a, and the luminance signal read-out from the succeeding line of the memory 64a is applied to a multiplier 72b. Furthermore, the R-Y signal read-out from the designated line of the field memory 64b is applied to a multiplier 72c, and the R-Y signal read-out from the succeeding line of the memory 64b is applied to a multiplier 72d. Then, the B-Y signal read-out from the designated line of the field memory 64c is applied to a multiplier 72e, and the B-Y signal read-out from the succeeding line of the memory 64b is applied to a multiplier 72f.

Each of the luminance signal Y, the R-Y signal and the B-Y signal applied to each of the multipliers 72b, 72d and 72f is multiplied by a coefficient "K" outputted from the coefficient generation circuit 70, and multiplication results are applied to adders 74a to 74c, respectively. Furthermore, each of the luminance signal Y, the R-Y signal and the B-Y signal applied to each of the multiplier 72a, 72c and 72f is multiplied by a coefficient "1-K" outputted from the coefficient generation circuit 70, and multiplication results are applied to the adder 74a to 74c, respectively.

Therefore, a luminance signal Y, an R-Y signal and a B-Y signal each of which is zoomed-up in the vertical direction are obtained as first zoom-up components.

The luminance signal Y, the R-Y signal and the B-Y signal zoomed-up are written into line memories 77a to 77c by a writing control signal from a writing control circuit 78 at every one line, respectively, and read-out therefrom by a reading control signal from a reading control circuit 80 until writing of a succeeding line are started. That is, the reading control circuit 80 receives a pixel designation signal from a coefficient generation circuit 82, and reads-out the video signals from a designated pixel position and a succeeding pixel position.

Accordingly, the luminance signal read-out from the designated pixel position of the line memory 77a is applied to a multiplier 84a, and the luminance signal read-out from the succeeding pixel position of the memory 77a is applied to a multiplier 84b. Furthermore, the R-Y signal read-out from the designated pixel position of the line memory 77b is applied to a multiplier 84c, and the R-Y signal read-out from the succeeding pixel position of the memory 77b is applied to a multiplier 84d. Then, the B-Y signal read-out from the designated pixel position of the line memory 77c is applied to a multiplier 84e, and the B-Y signal read-out from the succeeding pixel position of the memory 77c is applied to a multiplier 84f.

Each of the luminance signal Y, the R-Y signal and the B-Y signal applied to each of the multipliers 84b, 84d and 84f is multiplied by a coefficient "L" outputted from the coefficient generation circuit 82, and multiplication results are applied to adders 86a to 86c, respectively. Furthermore, each of the luminance signal Y, the R-Y signal and the B-Y signal applied to each of the multipliers 84a, 84c and 84e is multiplied by a coefficient "1-L" outputted from the coefficient generation circuit 82, and multiplication results are applied to the adders 86a to 86c, respectively. Accordingly, a luminance signal Y, an R-Y signal and a B-Y signal each of which is zoomed-up in the vertical direction and the horizontal direction are outputted from the adders 86a to 86c, respectively.

In addition, a three-port memory "CSK-48323" manufactured by SONY can be used for the field memories 64a to 64c and the line memories 77a to 77c.

Figure 48:
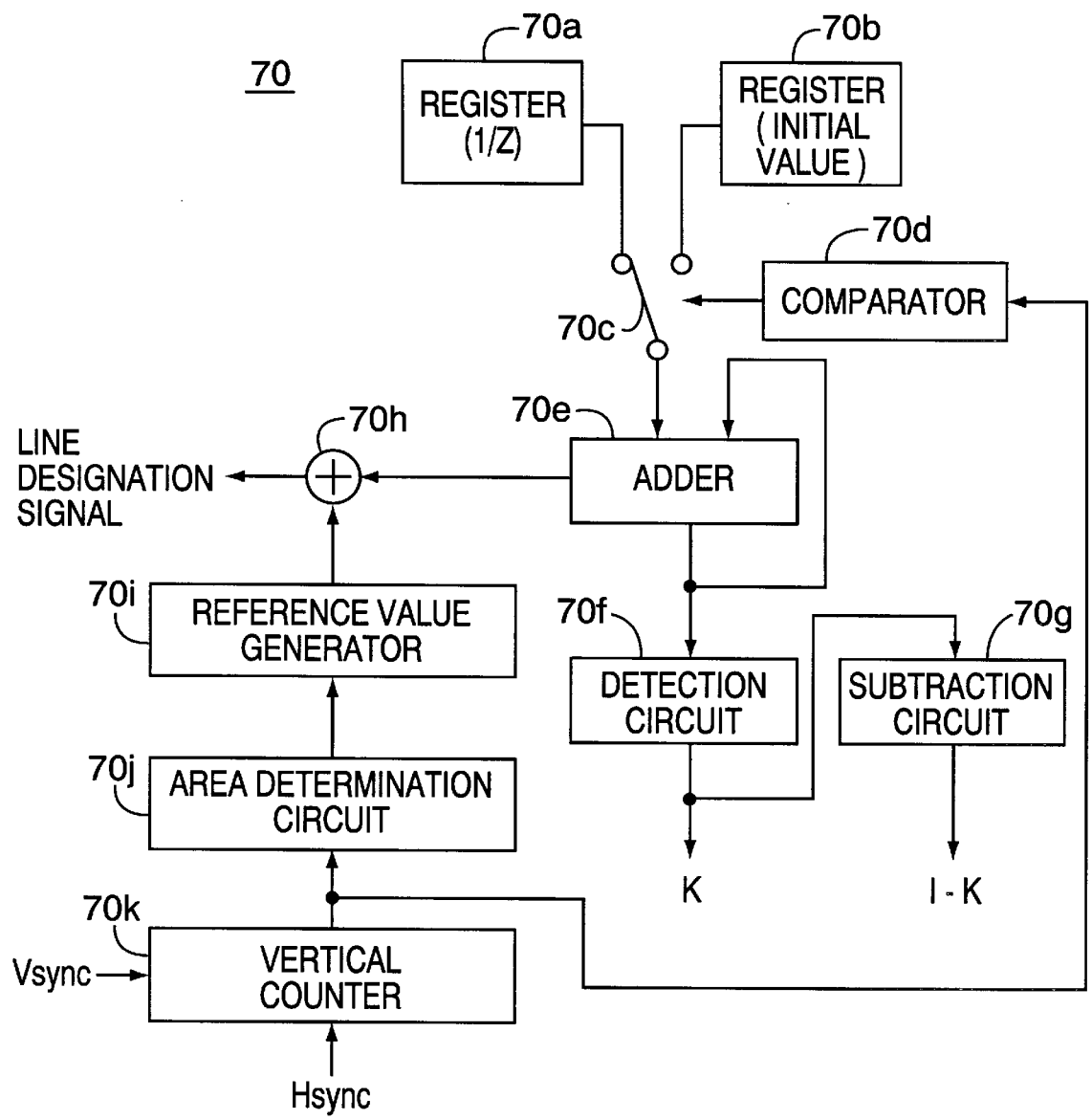
FIG. 48 is a block diagram showing a portion of FIG. 47 embodiment.
Figure 49:
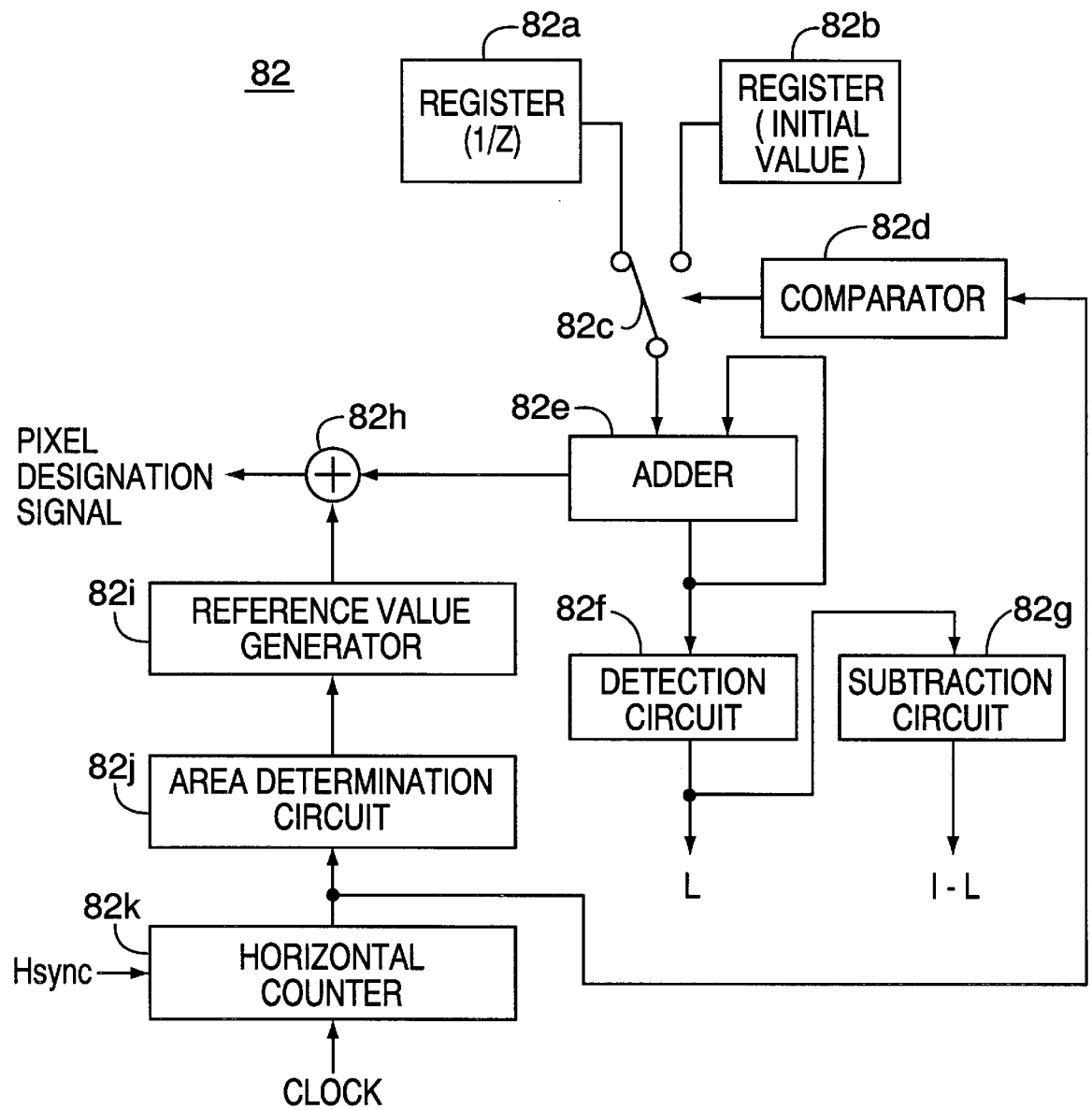
FIG. 49 is a block diagram showing another embodiment of FIG. 47 embodiment.

The coefficient generation circuit 70 is constituted as shown in FIG. 48. A reciprocal number "1/Z" of a zoom-up ratio "Z" is stored in a register 70a, and an initial value is stored in a register 70b. In addition, according to this embodiment, the zoom-up ratio "Z" is "1.21", and the reciprocal number is "0.8". On the other hand, a vertical counter 70k is reset by the vertical synchronization signal from the timing generator 76, and incremented by the horizontal synchronization signal, and a count value of the vertical counter 70k is applied to a comparator 70d. The comparator 70d compares the count value with reference values "0" and "180", and connects a switch 70c to the register 70b at a time that the count value is consistent with one of the reference values. In contrast, if the count value is not consistent with the reference values, the comparator 70d connects the switch 70c to the register 70a.

Figure 50:
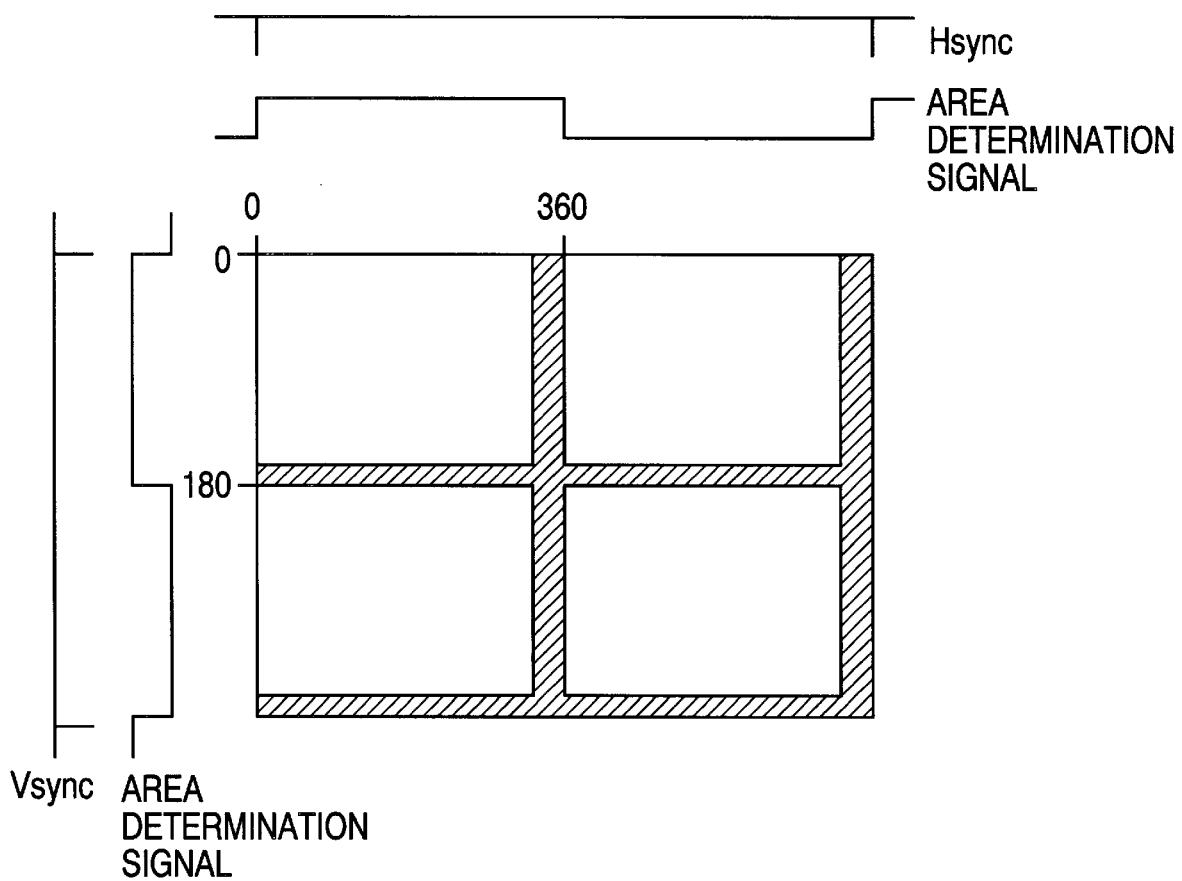
FIG. 50 is an illustrative view showing a portion of an operation of FIG. 47 embodiment.
Figure 51A:
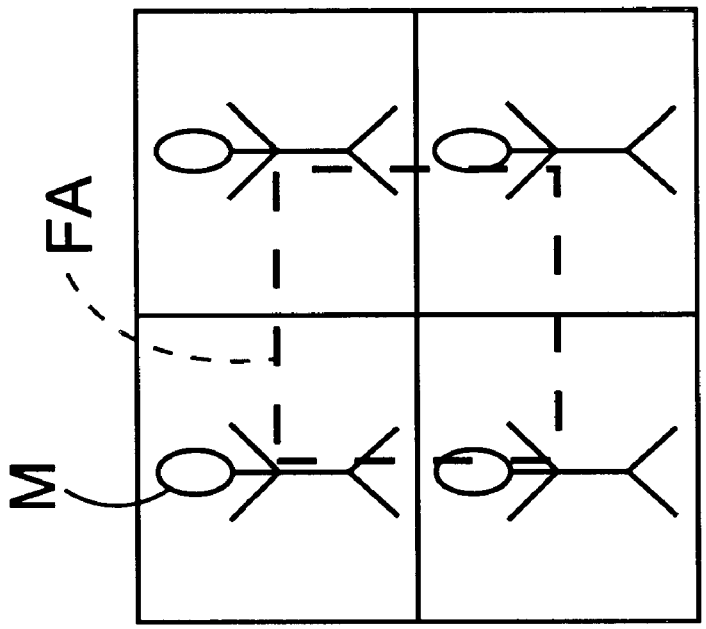
FIGS. 51A and 51B are illustrative views showing images displayed on the monitor in accordance with the prior art.
Figure 51B:
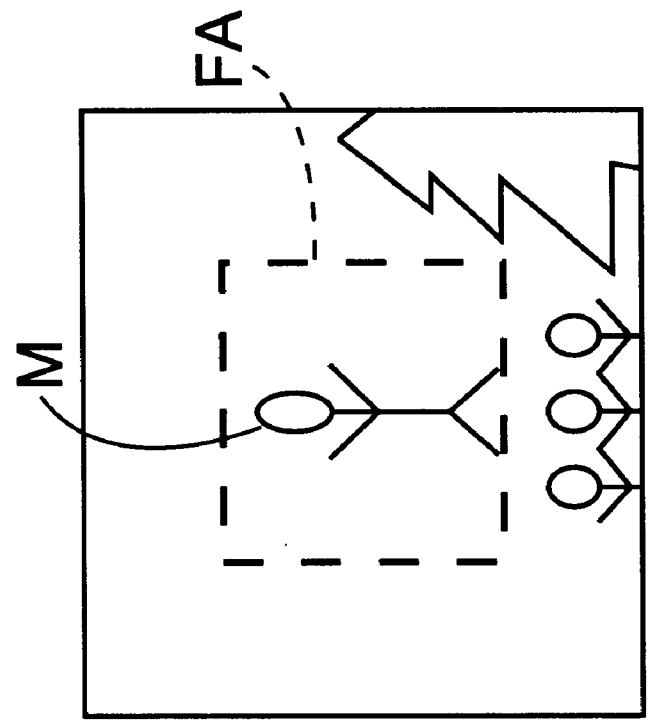

Accordingly, the initial value outputted from the register 70b is applied to an adder 70e in reading-out the video signals from respective first lines of four (4) image areas which are formed in respective ones of the field memories 64a to 64c as shown in FIG. 50, and the reciprocal number outputted from the register 70a is applied to the adder 70e in reading-out other video signals. The adder 70e integrates an inputted value at every one line. Then, the adder 70e applies an integration value to a detection circuit 70f, and applies a value before the decimal point of the integration value to an adder 70h. In addition, the adder 70e is initialized at every time that the switch 70c is changed to the register 70b.

The detection circuit 70f detects a value after the decimal point of the integration value so as to output the value as the coefficient "K" and to apply the value, i.e. "K" to a subtraction circuit 70g. The subtraction circuit 70g subtracts the coefficient "K" from "1", and outputs a subtraction result as the coefficient "1-K". The count value of the vertical counter 70k is also applied to an area determination circuit 70j. The area determination circuit 70j outputs an area determination signal of a high level at a time that the count value is any of "0" to "179", and outputs an area determination signal of a low level at a time that the count value is any of "180" to "359". That is, the area determination circuit 70j outputs the area determination signal as shown in FIG. 50. A reference value generator 70i outputs a reference value "0" at a time that the area determination signal is the high level, and outputs a reference value "180" at a time that the area determination signal is the low level. Accordingly, the adder 70h adds a value from the adder 70e and a reference value from the reference value generator 70i each other, and outputs an addition result as the line destination signal.

Thus, by applying the value before the decimal point of the integration value to the adder 70h, there is a case where the line designation signal has the same value, and therefore, the same signal is succeedingly read-out from respective one of the field memories 64a to 64c. Furthermore, since the value after the decimal point of the integration value is detected by the detection circuit 70f, the coefficient "K" has a value between "0" to "1". Accordingly, the signals read-out from predetermined two lines of the field memory 64a are weighted by predetermined ratios by the multiplier 72a and 72b, and weighted signals are added to each other by the adder 74a. Furthermore, the signals read-out from predetermined two lines of the field memory 64b are weighted by the predetermined ratios by the multipliers 72c and 72d, and weighted signals are added to each other by the adder 74b. Moreover, the signals read-out from predetermined two lines of the field memory 64c are weighted by the predetermined ratios by the multipliers 72e and 72f, and weighted signals are added to each other by the adder 74c.

In generating a video signal to be outputted at a first line on the monitor 55, for example, the switch 70c is connected to the register 70b, whereby the initial value "0" is applied to the adder 70e. On the other hand, the reference value "0" is applied to the adder 70h from the reference value generator 70i. Accordingly, the coefficient "K" indicates "0", and the coefficient "1-K" indicates "1", and the line designation signal indicates "0". Therefore, a weight for signals applied to the multipliers 72a, 72c and 72e becomes "1", and a weight for signals applied to the multipliers 72b, 72d and 72f becomes "0", and accordingly, the signals read-out from first lines of the field memories 64a to 64c are outputted as they are from the adders 74a to 74c, respectively.

In generating a video signal to be outputted at a second line on the monitor 55, since the selector 70c is connected to the register 70a, and "0.8" (reciprocal number) is applied to the adder 70e. Accordingly, the coefficient "K" becomes "0.8", and the coefficient "1-K" becomes "0.2". On the other hand, since a value "0" is applied to the adder 70h from the adder 70e, and a reference value from the reference value generator 70i is still "0", the line designation signal indicates "0". Accordingly, each of the signals read-out from the first lines of the field memories 64a to 64c is multiplied by "0.2" and each of the signals read-out from the second lines thereof is multiplied by "0.8". Then, signals being read-out from the field memory 64a and weighted are added to each other by the adder 74a, signals being read-out from the field memory 64b and weighted are added to each other by the adder 74b, and signals being read-out from the field memory 64c and weighted are added to each other by the adder 74c.

By repeating such an operation, video signals stored in an upper half image areas of respective one of the field memories 64a to 64c are zoomed-up in the vertical direction. In addition, no video signals are read-out from the output-indefinite area formed in the respective one of the field memories 64a to 64c because if a video signal to be outputted at 179th line of the monitor 55 is generated, the switch 70c is connected to the register 70b, and therefore, the reference value "180" is outputted from the reference value generator 70i, and reading-out of video signals is started from 180th line of the field memories 64a to 64c. Then, a zooming-up operation of video signals stored in a lower half image areas of respective one of the field memories 64a to 64c in a vertical direction is succeedingly executed.

Since the coefficient generation circuit 82 is constituted in the same manner as the coefficient generation circuit 70, a duplicate description is omitted. A horizontal counter 82k is incremented by the clock from the timing generator 76, and reset by the horizontal synchronization signal. A comparator 82d changes a switch 82c to a register 82b at only a time that a count value of the horizontal counter 82k is "0" or "360". A detection circuit 82f detects a value after the decimal point of an integration value obtained by an adder 82e at every one pixel, and outputs the value as the coefficient "L". A subtraction circuit 82g subtracts the coefficient "L" from "1", and outputs a subtraction value as the coefficient "1-L". An area determination circuit 82j outputs an area determination signal shown in FIG. 50 in accordance with the count value of the horizontal counter 82k. More specifically, the area determination signal is a high level at a time that the count value is any one from "0" to "359", and the area determination signal is a low level at a time that the count value is any one from "360" to "719". Then, a reference value generator 82i outputs a reference value "0" at a time that the area determination signal is the high level, and outputs a reference value "360" at a time that the area determination signal is the low level.

Since the coefficient generation circuit 82 is thus constituted, each of video signals written into the line memories 77a to 77c is zoomed-up in the horizontal direction.

In generating a video signal to be displayed at first pixels in respective lines of the monitor 55, for example, the coefficient "L" is "0", and the coefficient "1-L" is "1". Furthermore, the pixel destination signal indicates "0". Accordingly, video signals stored in first pixel positions of the line memories 77a to 77c are outputted as they are from the adders 86a to 86c, respectively. In generating video signals displayed at second pixels of the monitor 55, the coefficient "L" is "0.8", and the coefficient "1-L" is "0.2", and the pixel destination signal indicates "0". Accordingly, each of the video signals read-out from the first pixel positions of the line memories 77a to 77c is multiplied by "0.2", and each of video signals read-out from second pixel positions thereof are multiplied by "0.8". Then, video signals being read-out from the line memory 77a and weighted are added to each other by the adder 86a, and video signals being read-out from the line memory 77b and weighted are added to each other by the adder 86b, and video signals being read-out from the line memory 77c and weighted are added to each other by the adder 86c.

By repeating such an operation, each of the video signals stored in the line memories 77a to 77c is zoomed-up in the horizontal direction. In addition, as similar to a case of the field memories 64a to 64c, no video signals are read-out from the output-indefinite areas formed on the line memories 77a to 77c.

According to this embodiment, since the four (4) images to be displayed on the monitor 55 are zoomed-up in the horizontal direction and the vertical direction by the zooming-up circuit 62, it is possible to delete the output-indefinite area from the monitor 55.

In addition, though these embodiments were described with using a CCD imager having a dual channel system, it is needless to say that a CCD imager having one channel system in which charges of an odd line and an even line are alternately outputted at every one field can be used.

Furthermore, a color filter of a complementary color can be used instead of a color filter of a primary color.

Furthermore, these embodiments were described with using the quadruplication mode in which the charges are read-out at every quarter field and the charges of the upper left area are used for displaying as the second mode, it is needless to say that the present invention can be applied for a double mode in which charges are read-out at every one half field, and charges of a lower half of the charge area are used for displaying.

Moreover, according to these embodiments, each of the high-frequency luminance component value generation circuit, the luminance component value generation circuit, the R-Y component value generation circuit and the B-Y component value generation circuit is provided with the area data memories; however, if the respective circuits share a single area data memory for each mode while the microcomputer 50 processes necessary one of the high-frequency luminance component value, the luminance component values, the R-Y component values and the B-Y component values, it is possible to reduce the number of the memories.

Furthermore, according to these embodiments, though the division areas are formed as shown in FIGS. 20A and 20B, and FIGS. 24A and 24B for adjusting the iris and the white balance, it is needless to say that the present invention is not restricted to this case.

Moreover, according to these embodiments, though the focus is controlled by moving the focus lens, the present invention can be applied to a case that the CCD imager is moved in an optical axis direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera comprising:

an imaging device;

signal processing means for generating a video signal by processing a camera signal from said imaging device;

mode switching means for selectively switching a first mode and a second mode;

first generating means for generating a first predetermined component value of a first video signal based on said camera signal from a charge area of said imaging device at a time that said first mode is selected by said mode switching means;

second generating means for generating a second predetermined component value of a second video signal based on said camera signal from charge area of said imaging device at a time that said second mode is selected by said mode switching means; and adjusting means for adjusting a picture quality associated element on the basis of said first predetermined component value at a time that said first mode is selected and said second predetermined component value at a time that said second mode is selected, wherein said video signal is applied to a monitor, said monitor displays an image based on said video signal, and said first generating means includes first determination means for determining whether or not said video signal is said first video signal to be outputted at a first monitor area of said monitor associated with said charge area, and first predetermined component value generating means for generating said first predetermined component value on the basis of a determined first video signal.

2. A video camera according to claim 1, wherein said first determination means includes a first memory in which first area data of said first monitor area is stored, first position detecting means for detecting an output position of said video signal on said monitor, first comparison means for comparing said first area data and said output position with each other, and first control means for controlling said first predetermined component value generating means in accordance with a first comparison result from said first comparison means.

3. A video camera according to claim 1, wherein in said first mode, an image corresponding to a camera signal from a whole charge area of said imaging device is displayed on said monitor, and a single first monitor area corresponding to said charge area is formed on said monitor.

4. A video camera according to claim 1, wherein in a case where said picture quality associated element is a white balance, said charge area is equal to said charge area, said first monitor area includes a first predetermined number of first division areas, said second generating means includes second detecting means for detecting a video signal to be outputted from a second monitor area equal to said first monitor area and including second division areas of second predetermined number larger than said first predetermined number, and second predetermined component value generating means for generating said second predetermined value for each of said second division areas.

5. A video camera according to claim 4, wherein said second detecting means detects said video signal for each of said first predetermined number of second division areas.

6. A video camera comprising:

an imaging device;

signal processing means for generating a video signal by processing a camera signal from said imaging device;

mode switching means for selectively switching a first mode and a second mode;

first generating means for generating a first predetermined component value of a first video signal based on said camera signal from a charge area of said imaging device at a time that said first mode is selected by said mode switching means;

second generating means for generating a second predetermined component value of a second video signal based on said camera signal from charge area of said imaging device at a time that said second mode is selected by said mode switching means; and adjusting means for adjusting a picture quality associated element on the basis of said first predetermined component value at a time that said first mode is selected and said second predetermined component value at a time that said second mode is selected, wherein said video signal is applied to a monitor, said monitor displays an image based on said video signal, and said second generating means includes second determination means for determining whether or not said video signal is said second video signal to be outputted at a second monitor area of said monitor, said second monitor area being associated with said charge area and second predetermined component value generating means for generating said second predetermined component value on the basis of a determined second video signal.

7. A video camera according to claim 6, wherein said second determination means includes a second memory in which second area data of said second monitor area is stored, second position detecting means for detecting an output position of said video signal on said monitor, second comparison means for comparing said second area data and said output position with each other, and second control means for controlling said second predetermined component value generating means in accordance with a second comparison result from said second comparison means.

8. A video camera according to claim 6, where in said second mode, a plurality of images corresponding to camera signals repeatedly outputted from a portion of said charge area of said imaging device including said charge area are displayed on said monitor in said second mode, and a single second monitor area corresponding to said charge area is formed on said monitor.

9. A video camera according to claim 6, wherein said second monitor area is formed at a portion excluding a predetermined area on said monitor.

10. A video camera according to claim 9, wherein said predetermined area is an output-indefinite area.

11. A video camera according to claim 6, wherein said second monitor area is formed on said monitor in a manner that a portion of said second monitor area is overlapped on a predetermined area, and said second monitor area includes a plurality of division area, and said second predetermined component value generating means generates said second predetermined component value for each one of said division areas, and said adjusting means adjusts said image quality associated element on the basis of said second predetermined component value of division area which is not overlapped on said predetermined area.

12. A video camera according to claim 6, wherein in a case where said picture quality associated element is a focus, a plurality of images each of which corresponds to said camera signal from a portion of said charge area including said charge area are displayed on said monitor, and a plurality of said second monitor area each of which corresponds to said charge area are formed on said monitor in said second mode.

13. A video camera comprising:

an imaging device;

signal processing means for generating a video signal by processing a camera signal from said imaging device;

mode switching means for selectively switching a first mode and a second mode;

first generating means for generating a first predetermined component value of a first video signal based on said camera signal from a charge area of said imaging device at a time that said first mode is selected by said mode switching means;

second generating means for generating a second predetermined component value of a second video signal based on said camera signal from charge area of said imaging device at a time that said second mode is selected by said mode switching means; and adjusting means for adjusting a picture quality associated element on the basis of said first predetermined component value at a time that said first mode is selected and said second predetermined component value at a time that said second mode is selected, wherein said second video signal includes a plurality of image components each of which corresponds to a camera signal from said charge area, and further comprising:

output control means for outputting a camera signal of said charge area of said imaging device and sweeping-out a camera signal of an area excluding said charge area in said second mode; and zooming-up means for zooming-out respective one of said image components, wherein said zooming-up means includes first zoomed-up component generating means for generating a first zoomed-up component in which said image component is zoomed-up in a vertical direction by weighting image components equal to two lines and adding weighted image components to each other, a second zoomed-up component generating means for generating a second zoomed-up component in which said first zoomed-up component is zoomed-up in a horizontal direction by weighting first zoomed-up components equal to two pixels and adding weighted first zoomed-up component to each other.

14. A video camera according to claim 13, wherein said first zoomed-up component generating means includes first integrating means for integrating a reciprocal of a zooming-up ratio at every one line, line determination means for determining said two lines on the basis of a value before a decimal point of a first integration value evaluated by said first integrating means, and first coefficient determination means for determining weighting coefficients for said image component equal to said two lines on the basis of a value after said decimal point.

15. A video camera according to claim 13, wherein said second zoomed-up component generating means includes second integrating means for integrating a reciprocal of a zooming-up ratio at every one pixel, pixel determination means for determining said two pixels on the basis of a value before a decimal point of a second integration value evaluated by said second integrating means, and second coefficients determination means for determining weighting coefficients for said second zoomed-up component equal to said two pixels on the basis of a value after said decimal point.

* * * * *